(12) United States Patent
Kozar et al.

(10) Patent No.: US 9,242,427 B2
(45) Date of Patent: Jan. 26, 2016

(54) COUPLED FIBERS IN COMPOSITE ARTICLES

(71) Applicant: The Boeing Company, Chicago, IL (US)

(72) Inventors: Michael P. Kozar, Mercer Island, WA (US); Mark S. Wilenski, Mercer Island, WA (US); Daniel C. Stanley, Renton, WA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 14/106,742

(22) Filed: Dec. 14, 2013

(65) Prior Publication Data

US 2014/0295726 A1 Oct. 2, 2014

Related U.S. Application Data

(63) Continuation-in-part of application No. 12/968,575, filed on Dec. 15, 2010, now Pat. No. 8,609,219.

(51) Int. Cl.
| | |
|---|---|
| *B32B 5/02* | (2006.01) |
| *C08J 5/04* | (2006.01) |
| *B32B 5/26* | (2006.01) |
| *B29C 70/54* | (2006.01) |
| *B32B 5/12* | (2006.01) |
| *B29C 70/20* | (2006.01) |
| *F41H 5/04* | (2006.01) |

(Continued)

(52) U.S. Cl.
CPC ............ *B32B 5/02* (2013.01); *B29C 70/202* (2013.01); *B29C 70/24* (2013.01); *B29C 70/543* (2013.01); *B32B 5/024* (2013.01); *B32B 5/12* (2013.01); *B32B 5/26* (2013.01); *C08J 5/04* (2013.01); *D04H 3/04* (2013.01); *F41H 5/0407* (2013.01); *F41H 5/0485* (2013.01); *B29K 2995/0089* (2013.01); *B32B 2250/42* (2013.01); *B32B 2260/046* (2013.01); *B32B 2262/101* (2013.01); *B32B 2307/412* (2013.01); *Y10T 428/249921* (2015.04); *Y10T 442/3854* (2015.04)

(58) Field of Classification Search
CPC  Y10T 428/24124; B32B 5/02; B29C 70/202; B29C 70/24
USPC ........................................................ 428/113
See application file for complete search history.

(56) References Cited

U.S. PATENT DOCUMENTS

| | | | |
|---|---|---|---|
| 4,320,160 A | 3/1982 | Nishimura et al. | |
| 4,461,855 A * | 7/1984 | Phillips | ............... 523/222 |
| 5,212,010 A | 5/1993 | Curzio et al. | |

(Continued)

FOREIGN PATENT DOCUMENTS

| | | |
|---|---|---|
| EP | 0144939 | 6/1985 |
| EP | 0272083 | 6/1988 |

(Continued)

OTHER PUBLICATIONS

Hills, Inc., "An Introduction to Bicomponent Fibers," retrieved Apr. 12, 2012.

(Continued)

*Primary Examiner* — Brent O'Hern

(57) ABSTRACT

A composite structure may include a plurality of fibers at least partially embedded within a matrix. The fibers may be connected to one another at a at least one connection site.

29 Claims, 28 Drawing Sheets

(51) Int. Cl.
*D04H 3/04* (2012.01)
*B29C 70/24* (2006.01)

(56) References Cited

U.S. PATENT DOCUMENTS

| | | |
|---|---|---|
| 5,665,450 A | 9/1997 | Day et al. |
| 8,530,027 B2 | 9/2013 | Kozar |
| 8,559,779 B2 | 10/2013 | Kozar |
| 2005/0197025 A1 | 9/2005 | Hallam et al. |
| 2005/0227564 A1 | 10/2005 | Bond et al. |
| 2007/0071941 A1* | 3/2007 | Eleazer et al. .............. 428/92 |
| 2008/0241537 A1 | 10/2008 | Sennett et al. |
| 2012/0008806 A1 | 1/2012 | Hess |
| 2012/0088063 A1 | 4/2012 | Kozar et al. |
| 2012/0152099 A1 | 6/2012 | Wilenski |
| 2012/0156422 A1 | 6/2012 | Kozar |
| 2012/0156452 A1 | 6/2012 | Wilenski |

FOREIGN PATENT DOCUMENTS

| | | |
|---|---|---|
| EP | 1348791 | 10/2003 |
| TW | 201128053 | 8/2011 |
| WO | WO0204725 | 1/2002 |
| WO | WO2007041782 | 4/2007 |
| WO | WO2007080113 | 7/2007 |

OTHER PUBLICATIONS

Hills, Inc., "Hills_Inc_Bicomponent-Fibers-Chart," retrieved Apr. 12, 2012.

International Search Report, PCT/US2014/051424, dated Nov. 26, 2014.

* cited by examiner

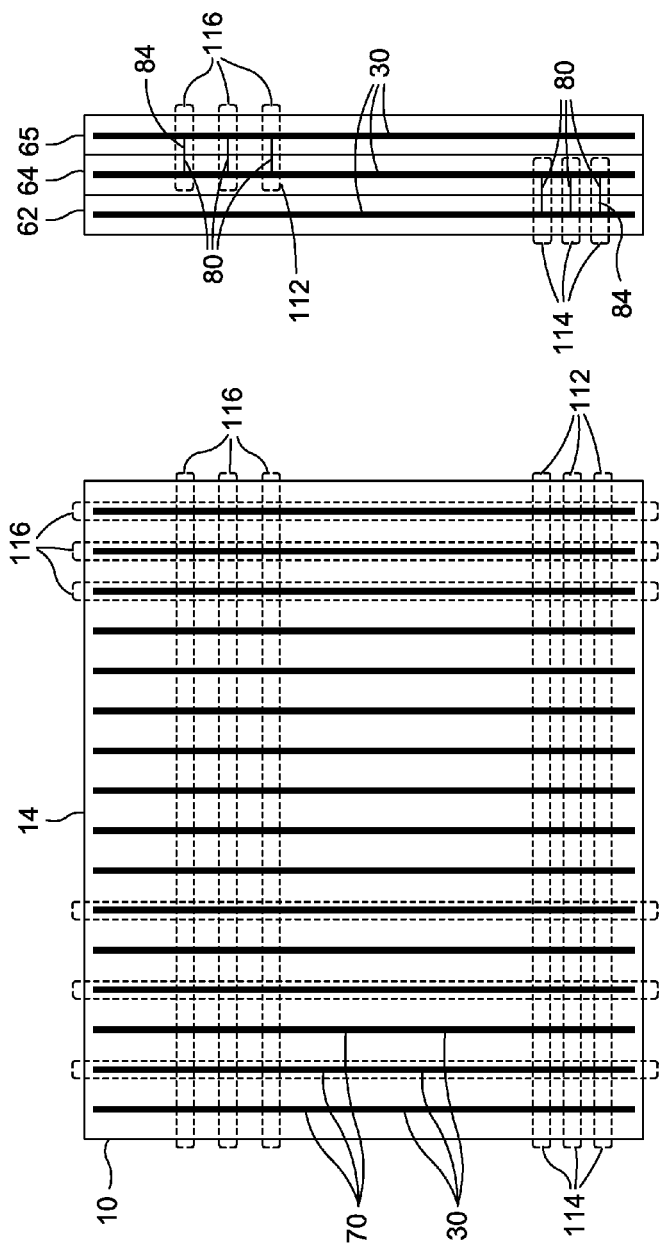
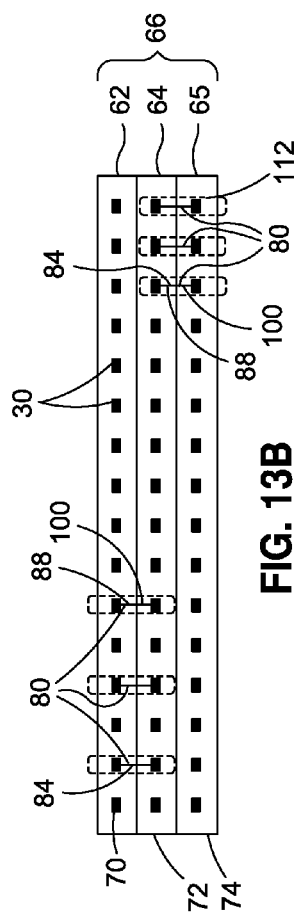
FIG. 13A
FIG. 13B
FIG. 13C

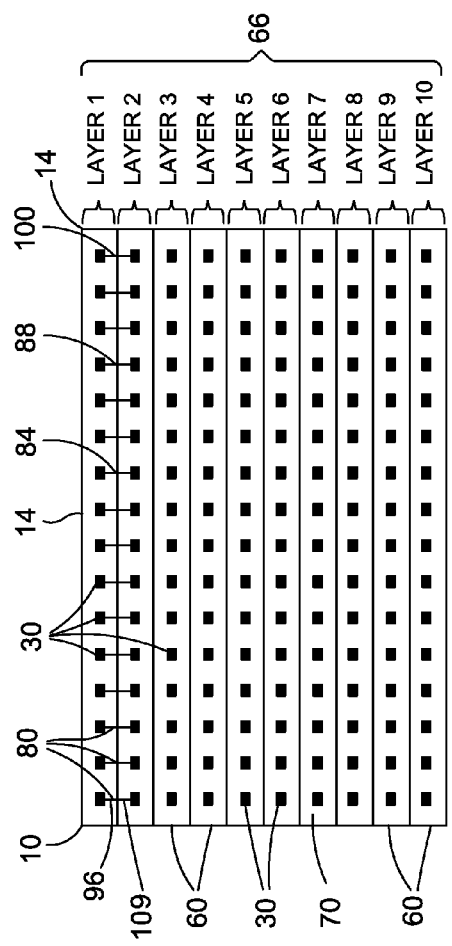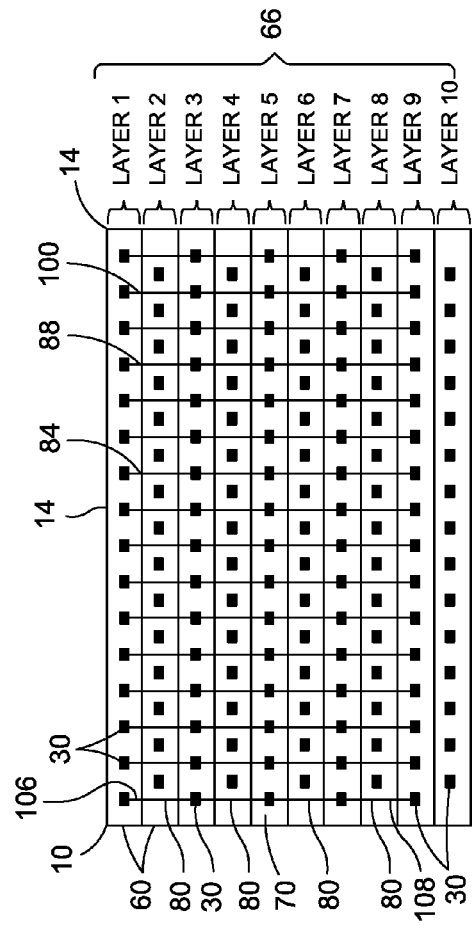

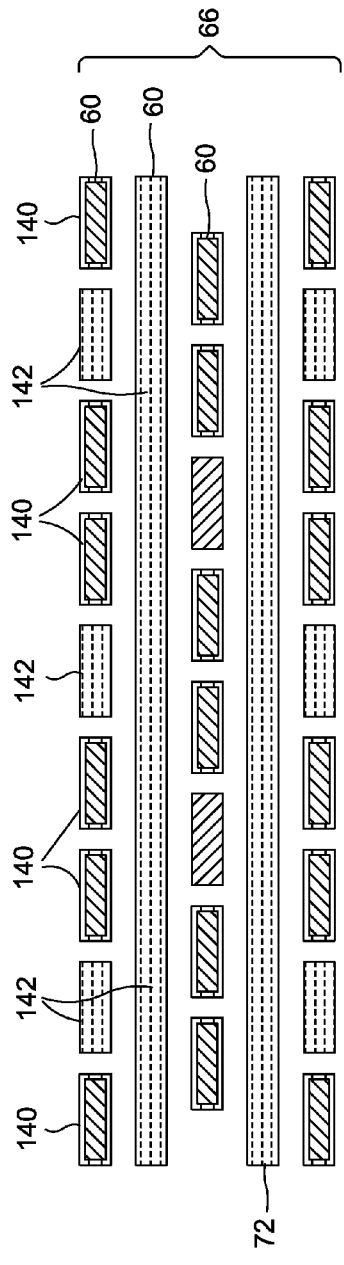
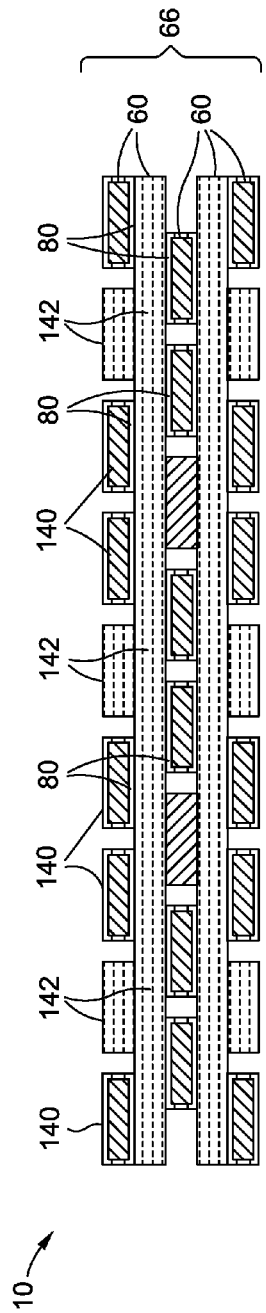
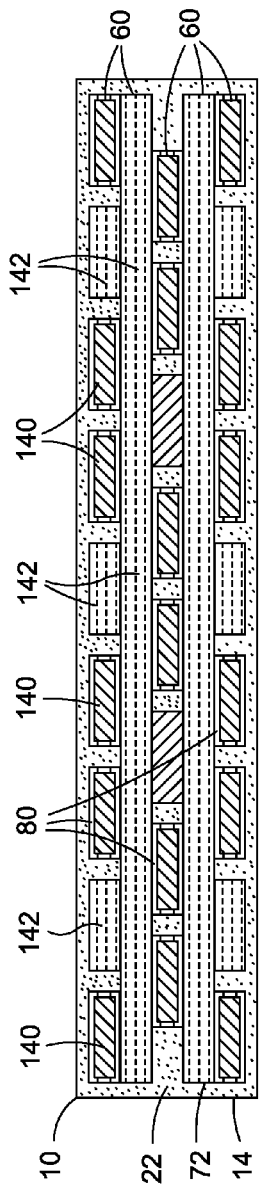
FIG. 41
FIG. 42
FIG. 43

COUPLED FIBERS IN COMPOSITE ARTICLES

CROSS-REFERENCE TO RELATED APPLICATIONS

The present application is a continuation application of and claims priority to U.S. application Ser. No. 12/968,575 filed on Dec. 15, 2010 and entitled SELECTIVELY COUPLED FIBERS IN COMPOSITES, now U.S. Pat. No. 8,609,219, the entire contents of which is expressly incorporated by reference herein.

FIELD

The present disclosure relates generally to composites and, more particularly, to fiber reinforced composite structures having coupled fibers for improved ballistic performance.

BACKGROUND

Composite structures typically comprise a matrix reinforced with fibers wherein the fibers are embedded in the matrix. Composite structures are designed to transmit loads along the length of the fibers. Loads from one fiber may be transferred to another fiber in the same layer or to fibers in an adjacent layer by passing through the matrix material. However, the matrix is typically weaker than the fibers such that when a sufficiently high load is transmitted from one fiber to another fiber across the matrix, the matrix will fail. The failure of the matrix allows the fibers to move laterally within the composite structure.

During a ballistic event where a composite panel may be impacted by a projectile, the ability of the fibers to move laterally or sideways is generally detrimental to the overall ballistic performance of the composite panel. For example, the ability of the fibers in the matrix to move laterally allows the projectile to wedge between the fibers. The wedging of the projectile between the fibers allows the projectile to penetrate the thickness of a composite panel without fracturing the fibers. In this regard, lateral movement of the fibers and subsequent wedging of a projectile reduces the ballistic performance capabilities of the panel.

As can be seen, there exists a need in the art for a composite structure that provides reduced susceptibility to lateral movement of the fibers such that ballistic performance may be improved. Reduced susceptibility to lateral movement of the fibers may also result in an improvement in the structural performance of a composite structure during static and/or quasi-static loading of the composite structure.

BRIEF SUMMARY

The above-described needs associated with composite structures for ballistic applications and structural applications are specifically addressed and alleviated by the present disclosure which, in an embodiment, provides a composite structure having a plurality of fibers embedded within a matrix. The fibers may include a first fiber and a second fiber which may be oriented in substantially parallel relation to one another. The first and second fibers may be connected to one another at one or more connection sites.

In a further embodiment, disclosed is a composite structure having a plurality of fibers embedded within a matrix. The fibers may include a first fiber and a second fiber which may be oriented in a substantially parallel relation to one another. The first and second fibers may be arranged in a first plane and may be connected to one another at a plurality of connection sites.

Additionally disclosed is a method of manufacturing a composite structure which may include the steps of arranging a plurality of fibers in substantially parallel relation to one another. The plurality of fibers may include first and second fibers. The method may further include connecting the first fiber to the second fiber at at least one connection site. The method may further include embedding the plurality of fibers within a matrix.

Also disclosed is a composite structure which may include a plurality of fibers at least partially embedded within a matrix. The fibers may be connected to one another at a plurality of connection sites. Each connection site may have a connection type and a connection quality. At least two of the connection sites may have a different connection type and/or a different connection quality.

In a further embodiment, disclosed is a composite structure which may include plurality of fibers at least partially embedded within a matrix. The fibers may be arranged in two or more layers. At least one of the fibers in at least one layer may be connected to at least one of the fibers in another layer, The present disclosure also includes a method of manufacturing a composite structure. The method may include providing a plurality of fibers, and connecting at least a portion of the fibers to one another at connection sites. The method may additionally include providing at least two of the connection sites with a different connection type and/or a different connection quality. The method may further include embedding the fibers in a matrix.

In a further embodiment, disclosed is a method of manufacturing a composite structure which may include arranging a plurality of fibers in two or more layers. The method may include connecting at least one of the fibers in at least one layer to at least one of the fibers in another layer, and embedding the fibers in a matrix.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 13A is a schematic top view of a composite structure having fibers interconnected at connection sites arranged in first and second connection regions;

FIG. 13B is a schematic side view of the composite structure of FIG. 13A and illustrating the out-of-plane coupling of the fibers of the first and second layers along the first and second connection regions;

FIG. 13C is a schematic end view of the composite structure of FIG. 13A and further illustrating the out-of-plane coupling of the fibers of the second and third layers along the first and second connection regions;

FIG. 14 is a schematic side view of a composite structure in a unidirectional configuration and illustrating out-of-plane coupling of the fibers of the first and second layers with the remaining layers being unconnected to other fibers;

FIG. 15 is a schematic side view of a composite structure in a unidirectional configuration and illustrating out-of-plane coupling of the fibers in every other layer (e.g., in alternating layers);

FIG. 41 is an exploded schematic view of a plurality of first-functional fibers and second-functional fibers arranged in a cross-ply configuration;

FIG. 42 is a schematic side view of the layers of FIG. 41 pressed together to chemically bond the second-functional fibers to the first-functional fibers at locations where the second-functional fibers contact the first-functional fibers;

FIG. 43 is a schematic side view of a composite structure after infusing the chemically bonded layers with matrix material;

DETAILED DESCRIPTION

Figure 1:
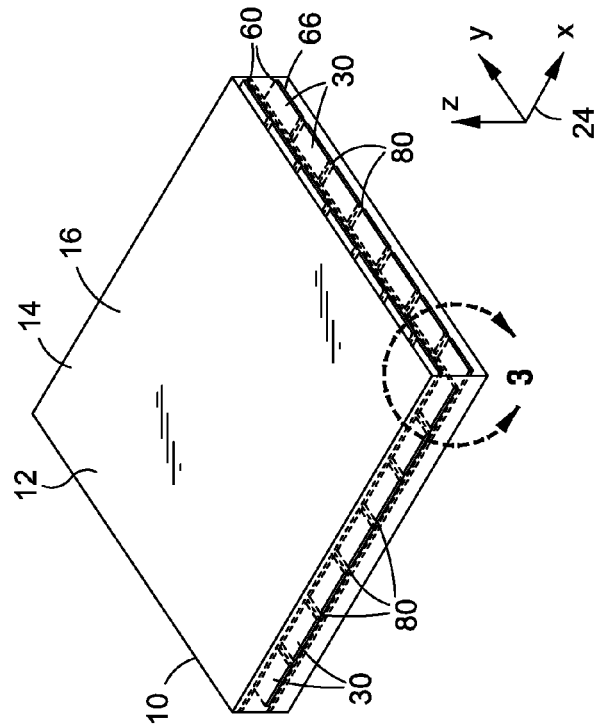
FIG. 1 is a perspective illustration of a composite structure in an embodiment comprising a matrix and a plurality of fibers.

Referring now to the drawings wherein the showings are for purposes of illustrating preferred and various embodiments of the disclosure, shown in FIG. 1 is an embodiment of a composite structure 10. The composite structure 10 may be fabricated as a fiber-reinforced composite panel 14 comprising a substantially optically transparent and/or infrared transparent polymeric matrix 22 and a plurality of likewise substantially optically-transparent and/or infrared-transparent fibers 30 which may be embedded within the polymeric matrix 22. Although illustrated in FIG. 1 in a panel 14 configuration having panel surfaces 16, the composite structure 10 may be provided in any one of a wide variety of sizes, shapes and configurations, without limitation, and may include planar and/or compound curvature surfaces.

Figure 2:
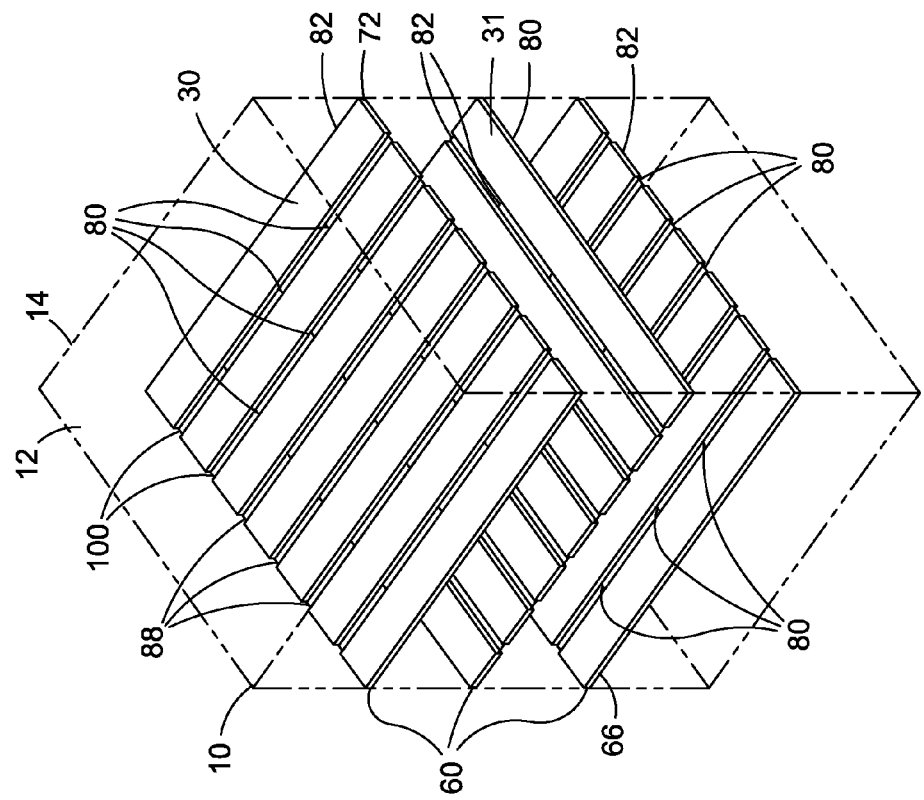
FIG. 2 is an exploded perspective illustration of the composite structure of FIG. 1 and illustrating a plurality of layers of the fibers in an embodiment wherein the fibers are connected to one another at periodic intervals at connection sites.

Referring to FIG. 2, shown is an exploded illustration of the panel 14 of FIG. 1 and illustrating a plurality of the fibers 30 which are formed as strips having an elongated cross-sectional shape and being arranged in layers 60. In FIG. 2, the middle fiber is indicated by reference numeral 31. The fibers 30 in any of the layers 60 may be provided in any size, shape and configuration and are not limited to elongated cross-sectional shapes. In any of the embodiments disclosed herein, the fibers 30 may be oriented in substantially parallel relation to one another in any given layer 60 although non-parallel orientations of fibers 30 within a layer 60 are contemplated. Advantageously, the composite structure 10 as disclosed herein provides for coupling of the fibers 30 to one another at one or more connection sites 80 as schematically illustrated in FIG. 2. For example, FIG. 2 illustrates three of the layers 60, each including a plurality of fibers 30 arranged substantially parallel to one another. The fibers 30 in each one of the layers 60 are connected to adjacent fibers 30 at a plurality of connection sites 80 which may be spaced at any desired interval along a length of one or more of the fibers 30. The coupling of the fibers 30 at one or more connection sites 80 may facilitate interaction and/or cooperation between adjacent fibers 30 and/or non-adjacent fibers 30 which may significantly alter load paths (e.g., the direction and/or length of the load paths) through the composite structure 10 and may limit damage propagation through the composite structure 10 such as may occur during a failure event such as a ballistic impact event. Furthermore, in any embodiment disclosed herein, the addition of fiber 30 coupling at one or more connection sites 80 may advantageously improve and/or control the mechanical properties of the composite structure 10 including improving properties such as interlaminar shear strength, delamination resistance, stiffness, compression strength, fracture toughness, and damage tolerance of the composite structure 10.

Although FIG. 2 illustrates connection sites 80 which are schematically represented as relatively thin lines extending between generally flattened fibers 30 of a composite structure 10. It should be noted that in the schematic illustrations of FIG. 1-9 and in the schematic illustrations of FIGS. 13A-33, the fibers 30 in each layer 60 are shown at an exaggerated spacing from one another to illustrate the concept of coupling the fibers 30 at one or more connection sites 80. However, the fibers 30 in a layer 60 of an actual composite structure 10 may be spaced in relatively close proximity to one another and, in some examples, the parallel fibers 30 in each layer 60 may be in contact with one another, but may only be coupled to one another at one or more connection sites 80. In addition, the schematic illustrations of FIGS. 1-4 show the fibers 30 in an exaggerated cross-sectional size relative to the size of the composite structure 10. For example, although FIG. 2 shows seven (7) individual fibers 30 in each of the three (3) layer 60 of the composite structure 10, an actual composite structure 10 may have tens of thousands or more fibers 30 in each layer 60. Furthermore, an actual composite structure 10 may have hundred of layers 60. In addition, in an actual composite structure 10, the thickness of each fiber 30 may be relatively small. For example, the thickness of each fiber 30 may be may be in the range of from approximately 5 microns to approximately 5,000 microns (e.g., 0.0002 to 0.20 inch). However, the fibers 30 may be provided in any fiber thickness 50, without limitation.

The schematic representation of the connection sites 80 in FIG. 2 illustrate in-plane coupling 82 of the fibers 30 in each layer 60. However, the present disclosure contemplates out-of-plane coupling 84 of fibers 30 or combinations of in-plane coupling 82 and out-of-plane coupling 84 of the fibers 30 in any one of a variety of different arrangements as described below. Fibers 30 may be coupled at one or more connection sites 80 using one or more connection types 88 including, but not limited to, adhesive bonding, chemical bonding, thermal fusing, mechanical pinning, and/or other suitable connection types. Adhesive bonding may comprise bonding the fibers 30 at the connection sites 80 using a suitable adhesive. Chemical bonding may comprise reactively bonding the outer surfaces of fibers 30 at locations where fibers 30 come into contact with one another as a result of the chemical composition of the fiber 30 materials, as described below. Thermal fusing may comprise locally heating the fibers 30 at each connection site 80 to fuse or weld the fibers 30 together at each connection site 80. For example, the fibers 30 may be locally heated by a laser (not shown) at each connection site 80 to a temperature above the glass transition temperature of the fibers 30 in order to fuse the fibers 30 together.

The technical effect of the coupling of fibers 30 to one another at the connection sites 80 is in an improvement of the composite structure 10 in resisting penetration of a projectile through the composite structure 10. More specifically, by coupling the fibers 30 to one another at one or more connection sites 80 throughout the composite structure 10, the ability of a projectile in wedging between the fibers 30 is reduced.

Furthermore, the coupling of the fibers 30 to one another at one or more connection sites 80 throughout the composite structure 10 provides a means for controlling the size or area of the composite structure 10 that may be damaged as a result of impact by a projectile. In this regard, the coupling of the fibers 30 at one or more connection sites 80 throughout the composite structure 10 provides a means for tuning or tailoring the stiffness of the composite structure 10 for improving ballistic performance such as during a ballistic event when fibers 30 may be subjected to relatively high strain rates. In addition, coupling of fibers 30 may be applied to composite structures 10 that are subjected to static loading and/or quasi-static loading to improve the structural performance of such composite structures 10.

Figure 3:
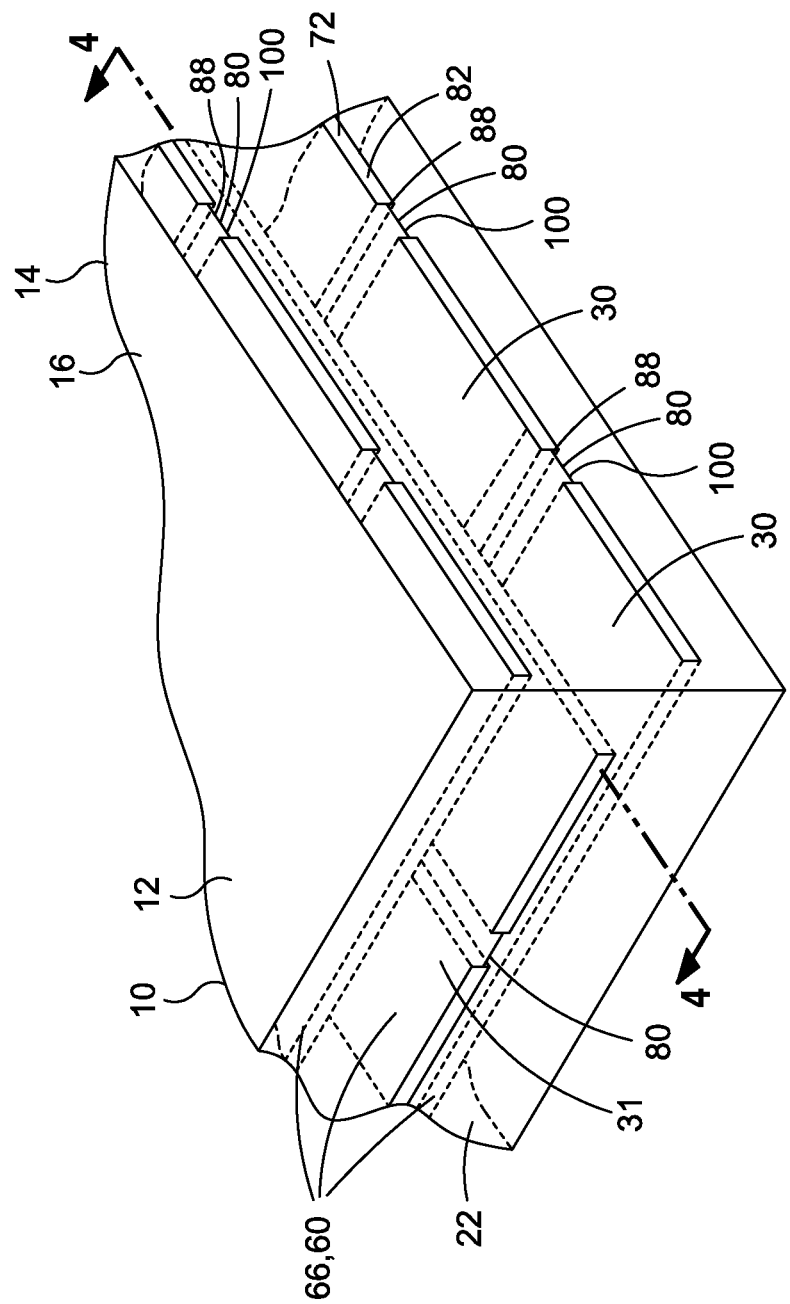
FIG. 3 is an enlarged perspective illustration of a portion of the composite structure of FIG. 1 and illustrating an arrangement of the layers of fibers within the matrix and further illustrating in-plane coupling of the fibers of each layer.

Referring to FIG. 3, shown is an enlarged perspective illustration of the composite structure 10 illustrating the fibers 30 arranged in layers 60 within the matrix 22. In FIG. 3, each one of the layers 60 includes fibers 30 oriented substantially parallel to one another. The fibers 30 in each layer 60 are oriented perpendicularly relative to the fiber 30 in adjacent layers 60 forming a cross-ply configuration 72 of the composite structure 10 similar to that which is illustrated in FIG. 2. However, for any of the embodiments disclosed herein, the fibers 30 may be arranged in any orientation relative to one another within the composite structure 10 and are not limited to the arrangements illustrated in FIGS. 2 and 3. For example, the fibers 30 in each one of the layers 60 may be oriented parallel to the fibers 30 in adjacent layers 60 forming a unidirectional configuration 70 (FIG. 6) of the composite structure 10. Even further, the fibers 30 in any given layer 60 may be oriented at any angle, without limitation, relative to the orientation of the fibers 30 in adjacent layers 60. For example, in any of the embodiments disclosed herein, the fibers 30 of one layer 60 may be oriented at any non-perpendicular angle (i.e., 15°, 22.5°, 45°, 60°, 75°, etc.) relative to the fibers 30 of an adjacent one of the layers 60.

Figure 4:
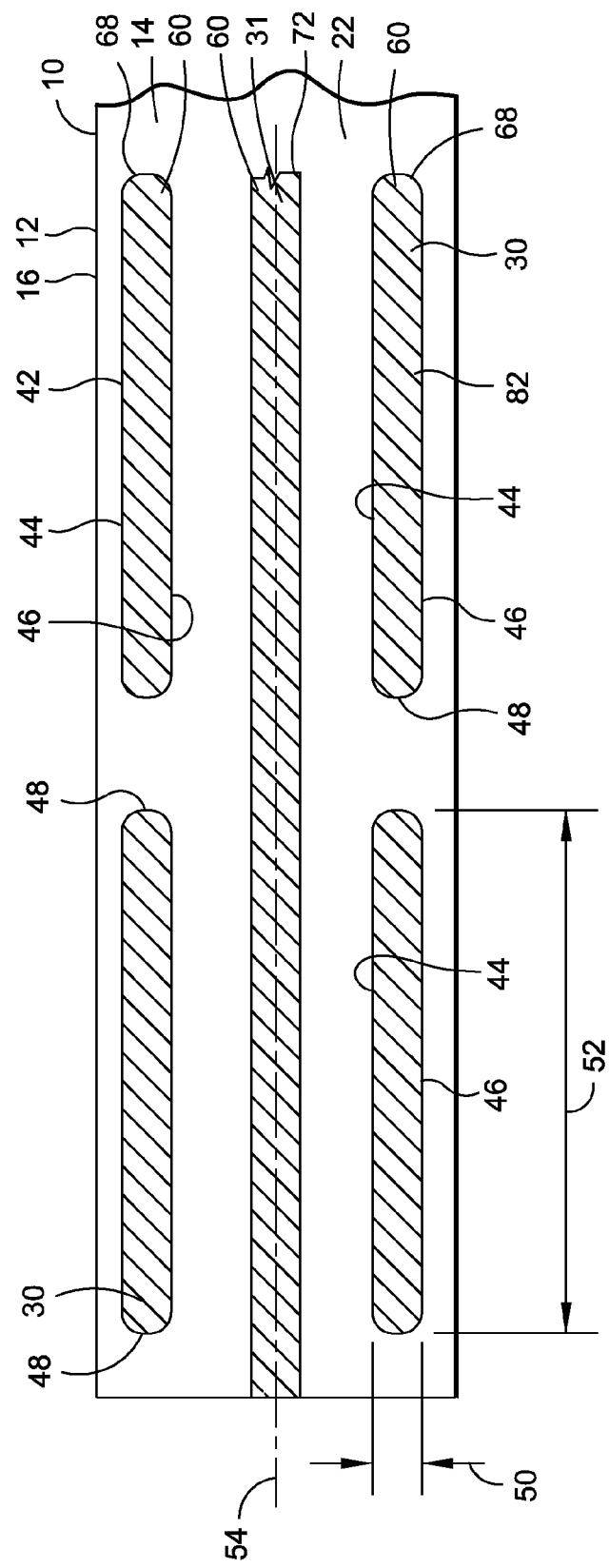
FIG. 4 is an enlarged sectional illustration of a composite structure similar to that which is illustrated in FIG. 3 and illustrating an embodiment of the fibers having a generally elongated cross-sectional shape.

Although the composite structure 10 is illustrated in FIG. 3 as having three layers 60 of fibers 30, any number of layers 60 may be provided. For example, the composite structure 10 may contain a single layer 60 of fibers 30 or tens or hundreds of layers 60. In any of the embodiments disclosed herein, the fibers 30 in one or more of the layers 60 may be arranged to be in contacting or non-contacting relation with the fibers 30 of adjacent layers 60. For example, the matrix 22 may hold the fibers 30 in non-contacting relation to one another. However, in some embodiments, the layers 60 of fibers 30 arranged in non-contacting relation with the exception of the coupling of the fibers 30 at the connection sites 80 as illustrated in FIGS. 2 and 3 and illustrated in alternative embodiments in FIGS. 5-9 as discussed below. For example, FIGS. 3-4 schematically illustrate in an exaggerated manner the layers 60 spaced apart so that the fibers 30 are in non-contacting relation to one another. However, the layers 60 may be arranged to be in generally contacting relation to one another in a matrix 22. Some of the fibers may be in contact with one another at some location along the length of the fibers 30, and at other locations, there may be a relatively thin film of matrix 22 between the layers 60. The spacing between the layers 60 is dependent in part upon the thickness of the matrix 22 surrounding or coating each fiber 30. For example, the fibers 30 may be provided as prepreg fibers 30 having a coating of matrix 22 surrounding the fiber 30.

During fabrication of the composite structure 10 in a process well known in the art, the fibers 30 may be laid on top of one another in layers 60 and may be heated to soften and allow intermingling of the matrix 22 between the adjacent fibers 30, after which the composite structure 10 is cooled to solidify the matrix 22 and resulting in the finished composite structure 10. The thickness of the matrix 22 on each fiber 30 will determine the spacing between the layers 60 of fibers 30. During the design of the composite structure 10, the matrix 22 coating thickness on the fibers 30 can be selected to achieve a desired fiber-volume fraction of the composite structure 10, as known in the art. A composite structure 10 with layers 60 spaced relatively far apart will have fewer total fibers 30 and therefore a lower total volume of fibers 30 (i.e., a lower fiber-volume fraction) than a composite structure 10 with layers 60 spaced closer together. In this regard, the fiber-volume fraction represents the total volume of fibers 30 in the cured composite structure 10 relative to the total volume of the cured composite structure 10.

A cured composite structure 10 with a relatively high fiber-volume fraction may have higher specific strength and/or higher specific stiffness than a cured composite structure 10 with a lower fiber-volume fraction. Therefore, as is well known in the art, for some applications, it may be desirable to design and fabricate the composite structure 10 to have a relatively high fiber-volume fraction. In some examples, the fiber-volume fraction of a composite structure 10 may be in the range of from approximately 50-70 percent although a higher fiber-volume fraction may be achievable. However, the composite structure 10 must typically include enough matrix 22 material to hold the fibers 30 in position relative to one another during the life of the composite structure 10 such that a fiber-volume fraction of 100 percent (i.e., the composite structure 10 contains no matrix 22) is typically undesirable. It should be noted that the specific strength and specific stiffness that may be desired in a composite structure 10 may be different for different applications. In addition, as is well known in the art, the fiber-volume fraction of a composite structure 10, and whether the layers 60 are in contacting or non-contacting relation, may be based upon manufacturing considerations, weight considerations, cost considerations, and a variety of other considerations.

Referring to FIG. 4, shown is a cross-sectional illustration of a composite structure 10 similar to that which is illustrated in FIG. 3 and illustrating an embodiment of the arrangement of the fibers 30 in three (3) layers 60 within the matrix 22. In FIG. 4, the middle fiber located between the upper and lower layers 60 is indicated by reference numeral 31. As can be seen in FIG. 4, the two fibers 30 in the upper layer 60 and in the lower layer 60 may be provided with an elongated cross-sectional shape having relatively flattened or substantially planar fiber 30 faces, e.g., upper and lower surfaces 44 and 46, to minimize scattering of light that may otherwise occur when light strikes or passes through a curved surface. The middle fiber in FIG. 4 is shown in side view in correspondence to the orientation of the fibers 30, 31 in FIG. 3 from which FIG. 4 is taken.

Advantageously, the substantially planar configuration of the fiber 30 upper and lower surfaces 44, 46 reduces optical distortion of the composite structure 10. For example where the composite structure 10 is a transparency such as a window of a building or a vehicle, the reduction in optical distortion may improve optical clarity of objects observed through the composite structure 10. The generally elongated cross-sectional shape of the fibers 30 is preferably provided with a relatively high aspect ratio which may be defined as the ratio of the fiber width 52 to fiber thickness 50. In any of the embodiments disclosed herein, the fibers 30 may be provided with an elongated cross-sectional shape having relatively flattened or substantially planar fiber faces and wherein the fibers have an aspect ratio may vary from approximately 3 to approximately 500 although the fiber 30 cross section may be provided in any aspect ratio. Furthermore, the fiber thickness 50 may be provided in any suitable thickness. In any of the embodiments disclosed herein, the thickness of the fiber 30 may be in the range of from approximately 5 microns to approximately 5,000 microns (e.g., 0.0002 to 0.20 inch). However, the fiber 30 may be provided in any fiber thickness 50, without limitation.

Referring still to FIG. 4, the elongated cross-sectional shape of a fiber 30 may include the pair of substantially planar fiber 30 faces (i.e., upper and lower surfaces 44, 46) which are preferably oriented to be substantially parallel to the structure surface 12 of the composite structure 10. However, in any of the embodiments disclosed herein, the fibers 30 may be embedded and oriented within the matrix 22 such that the fiber 30 faces are arranged in any orientation relative to the structure surface 12. Although illustrated as being substantially planar, the fiber 30 faces may be slightly curved including slightly concave, slightly convex or crowned and are not limited to a strictly substantially planar or flat profile. Even further, it is contemplated that the fiber 30 faces may include one or more surface features (not shown) on one or more of the fiber 30 faces and are not limited to the strictly rectangular elongated cross-sectional shape illustrated in FIG. 4.

FIG. 4 schematically illustrates a cross-section of the composite structure 10 of FIG. 3. As indicated above, the fibers in the composite structure 10 of FIG. 3 are in a cross-ply configuration 72 as known in the art wherein the lengthwise direction of the fibers 30 in each layer 60 are oriented perpendicular to the lengthwise direction of the fibers 30 in the adjacent layers 60. In this regard, FIG. 4 shows a cross-section of the fibers 30 in the upper, middle, and lower layers 60 taken along line 4 of FIG. 3. In the upper layer 60 of FIG. 4, the cross-section is perpendicular to the lengthwise direction of the fibers 30 in the upper layer 60. In the middle layer 60 of FIG. 4, the cross-section of the fiber 31 is parallel to the lengthwise direction of the fiber 31 in the middle layer 60. In the lower layer 60 of FIG. 4, the cross-section is perpendicular to the lengthwise direction of the fibers 30 in the lower layer 60.

In the upper and lower layers 60, the side edges 48 of adjacent fibers 30 are shown spaced apart from one another. However, in an embodiment not shown, the fibers 30 in a layer 60 may be arranged such that a side edges 48 of a fiber 30 are placed in contacting relation with the side edges 48 of an adjacent one of the fibers 30 (e.g., see FIGS. 35-36). However, as stated above, the fibers 30 may be arranged in any desirable spacing and are not limited to the fiber 30 spacing illustrated in FIG. 4.

Figure 5:
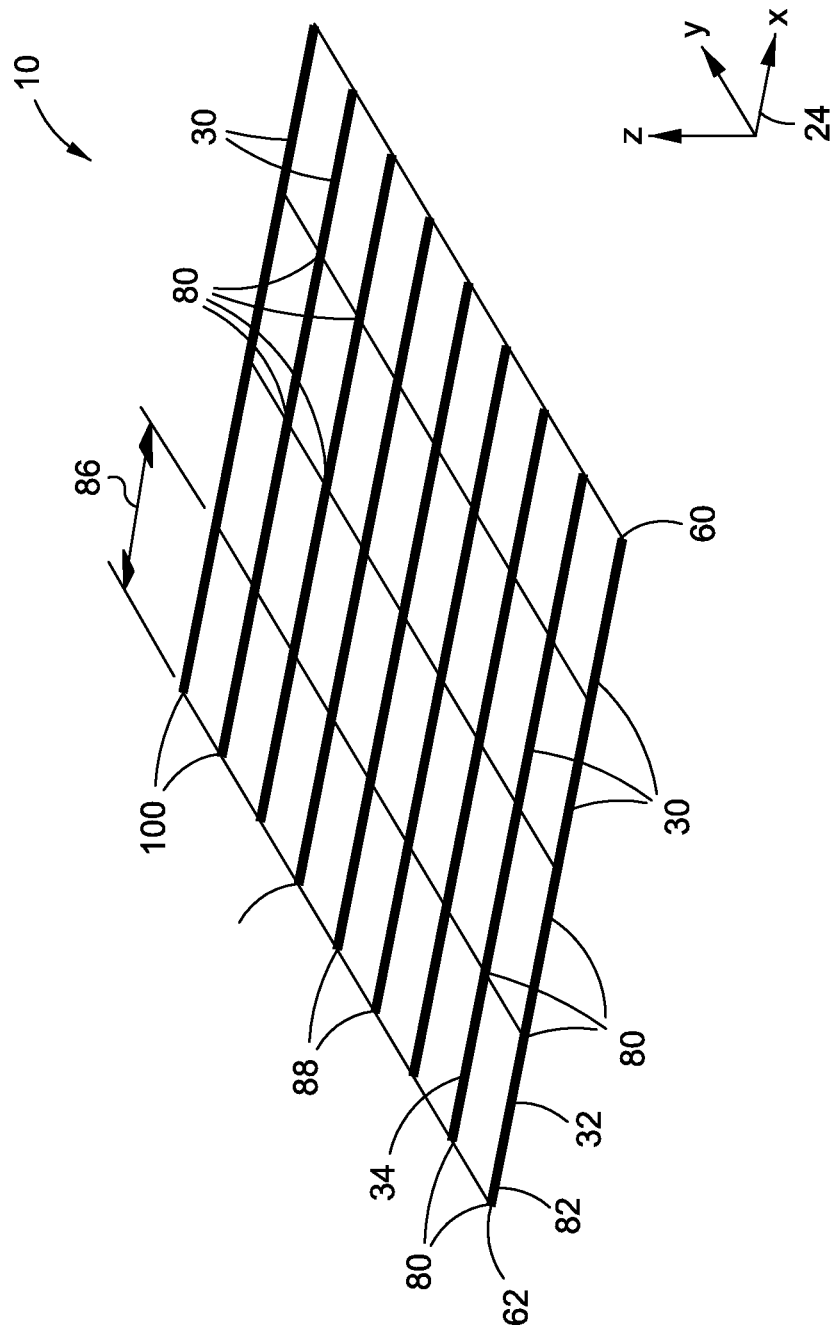
FIG. 5 is a schematic illustration of a single layer of fibers connected to one another at a plurality of connection sites and representing in-plane adjacent fiber coupling.

Referring now to FIG. 5, shown is a schematic illustration of a layer 60 of parallel fibers 30 separated from one another. In this regard, FIG. 5 schematically illustrates connection sites 80 coupling the fibers 30 in an in-plane coupling 82 arrangement, similar to the in-plane coupling 82 arrangement illustrated in FIG. 2. The fibers 30 are illustrated in relatively heavy line weight and may be selectively coupled at connection sites 80, which are illustrated in relatively lighter line weights compared to the line weights representing the fibers 30. The arrangement of fibers 30 in FIG. 5 represents a single layer 60 wherein the fibers 30 may be connected to one another at at least one connection site 80.

The fibers 30 illustrated in FIG. 5 may be selectively coupled to one another at the connection sites 80 using a connection type 88 which may have connection qualities 100 as described in detail below, to provide the desired response of the composite structure 10 during an impact event. More specifically, FIG. 5 illustrates a first fiber 32 and a second fiber 34 of the plurality of fibers 30 which may be connected to one another at a plurality of connection sites 80. In any of the embodiments disclosed herein, the connection sites 80 may be distributed in a variety of arrangements along the lengths of the fibers 30. For example, FIG. 5 illustrates a relatively uniform spacing 86 of the connection sites 80 along the length of the fibers 30. However, the connection sites 80 connecting the adjacent fibers 30 may be spaced at a predetermined periodicity along the length of the fibers 30 as described in greater detail below.

The first and second fibers 32, 34 may be connected to one another at a plurality of the connection sites 80 by adhesive bonding, fusing, and/or mechanical pinning or other suitable connection types 88. Adhesive bonding may comprise bonding the fibers 30 at the connection sites 80 using a suitable adhesive such as epoxy to directly bond the fibers 30 to one another at the connection sites 80. However, other suitable adhesives may be used to bond the fibers 30 together at the connection sites 80. In another embodiment, the connection type 88 may comprise fusing or welding the fibers 30 together at the connection sites 80. For example, the fibers 30 may be locally heated above the glass transition temperature or melt temperature of the fibers 30 or fiber coating in order to fuse or weld the fibers 30 together. In some embodiment, the side edges 48 (FIG. 4) of the fibers 30 in a layer 60 may be placed in contacting relation to the side edges 48 of adjacent fibers 30 in the same layer 60. The side edges 48 may be locally heated to locally fuse or weld the fibers 30 together to form a connection site 80. In a further embodiment illustrated in FIG. 31-33, the fibers 30 may be provided as core-sheath fibers 56 which may be described as having a core 57 surrounded by a fusible sheath 58 formed of fusible material. A fusible sheath 58 is fusible in the sense the fusible sheaths 58 of two core-sheath fibers 56 may be placed in contact with one another at at least one location and the fusible sheaths 58 may be locally heated at the location of contact to melt and fuse together the fusible sheaths 58 at that location. The fusible sheath 58 may be formed of any material, without limitation, including metallic material, ceramic material, composite material (e.g., epoxy, thermoplastic material, etc.). For example, the fusible sheath 58 may be formed of thermoplastic material which may be thermoplastically fused to the fusible sheath 58 of another fiber 30 at a connection site 80, as described in greater detail below.

Referring still to FIG. 5, in a further embodiment, the fibers 30 may be locally mechanically coupled by mechanical pinning. For example, surface features for mechanically coupling the fibers 30 together at the connection sites 80 may be introduced onto the side edges 48 (FIG. 4) of the fibers 30 to couple the fibers 30 together. In this regard, any suitable portion of the fibers 30 may be mechanically coupled together at the connection site 80. In a non-limiting embodiment, the mechanical pinning may comprise increasing the surface roughness at a local point along the fibers 30 to reduce or prevent relative axial movement of the fibers 30. In a further embodiment, notches (not shown), scallops (not shown) or other features may be applied to the fiber surfaces 42 (FIG. 4) to mechanically pin the fibers 30 together and restrict or resist relative axial movement of the fibers 30 relative to one another. The coupling or connection between the fibers 30 may limit the degree of relative movement of the fibers 30. More specifically, the connection of the fibers 30 to one another at the connection sites 80 may limit the degree of movement of the fibers 30 relative to one another and/or limit the movement of the fibers 30 relative to the matrix 22.

The selection of the connection type 88 may be based upon the desired degree of connectivity. For example, a connection type 88 may be selected to provide a connection failure strain that may be lower than the failure strain of the matrix 22 to limit the amount of movement of the fibers 30 relative to one another. In the context of the present disclosure, strain comprises failure strain which represents the strain at which the connection between fibers 30 fails or breaks. In addition, in the context of any one of the embodiments disclosed herein, properties such as strength, strain, and elastic modulus are in terms of dynamic properties and/or quasi-static properties. Connection quality 100 may be represented as the connection strength, connection failure strain, and the elastic modulus at a connection site 80. Connection strength may represent the magnitude of the force required to break the connection at a connection site 80 between fibers. Connection strength may be characterized in terms of absolute value or relative value. For example, absolute value of the connection strength at a connection site 80 may be characterized in terms of pounds of force required to break a connection between two fibers 30. Connection strength may also be characterized in relative terms as a percentage of the strength of the matrix material within the composite structure 10. Connection failure strain may represent the strain at which the connection between fibers 30 fails or breaks, and may be characterized as a percentage (plus or minus) of the failure strain of the matrix 22 as discussed above. Elastic modulus of a connection site 80 may be described as the tensile modulus or Young's modulus of the connection site 80 and may be characterized as the relative stiffness or tendency of a connection between fibers 30 to stretch when a force is applied.

In an arrangement wherein the connection type 88 comprises a relatively low connection strain, a relatively strong interaction may occur between the coupled fibers 30 during an impact event. In an embodiment, the connection between the fibers 30 may be characterized as a connection having a failure strain that differs by at least approximately 25% relative to the failure strain of the matrix 22. For example, the connection may have a failure strain that is at least 25% higher than the failure strain of the matrix 22. Alternatively, the connection may have a failure strain that is at least 25% lower than the failure strain of the matrix 22. However, the connection may include a failure strain comprising any percentage of the failure strain of the matrix 22.

In addition, the connection between fibers 30 such as the first and second fibers 32, 34 illustrated in FIG. 5 may be defined by a connection strength relative to the tensile strength of the matrix 22. In any one of the embodiments disclosed herein, the connection strength between the fibers 30 may be characterized as a connection having a tensile strength that differs by at least approximately 25% relative to the tensile strength of the matrix 22. For example, the connection strength may be 25% higher than the tensile strength of the matrix 22. Alternatively, the connection strength may be 25% lower than the tensile strength of the matrix 22. However, the connection strength may include a tensile strength comprising any percentage of the tensile strength of the matrix 22 and is not limited to a connection strength that differs by at least approximately 25% relative to the tensile strength of the matrix 22.

FIG. 5 illustrates the coupling of fibers 30 in an in-plane coupling 82 configuration wherein the fibers 30 that are coupled are located immediately adjacent to one another in the same layer 60. In this regard, although the Figures generally illustrate coupling of adjacent fibers 30, it is contemplated that coupling of the fibers 30 may include coupling of non-adjacent fibers 30. As can be seen in FIG. 5, a first layer 62 includes first and second fibers 32, 34 that are located adjacent to one another and are coupled to one another at connection sites 80. In the present application, the first layer 62 may designate any layer 60 with a layer stack 66 of a composite structure 10 and may include an outermost layer 60 (e.g., a top layer 60 or a bottom layer 60) of a layer stack 66 or an internal layer 60 within a layer stack 66. In any embodiment disclosed herein, the connection sites 80 may be spaced at any desired interval including a pattern or periodicity of spacing 86. Such a pattern or periodicity of spacing 86 may facilitate manufacturing of the fibers 30 and/or composite structure 10. However, the spacing 86 of the connection sites 80 in any of the figures may be random or a combination of random and periodic spacing 86 of the connection sites 80 and which may vary in any desired manner in order to achieve a desired failure response of any given portion of the composite structure 10 as described in greater detail below. In addition, the connection sites 80 connecting fibers 30 in a given layer 60 may be arranged in a global connection site pattern 110 as illustrated in the non-limiting examples of FIGS. 24-33 and as described in greater detail below.

Referring still to FIG. 5, the in-plane coupling 82 of the fibers 30 may generally define a planar layer 60 of the fibers 30 which may be described as being generally parallel to the x-y plane of a reference coordinate system 24 as illustrated in FIG. 5. Out-of-plane coupling 84 as illustrated in FIGS. 6-9 may comprise coupling that is non-coincident with the x-y plane such as coupling oriented generally along the z-axis of the reference coordinate system 24. However, out-of-plane coupling 84 may include coupling at any angle relative to the x-y plane including, but not limited to, the out-of-plane coupling 84 illustrated in FIG. 9.

Figure 6:
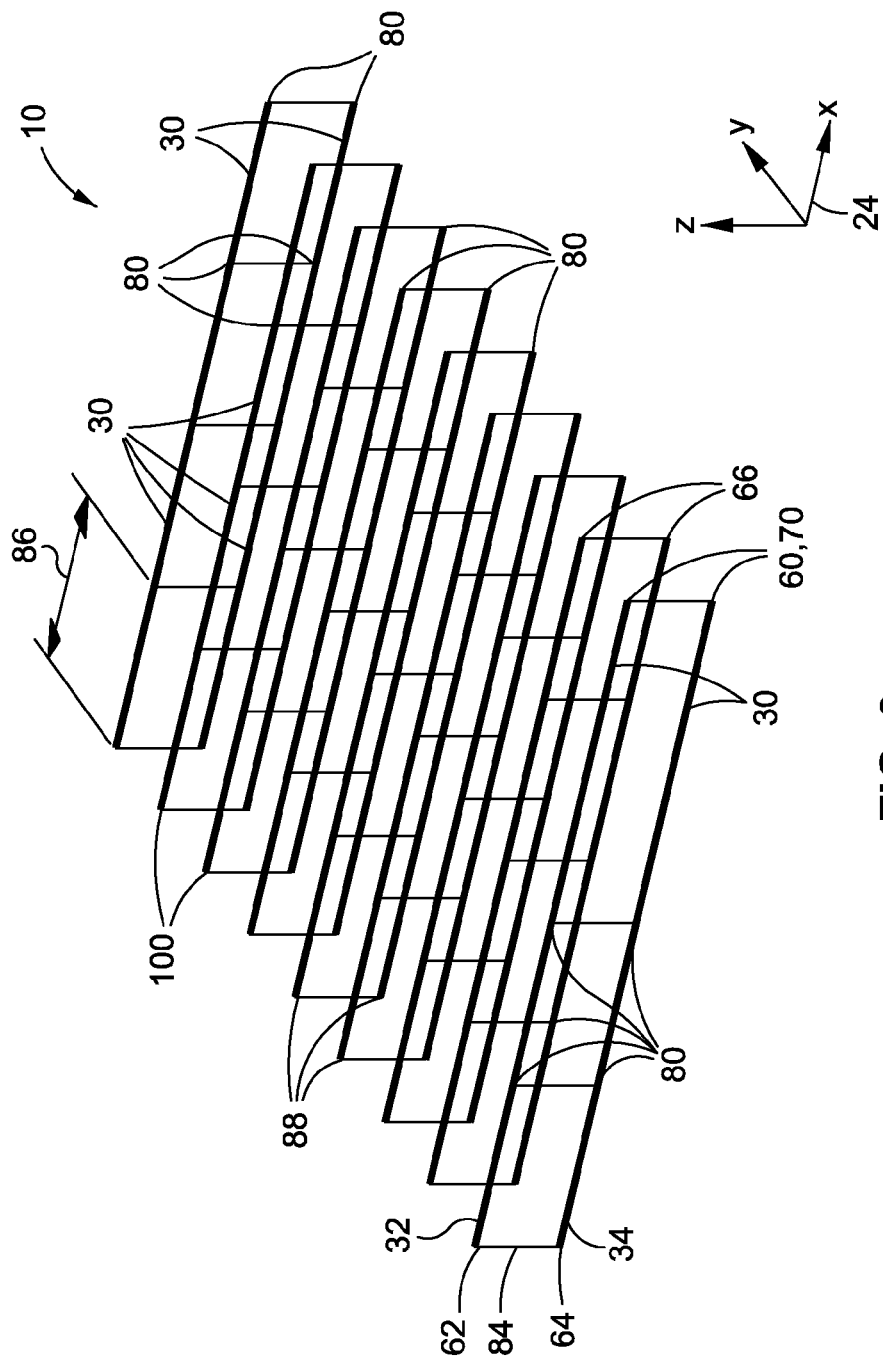
FIG. 6 is a schematic illustration of the fibers wherein the layers are arranged in a unidirectional configuration and wherein the fibers are connected at a plurality of connection sites across the layers representing out-of-plane adjacent fiber coupling in a unidirectional configuration of the composite article.

FIG. 6 illustrates an out-of-plane coupling 84 of fibers 30 using the connection sites 80. More specifically, FIG. 6 illustrates a first layer 62 and a second layer 64 each including a plurality of fibers 30. In the present application, the first layer 62 may designate any layer 60 with a layer stack 66 of a composite structure 10, as indicated above. Likewise, the second layer 64 may designate any layer 60 with a layer stack 66 of a composite structure 10, and may include the two (2) outermost layers 60 (e.g., the two top layers 60 or the two bottom layers 60) of a layer stack 66, or two (2) internal layers 60 within the layer stack 66. In FIG. 6, the first layer 62 may include a first fiber 32. The second layer 64 may include a second fiber 34. The first fiber 32 of the first layer 62 may be located adjacent to the second fiber 34 of the second layer 64. As can be seen in FIG. 6, each one of the first and second layers 62, 64 includes a plurality of the fibers 30 which are each oriented substantially parallel to one another such that the arrangement in FIG. 6 forms a unidirectional configuration 70 of layers 60.

In FIG. 6, the fibers 30 in each one of the layers 60 may be generally aligned with one another in order to facilitate out-of-plane coupling 84 wherein the adjacently-disposed fibers 30 are connected at the connection sites 80 along a direction which may be parallel to the z-axis of the reference coordinate system 24 illustrated in FIG. 6. Although the connection sites 80 in FIG. 6 are illustrated as being arranged in a uniform spacing, the connection sites 80 may be spaced at any one of a variety of different spacing 86 arrangements. For example, the connection sites 80 may be spaced at a predetermined periodicity along the length of the fibers 30. The periodicity for the spacing 86 of the connection sites 80 may comprise a substantially uniform spacing 86 as illustrated in FIGS. 5 and 6. However, the periodicity may comprise a geometrically varying or progressing (i.e., progressively increasing or decreasing) spacing along the length of the fibers 30. The connection sites 80 may be spaced in a variety of other arrangements including random spacing or a sinusoidal periodicity of the spacing or other suitable spacing arrangements which may be tailored for the application.

Figure 7:
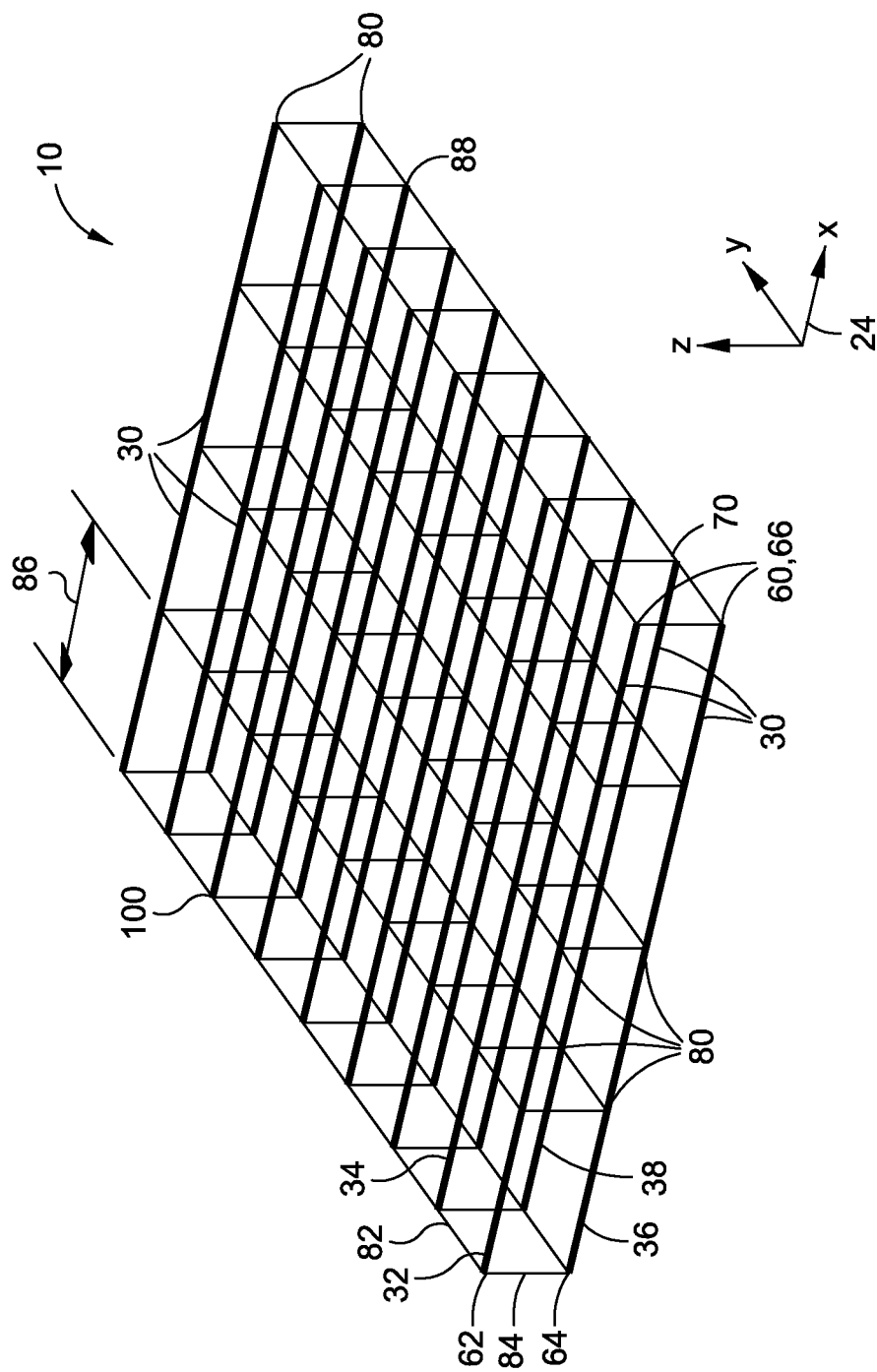
FIG. 7 is a schematic illustration of a pair of layers of fibers arranged in a unidirectional configuration and illustrating a plurality of connection sites connecting the adjacent fibers and representing in-plane and out-of-plane adjacent fiber coupling in a unidirectional configuration of the composite article.

Referring now to FIG. 7, shown is a further embodiment of a configuration for selectively coupling fibers 30 and which combines the in-plane coupling 82 configuration illustrated in FIG. 5 with the out-of-plane coupling 84 configuration illustrated in FIG. 6. For example, FIG. 7 illustrates an arrangement wherein a first layer 62 includes first and second fibers 32, 34 and a second layer 64 includes third and fourth fibers 36, 38. The third and fourth fibers 36, 38 are oriented substantially parallel to the first and second fibers 32, 34. In this regard, the fibers 30 in each one of the first and second layers 62, 64 may be oriented substantially parallel to one another such that FIG. 7 illustrates a unidirectional configuration 70 of the layers 60. FIG. 7 illustrates in-plane coupling 82 wherein the first and second fibers 32, 34 in the first layer 62 are illustrated as being interconnected at a plurality of the connection sites 80. Likewise, the third and fourth fibers 36, 38 in the second layer 64 are illustrated as being interconnected at a plurality of the connection sites 80.

In FIG. 7, out-of-plane coupling 84 is provided by connecting the first fiber 32 in the first layer 62 with the third fiber 36 in the second layer 64 and connecting the second fiber 34 in the first layer 62 with the fourth fiber 38 in the second layer 64 using one or more connection sites 80. FIG. 7 illustrates coupling of fibers 30 which are disposed immediately adjacent to one another. However, the present disclosure contemplates coupling of non-adjacent fibers 30. Furthermore, FIG. 7 illustrates coupling of fibers 30 in the first layer 62 which are aligned with fibers 30 in the second layer 64. However, it is contemplated that the fibers 30 in different layers 60 may not necessarily be vertically aligned with one another but may be horizontally offset (i.e., relative to the y-axis).

Figure 8:
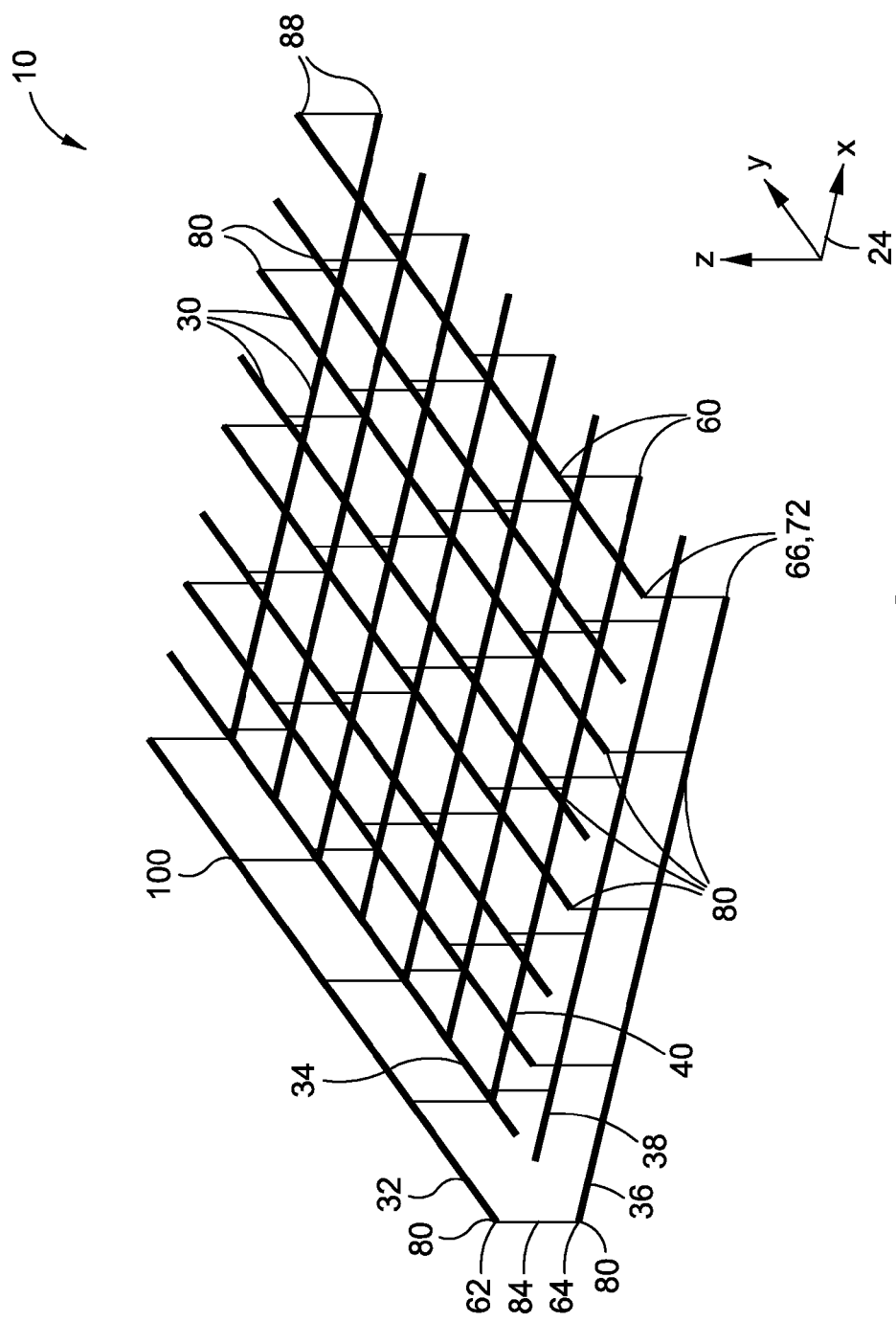
FIG. 8 is a schematic illustration of a pair of layers of fibers arranged in a cross-ply configuration and illustrating a plurality of connection sites connecting the fibers across the layers in a staggered arrangement representing out-of-plane adjacent fiber coupling in a cross-ply configuration of a composite article.

Referring to FIG. 8, shown is an arrangement illustrating fiber 30 coupling for a cross-ply configuration 72 of the layers 60. FIG. 8 illustrates out-of-plane coupling 84 of the fibers 30 in one layer 60 to the fibers 30 in another layer 60. For example, in FIG. 8, shown is a first layer 62 which includes first and second fibers 32, 34 which are located immediately adjacent to one another. As can be seen, the fibers 30 in the first layer 62 are substantially parallel to one another. A second layer 64 in FIG. 8 includes third, fourth and fifth fibers 36, 38, 40 which are also oriented substantially parallel to one another but which are oriented substantially perpendicularly relative to the first and second fibers 32, 34. In this regard, the first and second layers 62, 64 illustrate a cross-ply configuration 72 of the layers 60 as implemented in the composite structure 10 illustrated in FIGS. 2 and 3.

Referring still to FIG. 8, it can be seen that the third and fifth fibers 36, 40 are located immediately adjacent to the fourth fiber 38 and are located on opposite sides of the fourth fiber 38. Out-of-plane coupling 84 of the first and second layers 62, 64 may be facilitated by connecting the first fiber 32 to each one of the third and fifth fibers 36, 40 at the noted connection sites 80 which may be at the approximate location of the shortest distance between the first fiber 32 and the third and fifth fibers 36, 40. Likewise, the second fiber 34 may be coupled to the fourth fiber 38 at a connection site 80 located approximately at the shortest distance between the second fiber 34 and the fourth fiber 38. The arrangement illustrated in FIG. 8 represents out-of-plane coupling 84 of the fibers 30 in a staggered arrangement. Although FIG. 8 illustrates a cross-ply arrangement wherein the fibers 30 of one layer 60 are oriented generally perpendicular to the fibers 30 of an adjacent layer 60, a cross-ply arrangement for any embodiment disclosed herein may include fibers 30 in one or more layers 60 being oriented in a non-parallel angle (i.e., 15°, 22.5°, 45°, 60°, 75°, etc.) relative to the fibers of any other layer 60 in the composite structure 10.

Figure 9:
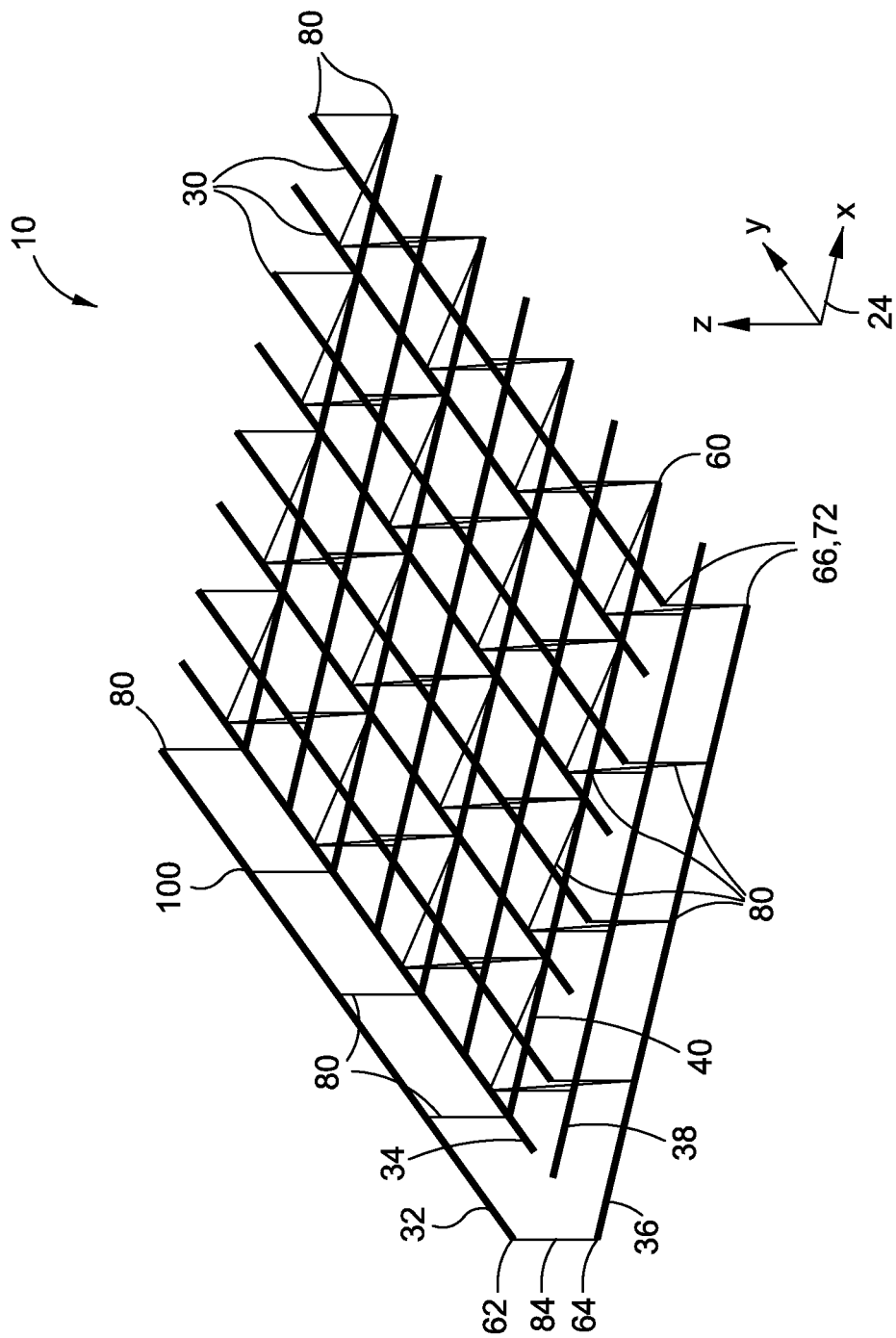
FIG. 9 is a schematic illustration of a pair of layers of fibers arranged in a cross-ply configuration and illustrating a plurality of connection sites connecting the fibers across the layers and representing coupling of the fibers in one layer with adjacent and non-adjacent fibers in an adjacent layer in a cross-ply configuration of the composite article.

Referring to FIG. 9, shown is a variation of the embodiment illustrated in FIG. 8 and wherein FIG. 9 illustrates out-of-plane coupling 84 of the first layer 62 with the adjacent fibers 30 in the second layer 64. FIG. 9 additionally illustrates staggered out-of-plane coupling 84 of non-adjacent fibers 30. For example, FIG. 9 illustrates the second fiber 34 being further connected or coupled to the third and fifth fibers 36, 40 at the location of the connection sites 80 where the third and fifth fibers 36, 40 are connected to the first fiber 32. In this regard, FIG. 9 illustrates coupling of multiple fibers 30 at a single connection site 80 which may provide improved or stronger interaction between the coupled fibers 30 relative to fiber 30 coupling having only a single connection at a single connection site 80.

FIGS. 5-9 illustrate configurations for coupling fibers 30 in different layers 60 to achieve a desired response in the composite structure 10 such as to an impact event. For example, FIGS. 5-9 illustrate in-plane coupling 82, out-of-plane coupling 84 and combinations of in-plane coupling 82 and out-of-plane coupling 84 for adjacent and non-adjacent fibers 30 and for unidirectional configurations 70 and cross-ply configurations 72. However, as was earlier indicated, the fibers 30 of one layer 60 may be arranged at any orientation relative to the fibers 30 of adjacent layers 60 including any non-perpendicular orientation relative to the fibers 30 of adjacent layers 60 and are not limited to unidirectional configurations 70 and cross-ply configurations 72.

For any one of the embodiments disclosed herein, the fibers 30 and/or the matrix 22 may be comprised of any substantially optically-transparent material and/or infrared-transparent material. Optical transparency may include transparency in the visible spectrum. Infrared transparency may include transparency in the infrared spectrum. However, for applications where optical transparency of the composite structure 10 is undesirable, the fiber 30 and matrix 22 may be comprised of materials providing reduced optical transparency including, but not limited to, substantially opaque materials. In this regard, the fiber 30 and matrix 22 may be comprised of materials having any desired level of transparency between substantially transparent and substantially opaque in the optical and/or infrared spectrum. In an embodiment, the matrix 22 and/or fibers 30 may be formed of thermoplastic material which may comprise at least one of the following materials: fluorocarbons, polyamides, polyethylenes, polyesters, polypropylenes, polycarbonates, polyurethanes, polyetheretherketone, polyetherketoneketone, polyetherimide, polyethylene terephthalate, and polyoxymethylene. In addition, the matrix 22 and/or fibers 30 may be formed of any suitable thermoset material including, but not limited to, polyurethanes, phenolics, polyimides, bismaleimides, polyesters, and epoxies. Even further, the matrix 22 and/or the fibers 30 may be formed of glasses or glass material comprising E-glass (i.e., alumino-borosilicate glass), S-glass (i.e., alumino silicate glass), pure silica, borosilicate glass, optical glass and other suitable glasses. The fibers 30 and/or the matrix 22 may also be formed of inorganic materials including, but not limited to, carbons, silicon carbide, and boron. The fibers 30 may additionally be formed of metallic materials including, but not limited to, steel, titanium, copper, aluminum, and other metallic materials or metal alloys. The matrix 22 and/or fibers 30 may also be formed of ceramic materials.

Figure 10:
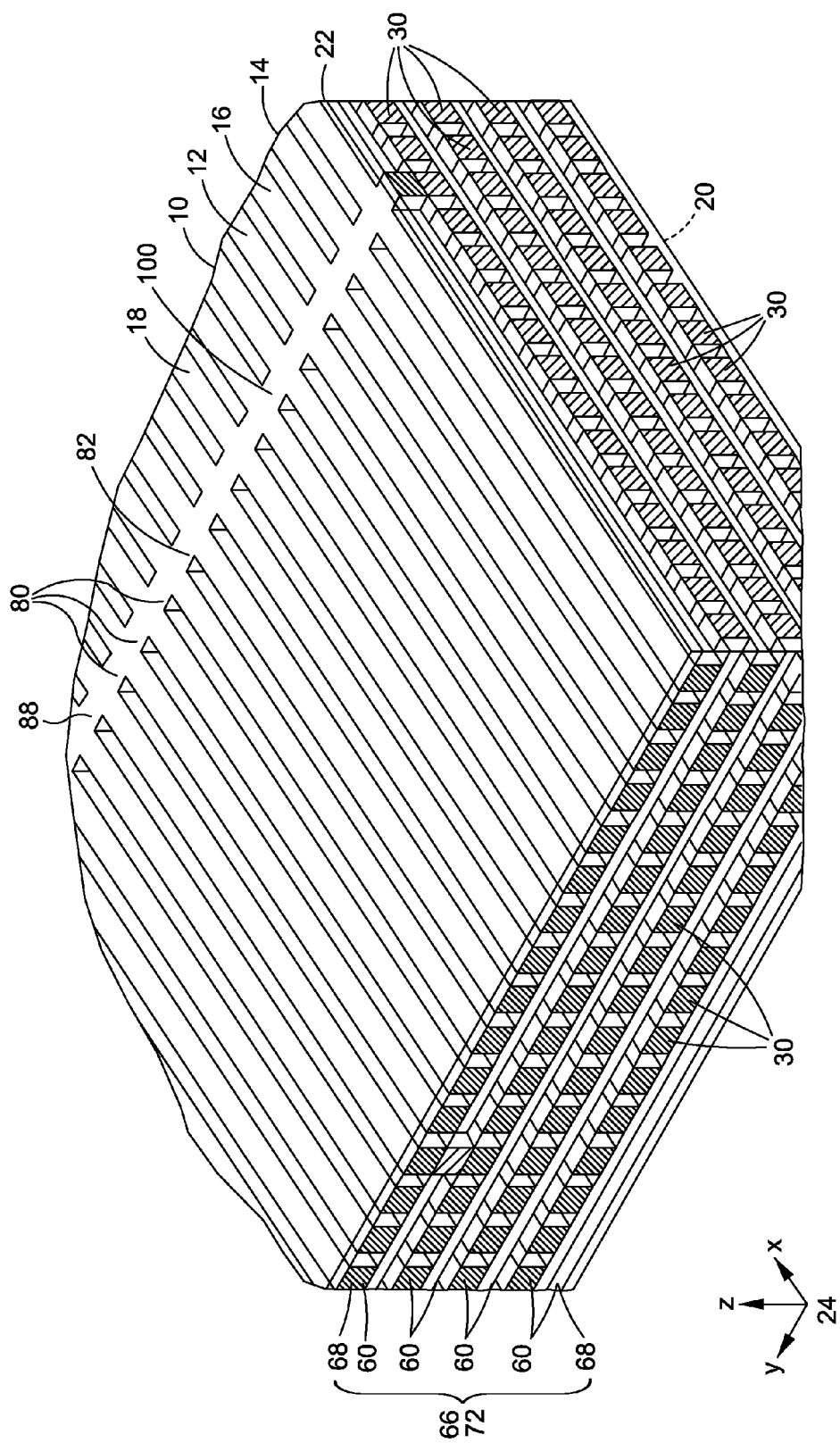
FIG. 10 is an illustration of a composite structure including a plurality of layers and illustrating an outermost layer of fibers connected with a plurality of connection sites in an in-plane configuration.

Referring to FIG. 10, shown is an illustration of a composite structure 10 having a plurality of layers 60 arranged in a cross-ply configuration 72. The composite structure 10 illustrated in FIG. 10 includes a stack 66 of layers 60 having an outermost layer 68 located on an uppermost portion of the composite structure 10 and an outermost layer 68 on a lowermost side of the composite structure 10. In an embodiment, the composite structure 10 may be configured as a panel 14 for providing ballistic protection. The fibers 30 in the outermost layer 68 may be disposed immediately adjacent to a strike face 18 of the panel 14. The strike face 18 may comprise the side of the panel 14 intended or configured to receive impacts such as from a projectile. A back face 20 of the panel 14 may be located on an opposite side of the panel 14 as illustrated in FIG. 10. The outermost layers 68 are each illustrated in FIG. 10 as comprising a plurality of substantially parallel fibers 30 being coupled to one another at a plurality of connection sites 80 such that each outermost layer 68 illustrated in FIG. 10 represents in-plane coupling 82 of the fibers 30 similar to that which is schematically illustrated in FIG. 5. The layers 60 may be embedded in a suitable matrix 22. For example, the matrix 22 may comprise a resin such as an epoxy. In another non-limiting embodiment, the fibers 30 may optionally comprise metal fibers 30 embedded in a ceramic or glass matrix 22 although the fibers 30 and the matrix 22 may be formed of a variety of different materials and combinations of materials as indicated above.

Figure 11:
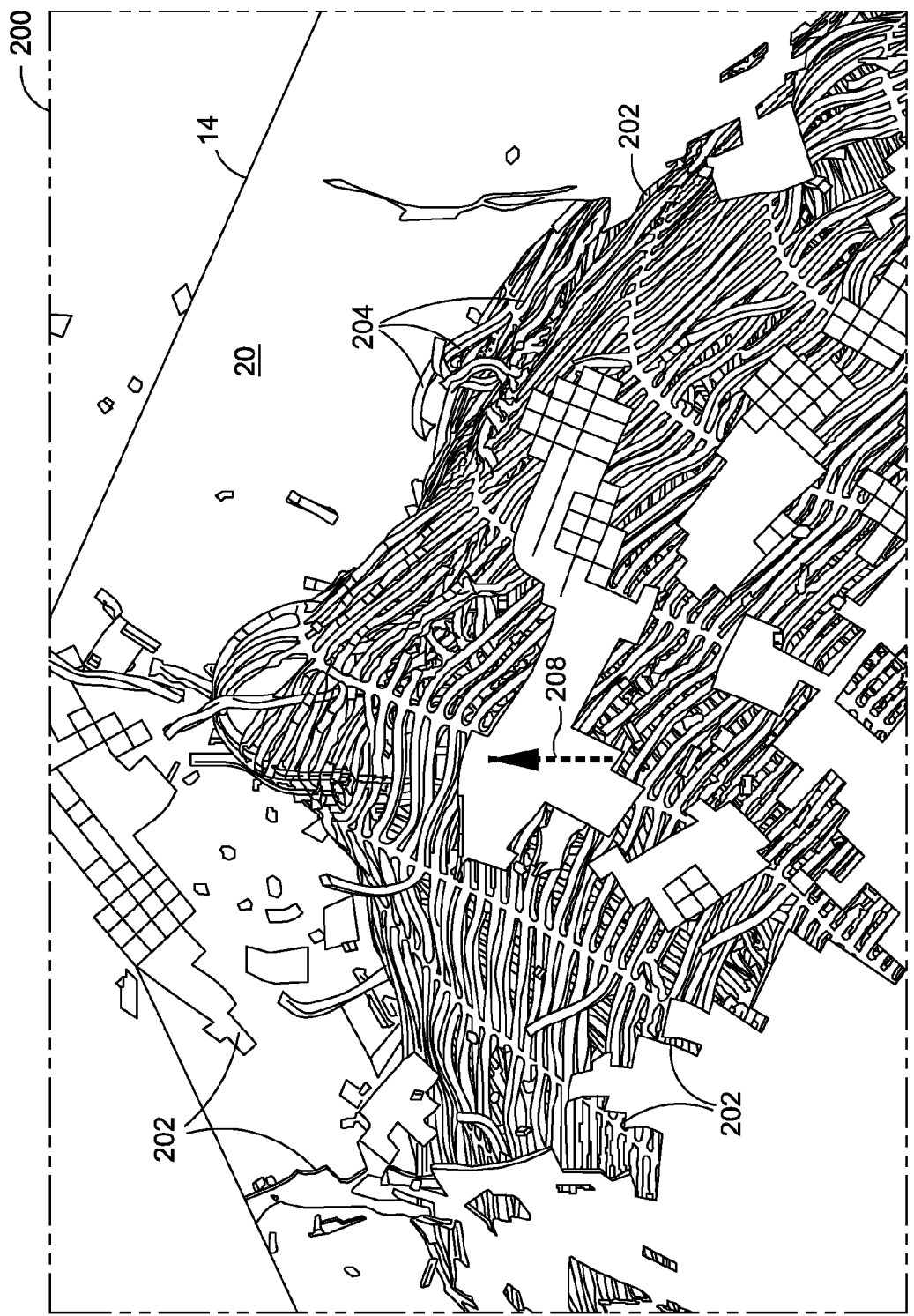
FIG. 11 is an illustration of a computer simulated impact event of a projectile impacting a composite structure and illustrating in-plane coupling of the fibers preventing wedging of the projectile between the fibers.

Referring to FIG. 11, shown is a computer simulated impact event 200 wherein a projectile moving along the direction indicated by the arrow 208 has partially passed through a panel 14 similar to the panel 14 illustrated in FIG. 10. FIG. 11 illustrates the effects of the projectile impact on the back face 20 of the panel 14. As can be seen in FIG. 11, the projectile may be decelerated and captured without completely passing through the composite structure 10 as a result of the coupling of the fibers 30 (FIGS. 5-9) at the plurality of connection sites 80 (FIGS. 5-9). Although the back face 20 is illustrated in the computer simulation as exhibiting matrix cracking 202 and fiber disbonding 204, the coupling of the fibers 30 in the outermost layer 68 (FIG. 10) of the back face 20 may prevent wedge-through of the projectile between the coupled fibers 30.

As was earlier indicated, the coupling of the fibers 30 such as the in-plane coupling 82 illustrated in FIG. 11 may be achieved by adhesive bonding, fusing, mechanical pinning and other suitable means. Furthermore, the coupling of the fiber 30 may be tuned or tailored to the environment or application for which the composite panel 14 is intended. For example, for any one of the embodiments disclosed herein, the periodicity of the connection sites 80 coupling the fibers 30 may be selected to provide the desired amount of interaction between the coupled fibers 30 during an impact event. As indicated above, connection sites 80 between fibers 30 may facilitate the interaction and/or cooperation of multiple fibers 30 which may alter load paths (e.g., the direction and/or length of the load paths) through the composite structure 10 during a ballistic impact event, and limit damage propagation through a composite structure 10 during a ballistic impact event. Furthermore, fiber 30 coupling via one or more connection sites 80 may improve and/or control interlaminar shear strength, stiffness, compression strength, fracture toughness and damage tolerance of the composite structure 10. The degree of connectivity of the fibers 30 may be selected to achieve the desired ballistic performance. For example, for any one of the embodiments disclosed herein, one or more connection sites 80 may be configured with a connection yield and/or failure strain that may be lower than the yield and/or failure strain of the matrix 22 for tying the fibers 30 together in a manner to prevent relative movement and minimizing or eliminating wedge-through of a projectile (FIG. 11). The coupling may be tailored to provide a limited amount of damage during an impact event in order to preserve the optical transparency of the non-impacted portions of the panel 14 (FIG. 11).

Figure 12:
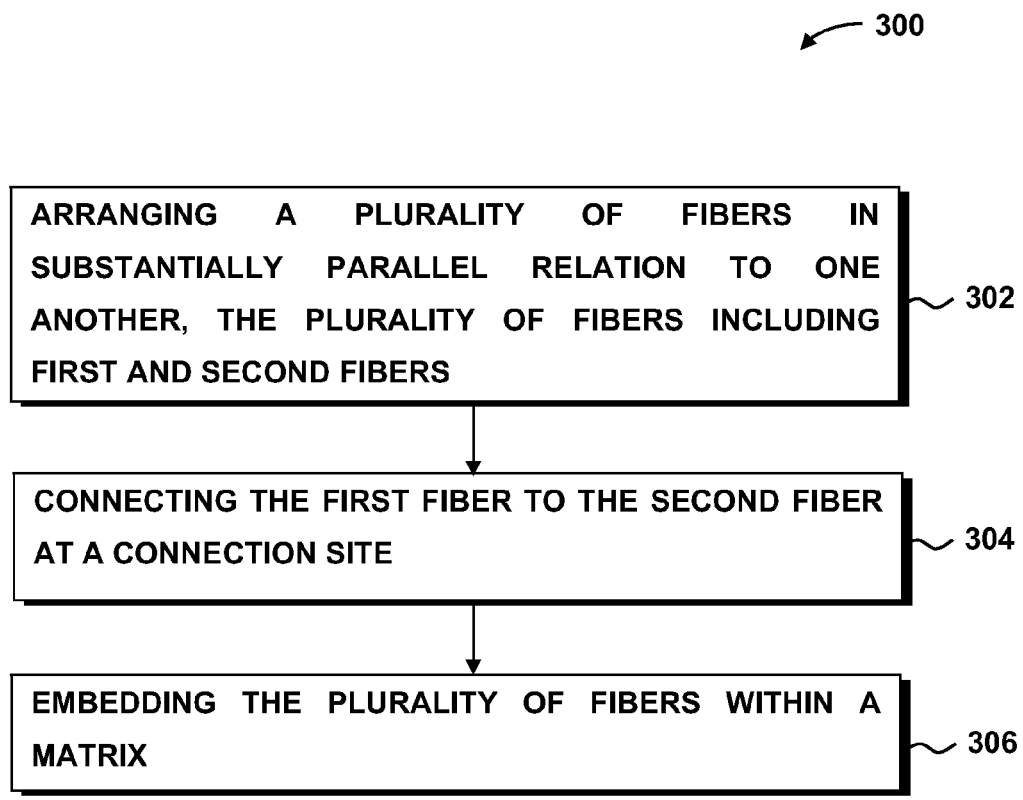
FIG. 12 is an illustration of a flow diagram of one or more operations that may be included in a methodology for manufacturing a composite structure having a plurality of connection sites.

Referring to FIG. 12, shown is an illustration of a flow diagram comprising one or more operations which may be implemented in a methodology for manufacturing a composite structure 10. Step 302 of FIG. 12 may comprise arranging a plurality of fibers 30 in substantially parallel relation to one another and wherein the fibers 30 may comprise first and second fibers 32, 34. In this regard, FIGS. 5-9 illustrate the fibers 30 in each one of the layers 60 as being oriented substantially parallel to one another. The fibers 30 in the figures are illustrated as being arranged in relatively uniform spacing 86 across the width of the layer 60. However, as was indicated above, the present disclosure contemplates non-uniform or varying spacing of the fibers 30 in order to provide a desired response to a ballistic event or to provide a desired level of optical or mechanical performance.

Referring still to FIG. 12, Step 304 of the methodology of manufacturing the composite structure 10 may comprise connecting the first fiber 32 to the second fiber 34 similar to that which is illustrated in FIG. 5. In this regard, the connection between the first fiber 32 and the second fiber 34 may be implemented at a plurality of connection sites 80. As was earlier indicated, such connection sites 80 may be achieved using one or more connection types 88 (FIG. 5) including, but not limited to, adhesive bonding (FIG. 5), fusing (FIG. 5), mechanical pinning and other means for coupling the fibers 30 at the connection sites 80.

The fibers 30 may be coupled in an in-plane 82 configuration similar to that which is illustrated in FIG. 5 wherein the first fiber 32 may be connected to a second fiber 34 of the plurality of fibers 30 in a first layer 62 and wherein the first and second fibers 32, 34 may be located adjacent to one another. Alternatively, the methodology may comprise arranging the plurality of fibers 30 in two layers 60 comprising a first layer 62 and a second layer 64 similar to that which is illustrated in FIG. 6. As can be seen in FIG. 6, the first layer 62 may include the first fiber 32 and the second layer 64 may include the second fiber 34. The methodology may include locating the first and second fibers 32, 34 adjacent to one another and connecting the first and second fibers 32, 34 at one or more connection sites 80 to provide out-of-plane coupling 84 of the fibers 30.

Step 304 of FIG. 12 may further comprise coupling the fibers 30 of a plurality of layers 60 in a combination of in-plane 82 and out-of-plane coupling 84. For example, FIG. 7 illustrates a plurality of fibers 30 in the first layer 62 and the second layer 64. The first layer 62 is illustrated as including the first and second fibers 32, 34. The third and fourth fibers 36, 38 are included in the second layer 64. The fibers 30 in the first layer 62 are parallel to the fibers 30 in the second layer 64 such that FIG. 7 illustrates a unidirectional configuration 70 of the layers 60. Step 304 may comprise connecting the third and fourth fibers 36, 38 at a plurality of connection sites 80 to provide in-plane coupling 82 at the connection sites 80. The first and second fibers 32, 34 may likewise be coupled in-plane 82 at one or more connection sites 80. Out-of-plane coupling 84 may be achieved in Step 304 by connecting the first and second fibers 32, 34 to respective ones of the third and fourth fibers 36, 38 at a plurality of connection sites 80.

In constructing the arrangement illustrated in FIG. 8, the plurality of fibers 30 in the first layer 62 may include the first and second fibers 32, 34 which may be oriented substantially parallel to one another and which may be located immediately adjacent to one another. Likewise, the second layer 64 may include the third, fourth and fifth fibers 36, 38, 40 which also may be oriented substantially parallel to one another and perpendicularly relative to the first and second fibers 32, 34 of the first layer 62. Step 304 may comprise connecting the first fiber 32 to each one of the third and fifth fibers 36, 40 at connection sites 80 located approximately at the shortest distance between the first fiber 32 and the respective ones of the third and fifth fibers 36, 40. Likewise, the second fiber 34 may be connected to the fourth fiber 38 at the connection site 80 at the location of the shortest distance across the second fiber 34 and fourth fiber 38.

In this regard, Step 304 may comprise construction of a cross-ply configuration 72 of layers 60 wherein the fibers 30 in the layers 60 are connected in a staggered, out-of-plane coupling 84 configuration. FIG. 9 represents an additional level of connection between the fibers 30 by connecting the second fiber 34 to the third and fifth fibers 36, 40 at the connection sites 80 where the first fiber 32 is connected to the third and fifth fibers 36, 40. In this regard, FIG. 9 illustrates a means for staggered adjacent and non-adjacent fiber 30 coupling in an out-of-plane 84 configuration.

The fibers 30 (FIGS. 5-9) may be connected at the connection sites 80 by a suitable connection means including, but not limited to, adhesively bonding the fibers 30 at the connection site 80 such as by localized heating of the side edges 48 (FIG. 4) or other portions of the fiber 30 to be bonded to the adjacent fibers 30 using a suitable adhesive such as an epoxy. The fibers 30 may also be connected at the connection sites 80 by fusing or welding such as by localized application of thermal energy or heat to localized portions of adjacent fibers 30. For example, the localized heating may comprise heating the fibers 30 to above the glass transition temperature or melt temperature such that the fiber 30 material at the localized areas fuses together and are then allowed to cool. In a non-limiting embodiment, the localized heating of the fibers 30 may include a heating element to locally apply heat to the connections sites 80 for locally fusing the fibers 30. Alternatively, the localized heating may comprise ultrasonically heating the fibers 30. In a further embodiment, the connection between the fibers 30 may be facilitated by mechanically pinning the fibers 30 at the connection sites 80 such as by the application of localized increased surface roughness of the fibers 30 or by forming mechanical features on the fibers 30 such as by locally deforming the fibers 30 at the locations of the connection sites 80. For example, localized notches may be formed in the fiber surfaces 42 (FIG. 4) for engaging a corresponding mechanical feature formed in an adjacent fiber 30.

The connection quality 100 (FIGS. 5-9) of a connection site 9—may also be selected to provide the desired degree of interaction between coupled fibers 30 as mentioned above. For example, the connection quality 100 may comprise a connection strain which may be a connection yield strain and/or a connection failure strain. Connection yield strain may represent the connection strain at which the connection between coupled fibers 30 or between a fiber 30 and a planar element 78 plastically deforms (e.g., non-elastically deforms). Connection failure strain may represent the strain at which the connection between coupled fibers 30 or between a fiber 30 and a planar element 78 fails or breaks. The connection quality 100 may also comprise a connection strength, and/or an elastic modulus of the connection site 80. The connection strength that may be higher than the tensile strength of the matrix 22 to provide a high degree of interaction of the coupled fibers 30 during an impact event. In an embodiment, the connection strain may be lower than the failure strain of the matrix 22. The connection quality 100 may alternatively comprise a connection strain that may be higher than the failure strain of the matrix 22 and a connection strength that may be lower than the tensile strength of the matrix 22 to provide a low degree of interaction of the coupled fibers 30 during an impact event and/or to facilitate relatively greater amounts of movement of the coupled fibers 30 relative to one another. The elastic modulus of a connection site 80 may be described as the tensile modulus or Young's modulus of the connection site 80 and may represent the relative stiffness of the connection between fibers 30 and/or between a fiber 30 and a planar element 78 as described below.

In a non-limiting embodiment, each connection site 80 (FIGS. 5-9) may include a connection quality 100 (FIGS. 5-9) and may comprise a connection yield and/or failure strain (FIGS. 5-9) that differs from the failure strain of the matrix 22 by at least approximately 25 percent and/or a connection strength (FIGS. 5-9) that differs from the tensile strength of the matrix 22 by at least approximately 25 percent. However, the connection quality 100 may comprise any desired combination of connection strain and connection strength relative to the failure strain and tensile strength of the matrix 22 to achieve a desired response of the composite structure 10. The connection quality 100 may be selected in consideration of factors including, but not limited to, environmental factors such as temperature and humidity and/or as a function of event parameters including, but not limited to, projectile velocity, mass, hardness, geometric size, cross-sectional area and other factors.

As indicated above, fibers 30 may be coupled together using connection types 88 such as adhesive bonding, chemical bonding, thermal fusing, mechanical pinning, and/or other connection types. The connection quality 100 such as the connection strength and connection strain of an adhesive bond between two fibers may be controlled by using an adhesive having predetermined strength and strain properties. The connection strength and/or connection strain of an adhesive may be an advertised property provided by a manufacturer of the adhesive. Alternatively, the connection strength and/or connection strain of an adhesive may be determined experimentally such as in a laboratory environment under controlled conditions by measuring the amount of force required to pull apart two components bonded together by the adhesive. The connection failure strain of the adhesive may also be measured when the connection strength is measured. As known in the art, connection strain is a measure of the amount of displacement or stretching of the adhesive bond between two components at the point of failure of the bond. The connection strength and/or connection strain of a chemical bond between two fibers 30 may be altered by altering the chemical composition of at least one of the fibers 30. For example as described below, a first-functional fiber 140 (FIG. 40) may be formed of a material having a chemical composition that chemically reacts and forms a chemical bond with the material of a second-functional fiber 142 (FIG. 40) at locations where the first-functional fiber 140 and second-functional fiber 142 come into contact with one another.

Different combinations of chemical compositions may be tested in a laboratory environment by performing a series of tests measuring the amount of force required to pull apart two components chemically bonded as a result of the different chemical compositions of the two components. Connection strength and connection strain data from such laboratory testing may be used to select a chemical composition for the first-functional fibers 140 and a chemical composition for the second-functional fibers 142 such that the chemical bond has a desired connection strength and connection strain at the connection sites 80 connecting the first-functional fibers 140 with the second-functional fibers 142. The connection strength and connection strain of thermal fusing of fibers 30 and mechanical pinning of fibers 30 may also be determined in a laboratory environment in a manner similar to that described above for adhesive bonding and chemical bonding. For example, the connection strength and/or the connection strain of thermal fusing between two fibers 30 may be altered by altering the size or length of the thermally fused connection between two fibers 30. For example, a relatively long thermally fused connection site 80 between two fibers 30 will have a higher connection strength than a relatively short thermally fused connection site 80 between two fibers 30. Different types of mechanical pinning may be determined in the laboratory and/or determined analytically using well-known strength analysis techniques to determine the connection strength and connection strain corresponding to each type of each mechanical pinning configuration. Laboratory test data representing the connection strength and connection strain of different types of thermal fusing and different types of mechanical pinning may be used to select the type of connection to be implemented in connecting fibers 30 in a composite structure 10. Connection strength and connection strain may also be determined by performing a strength analysis for determining the strength properties of each connection type.

Advantageously, coupling of the fibers 30 (FIGS. 5-9) provides a means for improving the ballistic performance of a panel 14 or other composite structure 10 by increasing the resistance of the fibers 30 to wedging of a projectile (FIG. 11) between fibers 30 during a ballistic event or an impact event. In addition, coupling of the fibers 30 may facilitate control of the extent or size of area that is damaged by a ballistic event or an impact event. Likewise, coupling of the fibers 30 at connection sites 80 may provide a means for attaining a desired degree of panel stiffness or resistance to bending and minimizing optical distortion in non-impacted portions of the panel 14.

Selection of the connection type 88 and/or connection quality 100 to be used for connecting the fibers 30 in a composite structure 10 may be determined based on the results of strength analysis and/or laboratory testing of different connection types 88 as described above. For example, the connection strength and/or connection strain of a given connection type 88 may be determined in the laboratory. As well known in the art of strength analysis, a finite element model or computer model (not shown) of the actual composite structure 10 may be constructed to facilitate the prediction of the desired connection strength and/or connection strain at the connection sites 80 between fibers 30 in the composite structure 10. The computer model of the actual composite structure 10 may include a computer model of the fibers 30 included in the composite structure 10. The connection sites 80 between the fibers 30 in the computer model may be assigned a connection type 88 having a corresponding connection strength and/or connection strength as determined analytically and/or experimentally as described above. A determination may be made regarding the loads (e.g., the magnitude and direction of loads) to which the composite structure 10 may be subjected during service.

A computer simulation of the loading scenario may be applied to the computer model of the composite structure 10 to determine the reaction of the composite structure 10 to the loads. The results of the computer simulation may indicate the relative deflection of the composite structure 10 under the simulated loading. The relative deflection of the computer model may represent the stiffness of the composite structure 10 containing the fibers 30 connected using a connection type 80 and/or connection quality 100. Multiple computer simulations may be performed with a variety of different connection sites 80 connecting the fibers 30 of the composite structure 10 to determine the response (i.e., stiffness) of the composite structure 10 when subjected to the loads. In this manner, a determination may be made regarding an optimal connection type 88 and/or connection quality 100 to be incorporated into the connection sites 80 of an actual composite structure 10.

Step 306 of FIG. 12 may comprise at least partially embedding the fibers 30 in a matrix 22 similar. As indicated above, the matrix 22 is preferably formed of substantially optically transparent and/or infrared transparent material. Likewise, the fibers 30 are preferably formed of substantially optically and/or infrared transparent material. Step 306 may include curing or solidifying the matrix 22 and/or fibers 30 to form the composite structure 10 having connection sites 80 wherein fibers 30 are connected with a desired connection type 88 and/or connection quality 100. As indicated above, the connection type 88 and/or connection quality 100 to be implemented in the connection sites 80 may be selected analytically and/or experimentally-determined as data described above. In this regard, the composite structure 10 may be subjected to heat and/or pressure to facilitate curing or solidifying.

Referring to FIG. 13A-13C, shown are schematic views of an example of a composite structure 10 in a unidirectional configuration 70 and having fibers 30 interconnected at connection sites 80 arranged in localized connection regions 114, 116. As indicated above, the plurality of fibers 30 may be least partially embedded within a matrix 22 of the composite structure 10. Each connection region 114, 116 may represent locations where fibers 30 in the same layer 60 may be coupled together and/or where fibers 30 in different layers 60 may be coupled together. FIG. 13A is a top schematic view of the composite structure 10 showing the arrangement of a plurality of first connection regions 114 and a plurality of second connection regions 116. In the embodiment shown, the horizontally-oriented first connection regions 114 are closer together than the horizontally-oriented second connection regions 116. The vertically-oriented first connection regions 114 may be spaced further apart than the vertically-oriented second connection regions 116. However, the composite structure 10 may be provided with connection regions that are oriented in any arrangement or spacing, and are not limited to the arrangement shown in FIG. 13A. In addition, the connection regions may be provided in any geometric size, shape, orientation, and configuration and are not limited to the relatively narrow, linearly-shaped first and second connection regions 114, 116 shown in FIG. 13A.

FIG. 13B is a schematic side view of the composite structure 10 of FIG. 13A. In FIG. 13B, the fibers 30 are illustrated in a relatively heavy (e.g., thick) line weight and are selectively coupled together at connection sites 80 which are illustrated in a relatively light (e.g., thin) line weight compared to the heavy line weight representing the fibers 30. FIG. 13B illustrates out-of-plane coupling 84 of the fibers 30 of the first and second layers 62, 64 along the first connection regions 114 and out-of-plane coupling 84 of the fibers 30 in the second and third layers 64, 65 along the second connection regions 116. Although the fibers 30 in the first, second, and third layers 62, 64, 65 are shown having a unidirectional configuration 70 with parallel fibers 30 in each layer, the fibers 30 in any one of the first, second, and third layer 62, 64, 65 may be arranged in any orientation relative to other fibers 30 in the same layer and in any orientation relative to other fibers 30 in other layers. In addition, any one of the layers 62,

64, 65 may be provided as a woven fiber fabric ply 74 (FIG. 22) or as a planar element 78 (FIG. 22) such as a film, a sheet, or a plate, as discussed below. Furthermore, the composite structure 10 may include any number of layers 60 having fibers 30 interconnected along one or more connection regions, and is not limited to the three-layer 62, 64, 65 arrangement shown in FIG. 13B.

FIG. 13C is a schematic end view of the composite structure 10 of FIG. 13A and illustrating out-of-plane coupling 84 of the fibers 30 of the first and second layer 62, 64 along the first connection regions 114, and further illustrating the out-of-plane coupling 84 of the fibers 30 of the second and third layers 64, 65 along the second connection regions 116. However, as indicated above, the composite structure 10 may be provided with connection regions representing connection sites 80 between fibers 30 in the same layer 60, and/or representing connection sites 80 between fibers 30 in different layers 60. By providing localized connection regions 114, 116 where fibers 30 in the same layer 60 and/or different layers 60 are coupled, the performance of the composite structure 10 may be tailored to the environment or application for which the composite structure 10 is intended. For example, the localized connection regions 114, 116 may provide fiber 30 coupling and fiber 30 interaction in certain locations of a composite panel 14 during an impact event to preserve the optical transparency of non-impacted portions of the composite panel 14, or to provide other ballistic or optical performance characteristics for the composite panel 14. In addition, the connection sites 80 in any one of the connection regions may be provided with different connection types 88 and/or different connection qualities 100 and are not limited to the same connection type 88 and/or same connection quality 100 at each connection site 80.

FIG. 14 is a schematic side view of a composite structure 10 in a unidirectional configuration 70 and having a layer stack 66 comprising ten (10) layers 60 and illustrating out-of-plane coupling 84 of the fibers 30 between immediately-adjacent layers 60 such as between the layers 1 and 2. The fibers 30 in any one of the remaining layers 3-10 may be unconnected to fibers 30 in other layers 60. Although the fibers 30 in FIG. 14 are arranged in a unidirectional configuration 70 with the fibers 30 in each layer 60 being parallel to the fibers 30 in other layers 60, the fibers 30 in any one of layers 60 may be non-parallel to fibers 30 in other layers 60. For example, the fibers 30 in two or more of the layers 60 may be provided in a cross-ply configuration 72 (e.g., fibers 30 in one layer 60 are perpendicular to fibers 30 in another layer 60) or in other angular orientations. Advantageously, by interconnecting the fibers 30 in two or more layers 60, the ballistic performance of the composite structure 10 may be tailored. For example, connecting the fibers 30 in the outermost layers 60 of the composite structure 10 (e.g., layers 1-2) may increase the interaction between the interconnected fibers 30 in the outermost layers 60 which may result in an increase in the stiffness of the outermost layers 60 relative to a reduced stiffness of the inner layers 60 (e.g., layers 3-10) having uncoupled fibers 30.

FIG. 15 is a schematic side view of a composite structure 10 in a unidirectional configuration 70. The composite structure 10 is shown having a layer stack 66 with ten (10) layers 60 and illustrating out-of-plane coupling 84 of fibers 30 in alternating layers 60 of the layer stack 66. In the embodiment shown, the fibers 30 in layers 1, 3, 5, 7, and 9 may be coupled, and the fibers 30 in layers 2, 4, 6, 8, and 10 may be uncoupled. FIG. 15 represents one example of a wide variety of embodiments wherein at least one of the fibers 30 in at least one layer 60 may be connected to at least one of the fibers 30 in at least one other layer 60. The fibers 30 may be connected at a plurality of connection sites 80. In a composite structure 10 such as a composite panel 14, the connection sites 80 coupling the fibers 30 between two of the layers 60 may be of a different connection type 88 and/or a different connection quality 100 than the connection sites 80 coupling fibers 30 between two or more other layers 60. In addition, in any of one of the layers 60, the fibers 30 may be coupled to other fibers 30 within the same layer 60 with connection sites 80 that may have the same or different connection type 88 and/or connection quality 100. For example, in any one of the multilayer composite structure 10 embodiments disclosed herein, the connection sites 80 between the fibers 30 of the outermost layers 60 may have a connection quality 100 that includes a high-strength/low-strain connection 106 relative to the connection quality 100 of the connection sites 80 between the fibers 30 connected between the inner layers 60 which may have a low-strength/high-strain connection 108.

Figure 16:
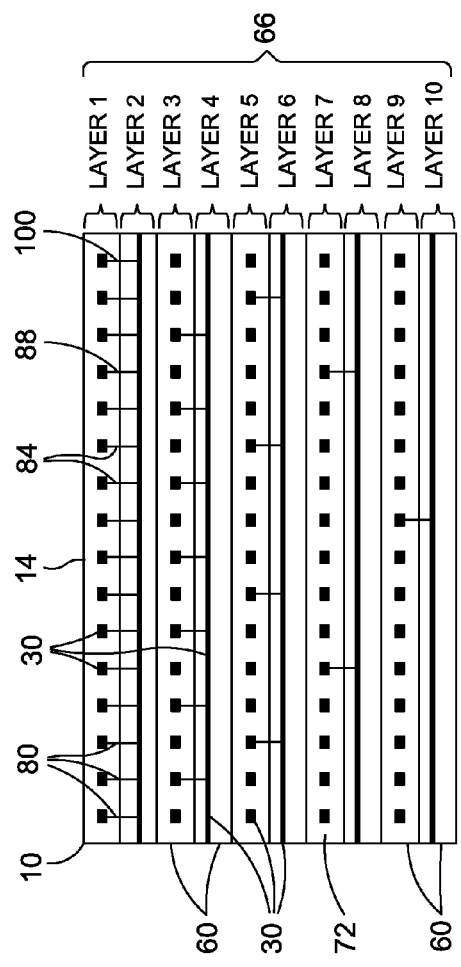
FIG. 16 is a schematic side view of a composite structure in a cross-ply configuration and illustrating out-of-plane coupling of the fibers between pairs of layers.

FIG. 16 is a schematic side view of a composite structure 10 in a cross-ply configuration 72 and illustrating out-of-plane coupling 84 between fibers 30 in different pairs of the layers 60 and with different coupling densities. For example, FIG. 16 illustrates all of the fibers 30 of layer 1 being coupled to one or more the fibers 30 of layer 2. Layers 2-3, 4-5, 6-7, and 8-9 may be uncoupled. The coupling density between layers 3-4 may be less than the coupling density between layers 1-2. For example, every other fiber 30 of layer 3 may be coupled to one or more fibers 30 of layer 4. The remaining pairs of coupled layer pairs may have decreasing coupling density. For example, every fourth fiber 30 of layer 5 may be coupled to one or more fibers 30 of layer 6. Every ninth fiber of layer 7 may be coupled to one or more fibers of layer 8. The coupling density between layers 9-10 may be less than the coupling density between layers 7-8. By providing increased coupling density in certain layer 60 pairs, the coupled layer 60 pairs may exhibit increased global stiffness relative to the global stiffness of layer pairs that have reduced coupling density.

It should be noted that the global stiffness of a coupled pair of layers 60 is different than the local stiffness at a connection site 80 between fibers 30. For example, the composite structure 10 in FIG. 16 may have a relatively high stiffness in the region of the composite structure 10 defined by the outermost layers 1-2, and decreasing stiffness in a downward direction of the composite structure 10 from layer 3 to 10. The relatively higher stiffness of the composite structure 10 at the outermost layers and reduced stiffness in the inner layers 60 may advantageously improve the ballistic performance of a composite structure 10. In the embodiment of FIG. 16, the connection sites 80 coupling the fibers 30 in the layer pairs are shown having the same connection type 88 and/or connection quality 100.

Figure 17:
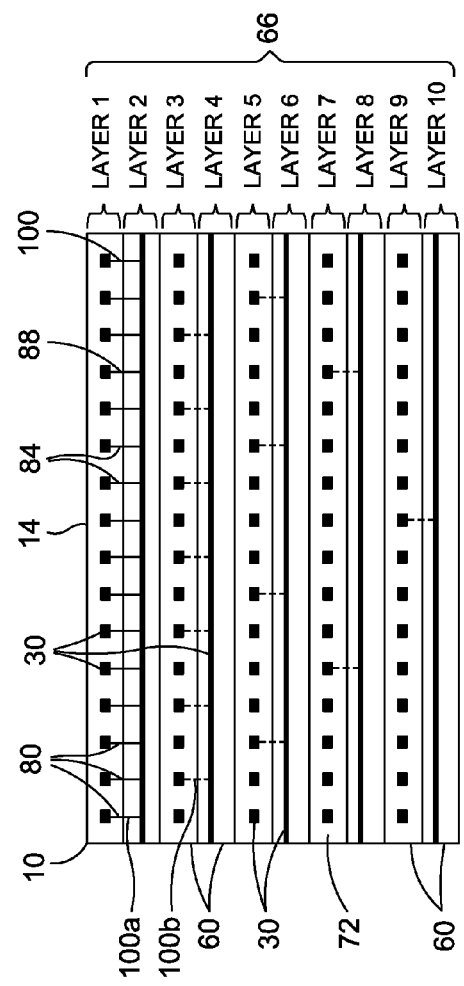
FIG. 17 is a schematic side view of a composite structure in a cross-ply configuration and illustrating out-of-plane coupling of the fibers with changes in the connection quality between different pairs of layers.
Figure 40:
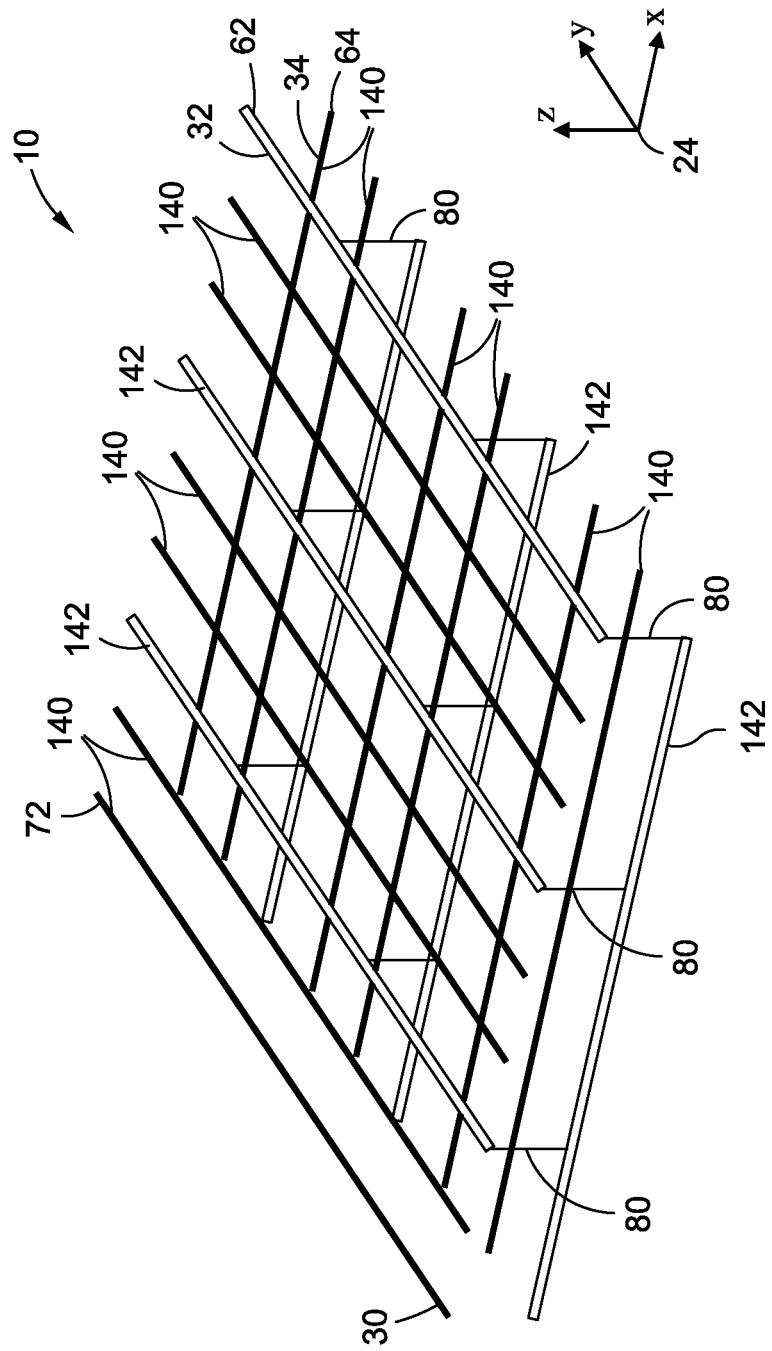
FIG. 40 is a perspective schematic illustration of a cross-ply configuration of a first and second layer containing first-functional fibers and second-functional fibers.

FIG. 17 is a schematic side view of a further embodiment of a composite structure 10 in a cross-ply configuration 72 having out-of-plane coupling 84 in different pairs of layers 60 similar to the embodiment shown in FIG. 16, and further illustrating changes in connection quality 100 in the connection sites 80 between different layer pairs. For example, the connection sites 80 coupling the fibers 30 between layers 1-2 may be provided with a first connection type 88a and/or first connection quality 100a. Examples of a first connection type 88a may include, but are limited to, adhesive bonding, chemical bonding, thermal fusing, and mechanical pinning. As indicated above, adhesive bonding may comprise bonding the fibers 30 at connection sites 80 using an adhesive. Chemical bonding may comprise reactively bonding first-functional fibers 140 (FIG. 40) to second-functional fibers 142 (FIG. 40)

at locations where the first-functional fibers 140 are in contact with the second-functional fibers 142, as shown in FIGS. 40-43 and described below.

Thermal fusing may comprise locally heating and fusing the fusible sheaths 58 of core-sheath fibers 56 with the fusible sheaths 58 of core-sheath fibers 56 at locations wherein the fusible sheaths 58 contact one another as shown in FIGS. 34-39 and described below. For example, the fusible sheaths 58 may be locally heated by a laser (not shown) at a connection site 80 to a temperature above the glass transition temperature of the fusible sheaths 58 in order to locally fuse together the fusible sheaths 58 of two core-sheath fibers 56. In FIG. 17, the connection sites 80 coupling the fibers 30 between the remaining coupled layer pairs may be provided with a second connection type 88b and/or second connection quality 100b that may be different than the first connection type 88a and/or connection quality 100a. Examples of a second connection type 88b may also include, but are limited to, adhesive bonding, chemical bonding, thermal fusing, and mechanical pinning. As may be appreciated, connection sites 80 in the same layer 60 may be provided with different connection types 88 and/or connection quality 100 to achieve the desired ballistic performance of the composite structure 10.

Figure 18:
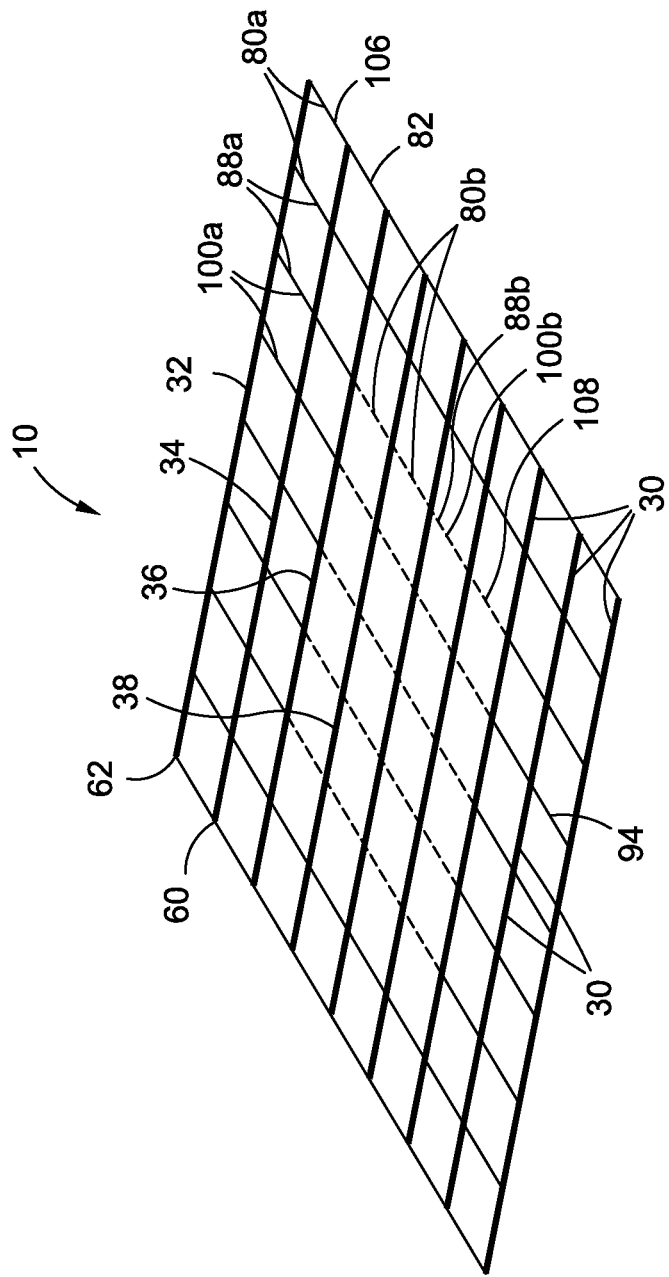
FIG. 18 is a schematic illustration of a single layer of unidirectional fibers connected to one another at a plurality of connection sites having at least two different connection types and/or connection qualities.

FIG. 18 is a schematic illustration of a single (e.g., first) layer 62 of unidirectional fibers 30. In any of the embodiments disclosed herein, the composite structure 10 may include additional layers 60 not shown. Such additional layers 60 may be comprised of fibers 30 and/or the additional layers 60 may be configured as planar elements 78 (FIG. 19) as described below. In FIG. 18, the unidirectional fibers 30 may be oriented substantially parallel to one another and may be connected to one another via in-plane coupling 82 at a plurality of connection sites 80.

In FIG. 18, the connection sites 80 within the first layer 62 may have at least two different connection types 88a and 88b and/or connection qualities 100a and 100b. In some embodiments, the different connection types 88 may be patterned within the first layer 62. For example, a layer 60 may include a first fiber 32, a second fiber 34, a third fiber 36, and a fourth fiber 38. The first fiber 32 may be connected to the second fiber 34 at one or more connection sites 80 of a first connection type 88a and/or connection quality 100a. The third fiber 36 may be connected to the fourth fiber 38 at one or more connection sites 80 of a second connection type 88b and/or connection quality 100b that may be different than the first connection type 88a and/or connection quality 100a. For example, FIG. 18 illustrates the connection sites 80 on the outer regions of the first layer 62 having connection sites 80 of a first connection type 88a and/or connection quality 100a represented by solid lines extending between the fibers 30, and the inner portion of the first layer 62 having connection sites 80 having connection sites 80 of a second connection type 88b and/or connection quality 100b represented by the dashed lines extending between the fibers 30.

A composite structure 10 may include different connection types 88 patterned within a given layer 30. The patterns of connection types 88 may be provided in any manner and are not limited to the connection pattern illustrated in FIG. 18. As discussed above, in any one of the embodiments disclosed herein, connection types 88 may include adhesive bonding, fusing, mechanical pinning, chemical bonding, and/or other means for interconnecting fibers 30 at connection sites 80. As described above, connection quality 100 may be represented as the connection strength at a connection site 80. Connection quality 100 may also be represented as the connection failure strain at a connection site 80. As described above, connection failure strain may represent the strain at which the connection between fibers 30 fails or breaks, and may be characterized as a percentage (plus or minus) of the failure strain of the matrix 22 as discussed above. In addition, connection quality 100 may be represented as the elastic modulus or tensile modulus of a connection site 80 and may be characterized as the relative stiffness of the connection site 80 as described above.

Figure 19:
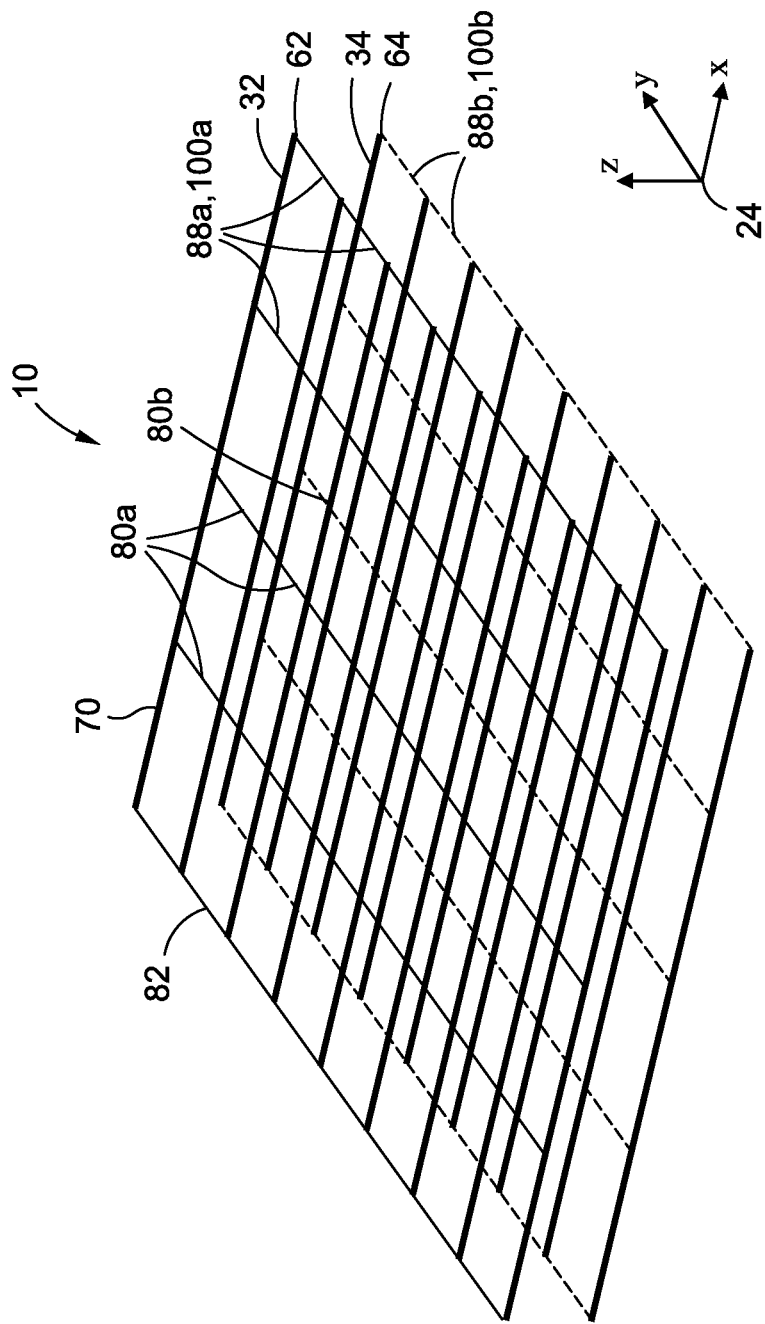
FIG. 19 is a schematic illustration of a first layer having first fibers connected to one another at a plurality of connection sites and a second layer having second fibers connected to one another at the plurality of connection sites with a different connection type and/or connection quality than the connection sites between the first fibers.

FIG. 19 is a schematic illustration of a composite structure 10 having a first layer 62 having first fibers 30 connected to one another at a plurality of connection sites 80, and a second layer 64 having second fibers 30 connected to one another at a plurality of connection sites 80. The connection sites 80 coupling the first fibers 30 within the first layer 62 may be of a different connection type 88 and/or connection quality 100 than the connection sites 80 coupling the second fibers 30 within the second layer 64. For example, the first fibers 30 may be coupled together at a plurality of connection sites 80 of a first connection type 88a and/or connection quality 100a. The second fibers 30 may be coupled together at a plurality of connection sites 80 of a second connection type 88b and/or connection quality 100b that may be different than the first connection type 88a and/or connection quality 100a. In addition, although not shown, one or more of the first fibers 30 may be coupled to one or more of the second fibers 30 at a plurality of connection sites 80 which may be of the same connection type 88 and/or connection quality 100 or a different connection type 88 and/or connection quality 100. The first and second layers 62, 64 may be provided in a unidirectional configuration, in a cross-ply configuration, or in other arrangements wherein the fibers 30 in the first layer 62 are non-parallel to the fibers 30 in the second layer 64.

Figure 20:
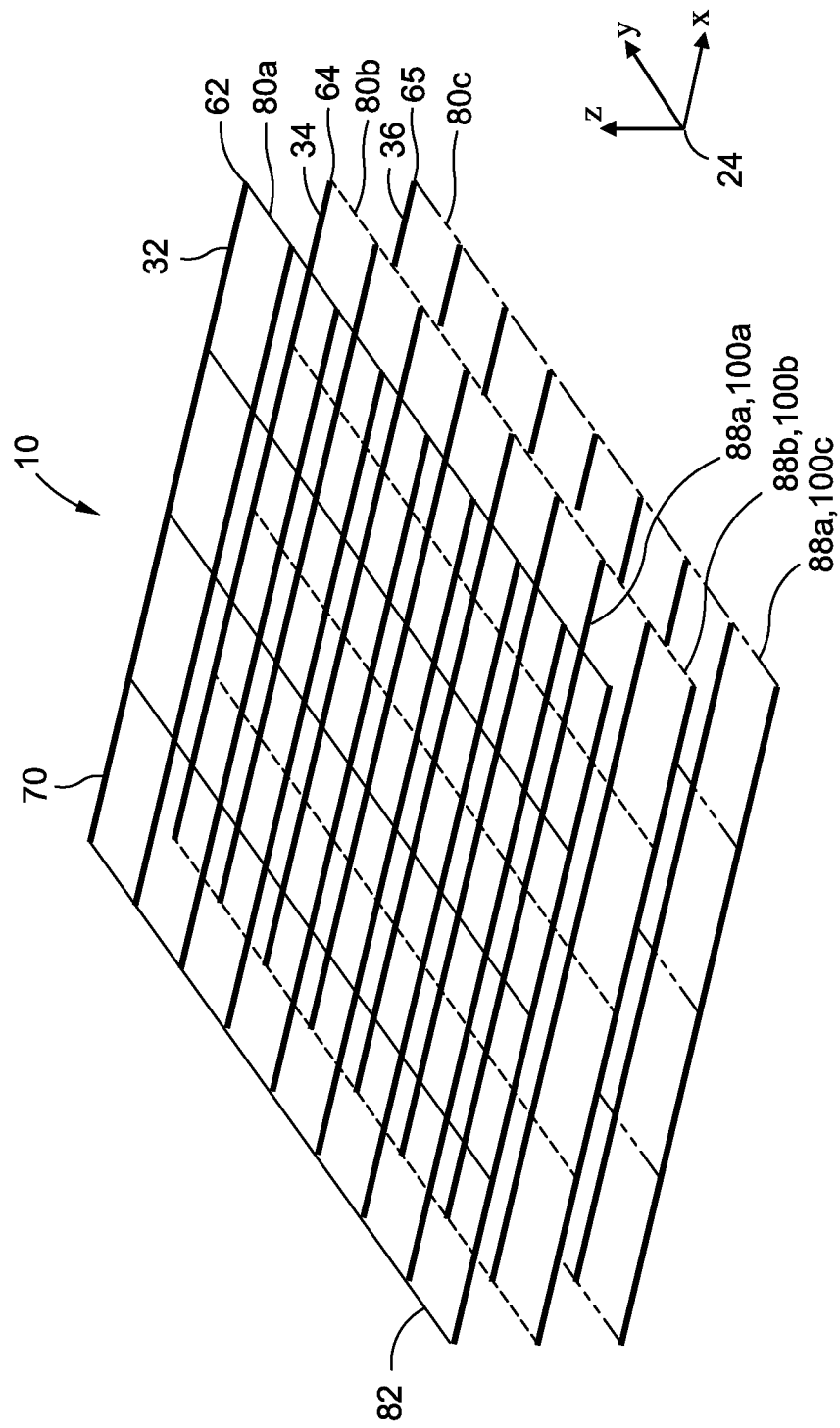
FIG. 20 is a schematic illustration of a first, second, and third layer having a respective first fibers, second fibers, and third fibers connected at first, second, and third connection sites having different connection types and/or connection qualities.

FIG. 20 is a schematic illustration of an embodiment of a composite structure 10 having a first, second, and third layer 62, 64, 65 and respective first fibers 30, second fibers 30, and third fibers 36 coupled at respective first, second, and third connection sites 80a, 80b, 80c having different connection types 88a, 88b, 88c and/or different connection qualities 100a, 100b, 100c. The connection sites 80 between the first fibers 30 in the first layer 62 are represented as solid lines of a first connection type 88a and/or connection quality 100a. The connection sites 80 between the second fibers 30 in the second layer 64 are represented as dashed lines of a second connection type 88b and/or connection quality 100b. The connection sites 80 between the third fibers 36 in the third layer 65 are represented as phantom lines of a third connection type 88c and/or connection quality 100c. However, any one of the layers 60 may include any combination of first, and second, and/or third connection types 88a, 88b, 88c and/or connection qualities 100a, 100b, 100c.

Figure 21:
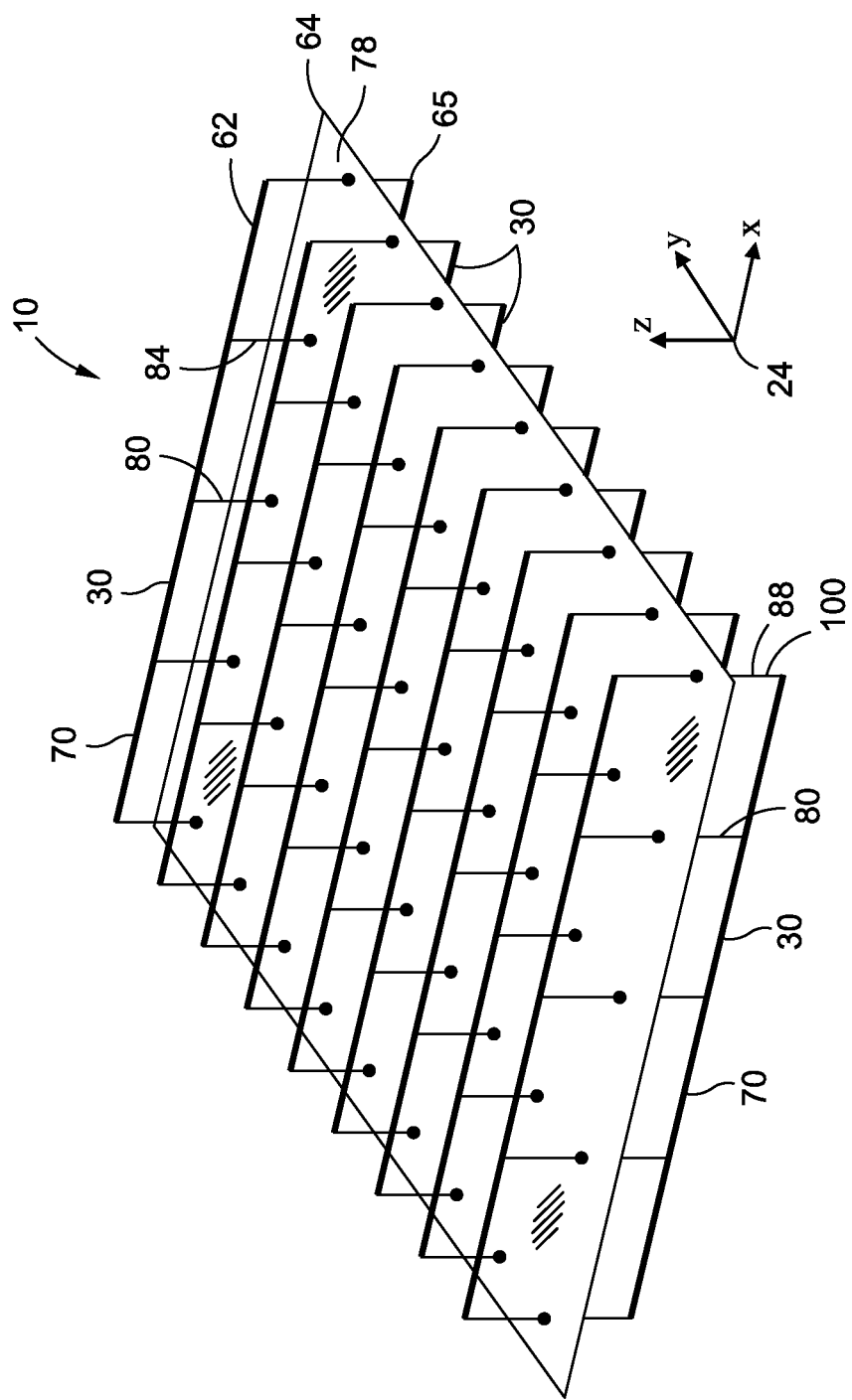
FIG. 21 is a schematic illustration of a composite structure having a first layer of fibers connected to a second layer configured as a planar element comprising a film, a sheet, or a plate.

FIG. 21 is a schematic illustration of a composite structure 10 having a first layer 62 and a third layer 65 each comprised of unidirectional fibers 30. The second layer 64 may be configured as a planar element 78. At least one of the fibers 30 in at least one of the first and third layers 62, 65 may be connected to the planar element 78 at one or more connection sites 80. The connection between the fibers 30 and the planar element 78 may increase the interaction between the fibers 30 and the planar element 78 such as when the composite structure 10 is impacted by a projectile. In this regard, the connection sites 80 between the fibers 30 and the planar element 78 may restrict movement of the fibers 30 during a ballistic event such as when a projectile impacts and/or is passing through the composite structure 10. The connection sites 80 between the fibers 30 and the planar element 78 may reduce or prevent wedging of the projectile between the fibers 30 as described above with regard to the coupling of the fibers 30 in different layers 60. In addition, the connection sites 80 between the fibers 30 and the planar element 78 may increase the out-ofplane stiffness of the planar element 78 (e.g., normal to the planar element 78) which may improve the ability of the planar element 78 to slowdown the projectile passing through the composite structure 10 during a ballistic event.

FIG. 19 illustrates the fibers 30 in the first and third layer 62, 65 being coupled to the planar element 78 at a plurality of connection sites 80. The connection sites 80 coupling the fibers 30 to the planar element 78 may have the same or different connection type 88 and/or connection quality 100. The planar element 78 may be a film, a sheet, or a plate. The film, sheet, or plate may be formed of composite or non-composite material and may include non-fibrous material or fibrous material. The non-composite material may include stretched polymeric material or films or unstretched polymeric films. The stretched polymeric films may be unidirectionally stretched or bi-directionally stretched. The film may be intentionally stretched during forming of the film or after forming of the film. The stretching of the film may cause the film molecules to become substantially aligned which may increase the tensile strength of the film. When embedded within a matrix material along with other fiber 30 layers 60, the stretched film may improve the specific performance of the composite structure 10. In an embodiment, the planar element 78 may be formed of materials such as glasses, composite material, ceramic material, metallic material such as metallic foil, and may further include woven material or non-woven material including fabrics and felts.

Figure 22:
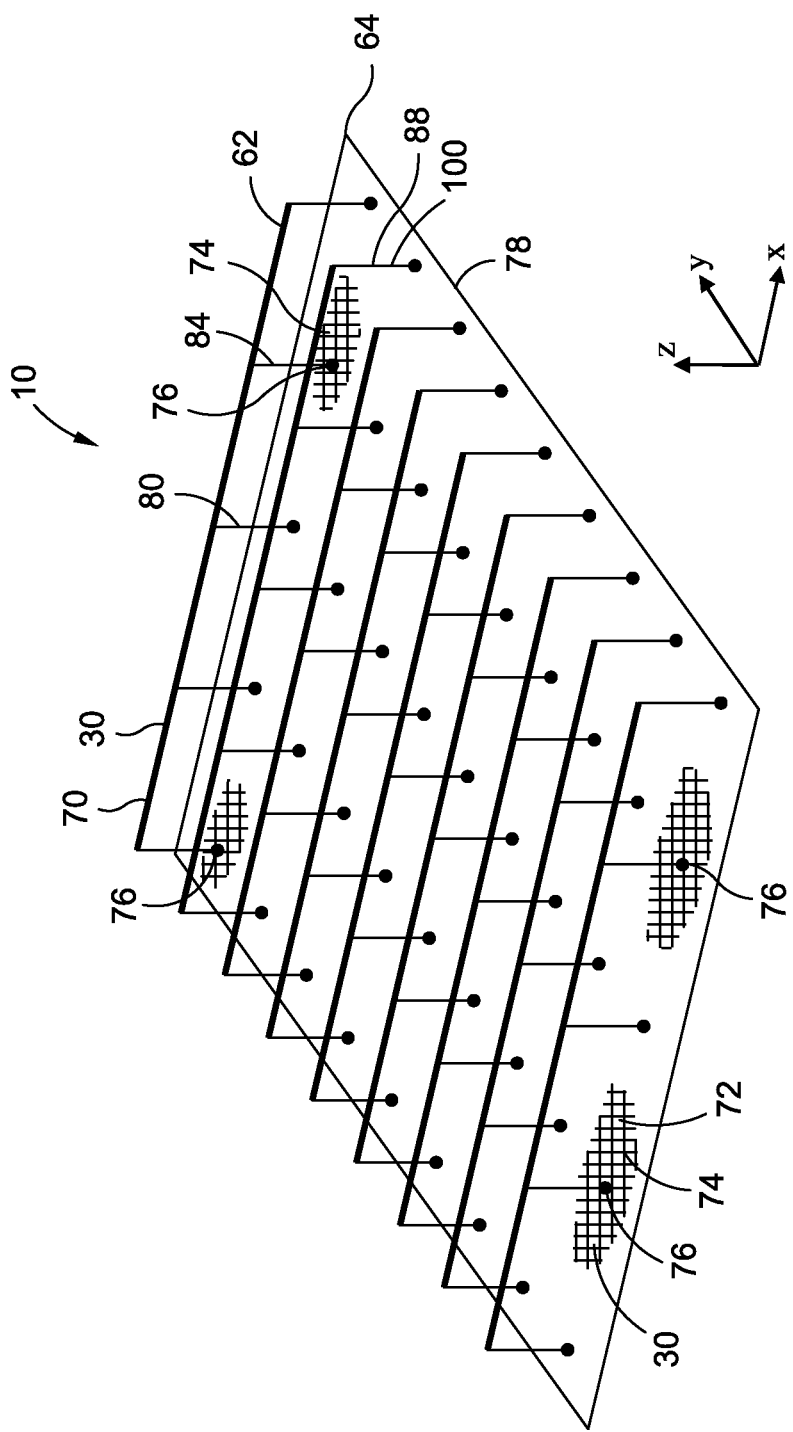
FIG. 22 is a schematic illustration of a composite structure having a first layer of fibers connected to a second layer configured as a planar element comprising a woven fiber fabric ply.

FIG. 22 is a schematic illustration of a composite structure 10 having a first layer 62 of fibers 30 connected to a woven fiber fabric ply 74. In an embodiment, the woven fiber fabric ply 74 may contain a plurality of fibers 30. The fibers 30 may be formed of any one of a variety of different materials including, but not limited to, polymeric material, glass, ceramic material, and/or metallic material. In an embodiment, the fibers 30 of the first layer 62 may be coupled to the woven fiber fabric ply 74 of the second layer 64 at one or more locations where the fabric fibers 30 intersect. The connection sites 80 coupling the fibers 30 to the woven fiber fabric ply 74 may have the same and/or different connection type 88 and/or connection quality 100.

Figure 23:
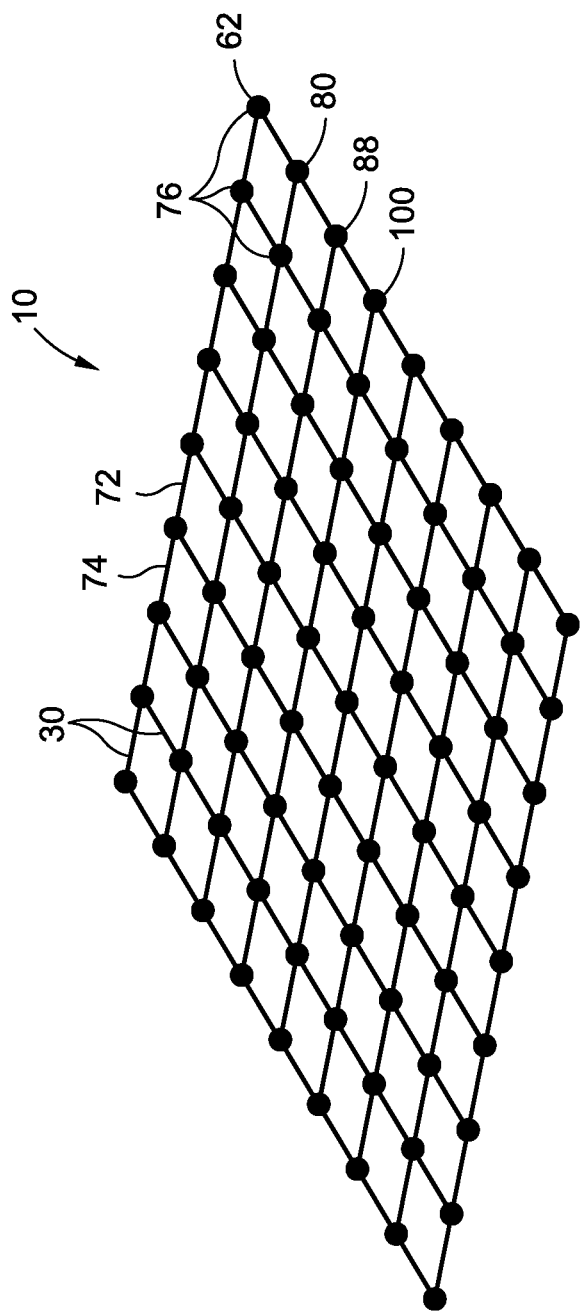
FIG. 23 is a schematic illustration of a first layer configured as a woven fiber fabric ply wherein the fibers in the woven fiber fabric ply connected are connected where the fibers intersect.

FIG. 23 is a schematic illustration of a first layer 62 that may be included in a composite structure 10. The first layer 62 may be configured as a woven fiber fabric ply 74. The fibers 30 in the woven fiber fabric ply 74 may be coupled to one another at connection sites 80 (e.g. nodes 76) where the fibers 30 intersect via in-plane coupling 82. The coupling of the fibers 30 at the connection sites 80 may increase the interaction of the fibers 30 during an impact such as during a ballistic event. The increased interaction of the fibers 30 may involve a greater quantity of fibers 30 in the ballistic event than would otherwise be involved if the fibers 30 were uncoupled. The increased interaction of the fibers 30 may reduce the speed of the projectile. The connection sites 80 may have the same and/or different connection type 88 and/or connection quality 100. The connection type 88 and/or connection quality 100 may be varied as a means to tailor the ballistic performance and/or optical performance of a composite structure 10 containing the woven fiber fabric ply 74. The woven fiber fabric ply 74 may be formed of any one of a variety of materials including polymers, metals, glass, ceramics, and/or other materials.

FIGS. 24-33 are schematic illustrations of non-limiting examples of global connection site patterns 110 that may be implemented in a composite structure 10 for connecting fibers 30 in individual layers 60, for connecting fibers 30 in different layers 60, and/or for connecting fibers 30 to one or more planar elements 78. In general, the coupling of fibers 30, layers 60, and/or planar elements 78 may increase the interaction between such coupled fibers 30, layers 60, and/or planar elements 78 which may increase the energy-absorbing ability of the connected components in slowing a projectile impacting and/or passing through the composite structure 10.

By arranging the connection sites 80 in a global connection site pattern 110, instead of detecting the fibers 30 uniformly throughout the composite structure 10, fabrication cost and time is reduced. In addition, by arranging the connection sites 80 in a global connection site pattern 110, the composite structure 10 may exhibit a specific ballistic performance when impacted by a projectile. For example, by providing a global connection site pattern 110 as an arrangement of open circles 118 (FIG. 24) or closed circles 120 (FIG. 25-26), fibers 30 that are unconnected to other fibers 30 may stretch to a greater extent during a ballistic event than fibers 30 connected to other fibers 30 in the regions represented by the circles 118, 120. The increased stretching of uncoupled fibers 30 may allow such fibers 30 to absorb a greater amount of energy of a projectile during a ballistic event than fibers 30 that are coupled to other fibers 30. However, coupled fibers 30 may have improved resistance to deformation during a ballistic event and therefore may help retain the original level of optical transparency of the composite structure 10 in the regions of the circles 118, 120 relative to uncoupled fibers 30 which may deform to a greater extent during a ballistic event resulting in a greater loss of optical transparency in such regions following a ballistic event. The geometric shape, size, and spacing of the localized connection regions 112 may be designed based on the physical environment of the composite structure, the size of ballistic projectiles expected to be encountered, and a variety of other factors.

In an embodiment, one or more global connection site patterns 110 may be implemented in individual layers 60 for coupling fibers 30 within the layer 60. Alternatively, or in addition to coupling fibers 30 within a layer 60, one or more global connection site patterns 110 may be implemented for connecting fibers 30 in one or more layers 60 with the fibers 30 in other layers 60. One or more global connection site patterns 110 may also be implemented for coupling fibers 30 in one or more layers 60 to a planar element 78 such as a film, a sheet, a plate, or a woven fiber fabric ply.

Figure 24:
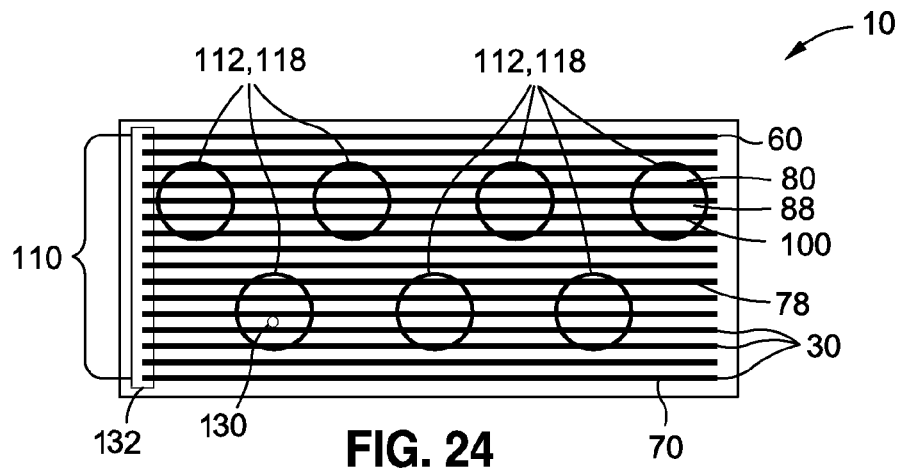
FIG. 24 is a schematic view of a plurality of localized connection regions each having a circular shape as part of a global connection site pattern for coupling fibers in an individual layer or coupling fibers in different layers.

For example, in FIG. 24, the global connection site pattern 110 may be characterized as a schematic top view of a layer 60 of unidirectional fibers 30 connected to one another at a plurality of connection sites 80 arranged in the shape of a circle 118. The global connection site pattern 110 shown in FIG. 24 may also be characterized as a schematic side view of a stack of layers 60 and illustrating the coupling of the layers 60 at localized connection regions 112 representing location of connection sites 80 arranged in a circular shape 118. In any embodiment disclosed herein, one or more global connection site patterns 110 may be applied to a substantial entirety of one or more layers 61, as viewed from above the layer(s) 61, or one or more connection regions 112 or patterns may be applied to a localized portion(s) of one or more layers 61 as viewed from above the layer(s) 61. For example, a global connection site pattern 110 may be locally applied along a perimeter edge 132 of a composite panel 14 to provide a localized concentration of connections sites 80 between fibers 30 along a perimeter edge 132 of the composite panel 14 to increase or decrease fiber 30 restraint along the perimeter edge 132. In another example, one or more global connection site patterns 110 may be locally applied to a composite panel 14 such as around or adjacent to features in a composite panel 14 to alter the local mechanical properties of the composite panel 14. For example, a connection region 112 may be applied around a fastener hole 130 in a composite panel 14 to increase the concentration of connection sites 80 coupling fibers 30 near the fastener hole 132. The coupling of fibers 30 around the fastener hole 132 may locally increase the stiffness, damage tolerance (e.g., delamination resistance), and other local properties (e.g., mechanical, ballistic) of the composite panel 14 around the fastener hole 132. Similarly, one or more global connection site patterns 110 may be applied across a layer stack 66 of a composite structure 10 as viewed from the side, or one or more connection regions may be applied to a localized portion of a layer stack 66 of a composite structure 10 to locally alter the properties (e.g., mechanical, ballistic) of the composite structure 10.

Figure 25:
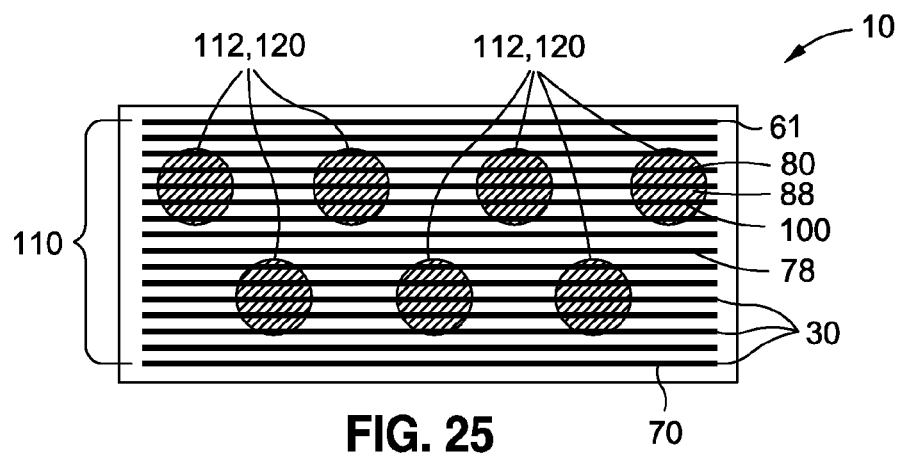
FIG. 25 is a schematic view of a plurality of localized connection regions each having a closed circular shape as part of the global connection site pattern.

FIG. 25 is a schematic view of a plurality of localized connection regions 112 each having a closed circular shape 120 as part of a global connection site pattern 110. Fibers 30 and/or layers 60 may be coupled to one another within the area enclosed by the closed circular shapes 120. The spacing between the localized connection regions 112 may represent uncoupled fibers 30 within a layer 60 and/or uncoupled layers 61 within a composite structure 10. The uncoupled layers 61 may represent locations in the composite structure 10 where fibers 30 may be able to stretch longitudinally and/or fibers 30 may be able to spread apart laterally such as during an impact event to absorb energy of a projectile.

Figure 26:
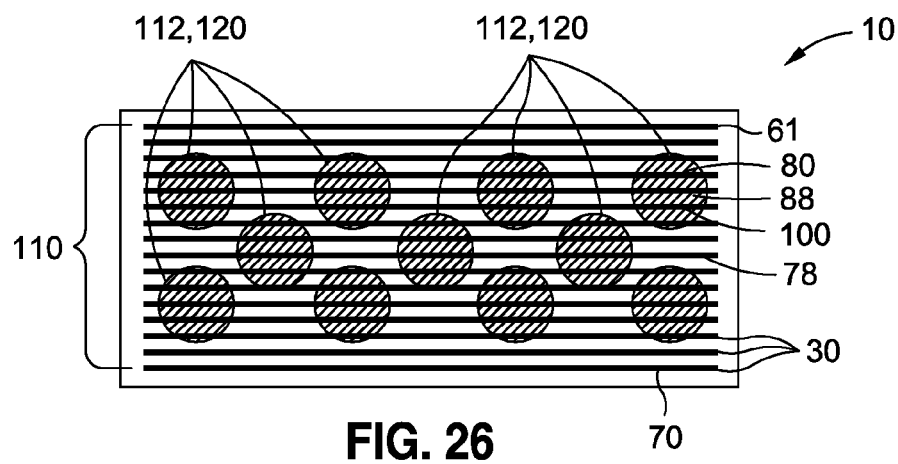
FIG. 26 is a schematic view of a plurality of localized connection regions each having a closed circular shape and arranged in a higher density than the localized connection regions shown in FIG. 25.

FIG. 26 is a schematic view of a plurality of localized connection regions 112 each having a closed circular shape 120 and arranged in a higher density than the closed circular shapes 120 shown in FIG. 23. A higher density of closed circular shapes 120 may result in a difference in ballistic performance and/or optical performance of the composite structure 10 relative to a lower density of the closed circular shapes 120. In any of the embodiments disclosed herein, the connection type 88 and/or connection quality 100 may be the same in each one of the localized connection regions 112. Alternatively, different localized connection regions 112 may have different connection types 88 and/or connection qualities 100.

Figure 27:
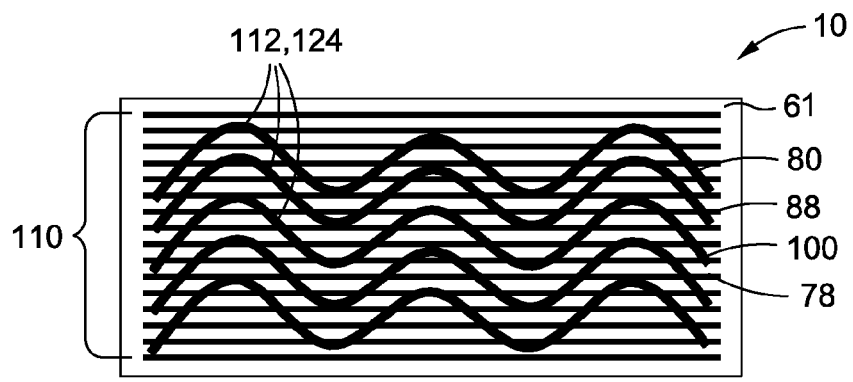
FIG. 27 is a schematic view of a plurality of localized connection regions each having a sinusoidal shape as part of the global connection site pattern.
Figure 28:
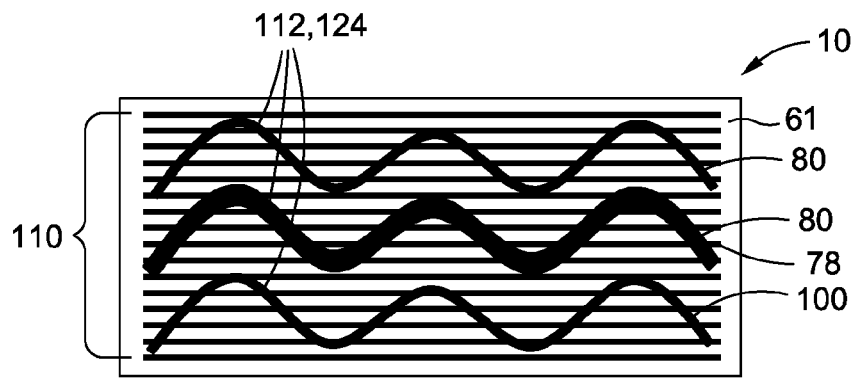
FIG. 28 is a schematic view of a plurality of localized connection regions having sinusoidal shapes of different thickness.

FIG. 27 schematically illustrates a plurality of localized connection regions 112 each having a sinusoidal shape 124 as part of a global connection site pattern 110. Although generally aligned lengthwise relative to the lengthwise orientation of the fibers 30, the sinusoidal shapes 124 may be oriented at any angle (e.g. 45° or other) relative to the fibers 30 to achieve desired ballistic performance characteristics. FIG. 28 is a schematic view of localized connection regions 112 having sinusoidal shapes 124 of different thickness. The different thicknesses of the sinusoidal shapes 124 in FIG. 26 may contain a greater number of connection sites 80 which may result in different performance characteristics for the composite structure 10 relative to the arrangement shown in FIG. 25.

Figure 29:
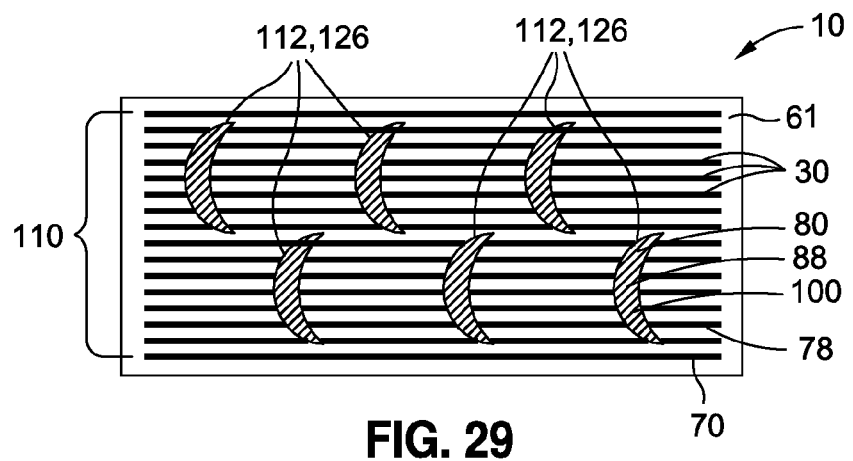
FIG. 29 is a schematic view of a plurality of localized connection regions each having a crescent shape as part of the global connection site pattern.

FIG. 29 is a schematic view of a plurality of localized connection regions 112 each having a crescent shape 126 as part of a global connection site pattern 110. The crescent shapes 126 may be provided in any size, shape, density, and configuration. In this regard, the local connection site 80 patterns illustrated in FIG. 24-33 are several examples of any one of a wide variety of different global connection site patterns 110 that may be implemented for connecting fibers 30 and/or layers 60 of a composite structure 10.

Figure 30:
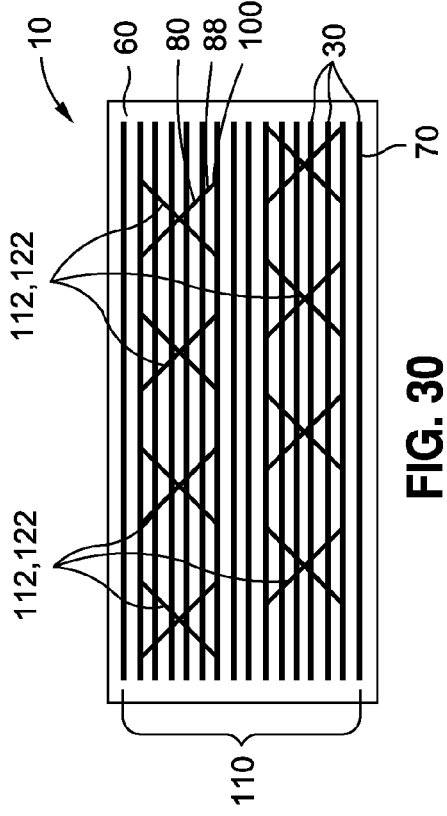
FIG. 30 is a schematic view of a plurality of localized connection regions each having an X-shape as part of the global connection site pattern.

FIG. 30 is a schematic view of a plurality of localized connection regions 112 each having an X-shape 122 as part of a further embodiment of a global connection site pattern 110. The X-shapes 122 may be spaced apart from one another as shown in FIG. 30 to allow for controlled constraint of fibers 30 at regions located between the X-shapes 122. In addition, the X-shapes 122 may be spaced apart from one another such that some of the fibers 30 in a given layer 60 are uncoupled to other fibers 30 in the same layer 30, or such that some of the layers of a composite structure 10 are uncoupled to other layers.

Figure 31:
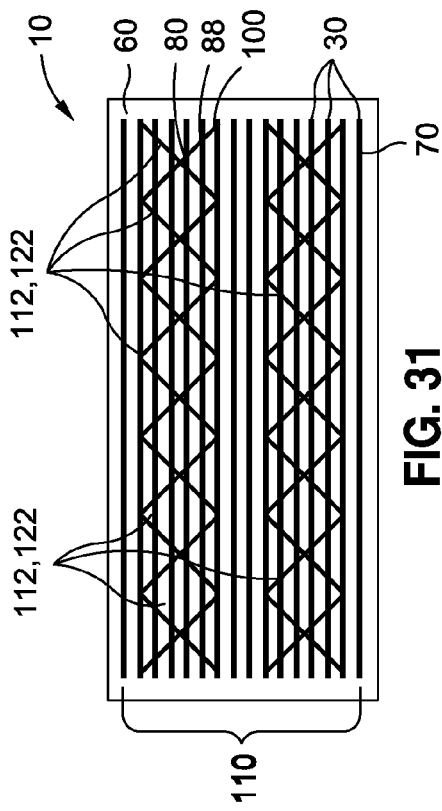
FIG. 31 is schematic view of a plurality of localized connection regions each having an X-shape and arranged in a higher density than the localized connection regions shown in FIG. 30.
Figure 32:
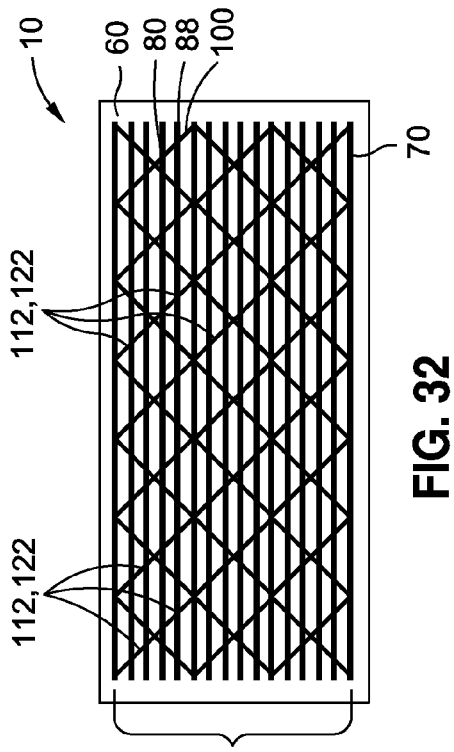
FIG. 32 is schematic view of a plurality of localized connection regions each having an X-shape and arranged in a higher density than the localized connection regions shown in FIG. 31.

FIG. 31 is schematic view of a plurality of X-shaped 122 localized connection regions 112 arranged in a higher density than the X-shaped 122 localized connection regions 112 shown in FIG. 30. The higher density may result in greater coupling and therefore increased interaction of fibers 30 and/or layers 60 during an impact event. FIG. 32 is schematic view of further increased density of X-shaped 122 localized connection regions 112 relative to the density of the localized connection regions 112 in FIG. 30 or 31. In any composite structure 10 embodiment, different types of localized connection regions 112 may be implemented in a single composite structure 10. For example, the composite structure 10 may include a combination of X-shapes 122, closed circular shapes 120, and/or any other geometric shape or size.

Figure 33:
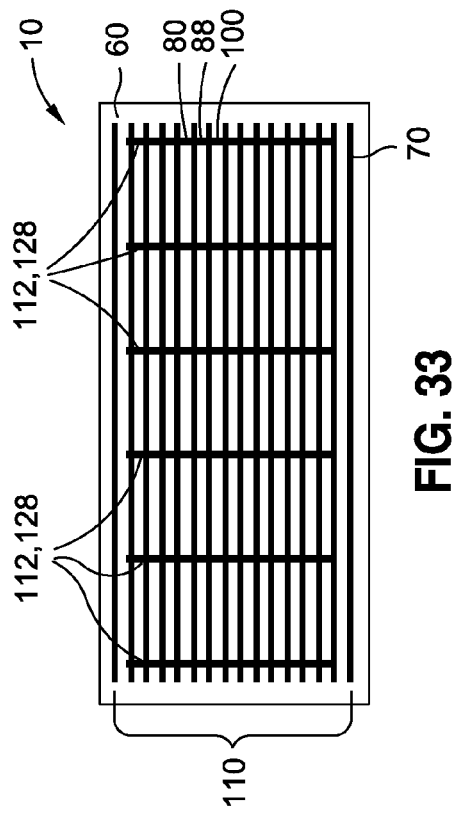
FIG. 33 is a schematic view of a plurality of localized connection regions each having a bar shape as part of the global connection site pattern.

FIG. 33 is a schematic view of a plurality of localized connection regions 112 each having a bar shape 128 arranged in a global connection site pattern 110. Although the bar shapes 128 are oriented generally perpendicularly relative to the direction of the fibers 30 and/or layers 60, the bar shapes 128 may be arranged in any orientation or combination of orientations relative to the fibers 30 or layers 60. For example, the bar shapes 128 may be oriented at a 45° angle or at other angles relative to the lengthwise direction the fibers 30 and/or relative to the lengthwise direction of the layers 60.

Figure 34:
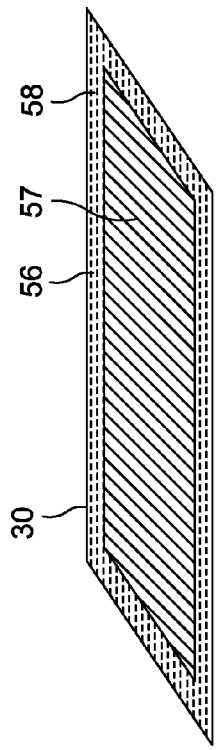
FIG. 34 is a cross-sectional view of a core-sheath fiber having a core surrounded by a fusible sheath.

FIG. 34 is a cross-sectional view of a core-sheath fiber 56 which is a type of fiber 30 having a core 57 surrounded by a fusible sheath 58. Core-sheath fibers 56 may be included in any embodiment of the composite structure 10. For example, one or more of the layers 60 of a composite structure 10 may include unidirectional core-sheath fibers 56. In a further embodiment, one or more layers 60 of a composite structure 10 may comprise a woven fiber fabric ply 74 (FIG. 21) made up of a plurality of core-sheath fibers 56 that may be woven together. In an embodiment, the core 57 may have a higher strength than the sheath 58. In some embodiments, the core 57 may be stretched during formation of the core 57 or after formation of the core 57 to improve the tensile strength of the fiber 56. In some embodiments, the core-sheath fibers 56 may be provided in a generally flattened cross-sectional shape to provide improved optical performance of the composite structure 10. For example, FIG. 34 illustrates the core-sheath fiber 56 having a parallelogram shape although other flattened shapes may be provided such as a generally rectangular shape. In an embodiment, the core-sheath fiber 56 may have generally planar upper and lower surfaces 44, 46 that may be generally parallel to one another. In this regard, flattened and/or substantially planar fiber 56 faces may reduce optical distortion of the composite structure 10 by minimize the scattering of light that may otherwise occur when light strikes or passes through a core-sheath fiber 56 having a generally rounded cross-sectional shape. By minimizing the scattering of light passing through a composite structure 10, optical distortion may be reduced which may improve the clarity of objects observed through a transparent composite structure 10.

Figure 35:
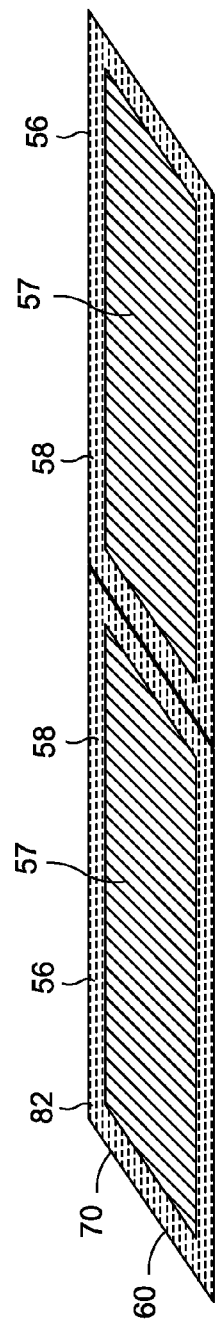
FIG. 35 is a cross-sectional view of a pair of the core-sheath fibers butted against one another.

FIG. 35 is a cross-sectional view of a pair of the core-sheath fibers 56 butted against one another in side-by-side arrangement. The core-sheath fibers 56 may be included in a layer 60 of fibers 30 containing a plurality of the unidirectional core-sheath fibers 56. Alternatively, the core-sheath fibers 56 may be included in a woven fiber fabric ply 74 made up of a plurality of the unidirectional core-sheath fibers 56, as indicated above.

Figure 36:
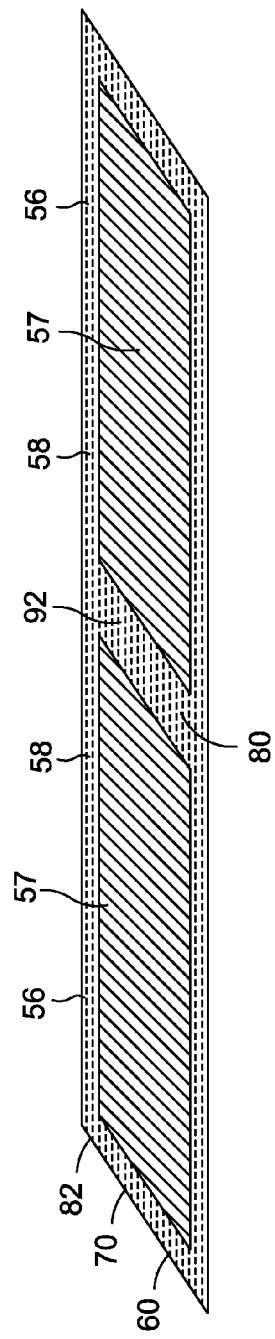
FIG. 36 is a cross-sectional view a pair of the core-sheath fibers interconnected to one another by fusing the sheaths together.

FIG. 36 illustrates the core-sheath fibers 56 after fusing the sheaths 58 together at the sides such as by locally heating the sheaths 58. The sheaths 58 of one or more of the core-sheath fibers 56 may also be fused to the matrix 22 at one or locations after the fibers 30 are embedded in the matrix 22. In an embodiment, the sheath 58 may be formed of the same material from which the matrix 22 is formed. For example, the fusible sheath 58 may be formed of thermoplastic material which may be substantially similar to the thermoplastic material of the matrix 22. However, the fusible sheath 58 may be formed of any type of material such as metallic material, ceramic material, composite material (e.g., epoxy, thermoplastic material, etc.). In a woven fiber fabric ply 74 made up of core-sheath fibers 56, the fusible sheaths 58 may be fused 92 together at locations where the fibers 30 intersect one another in the woven fiber fabric ply 74. As indicated above, the fusible sheaths 58 may also be fused 92 or otherwise connected to other layers 60 at one or more connection sites 80.

Figure 37:
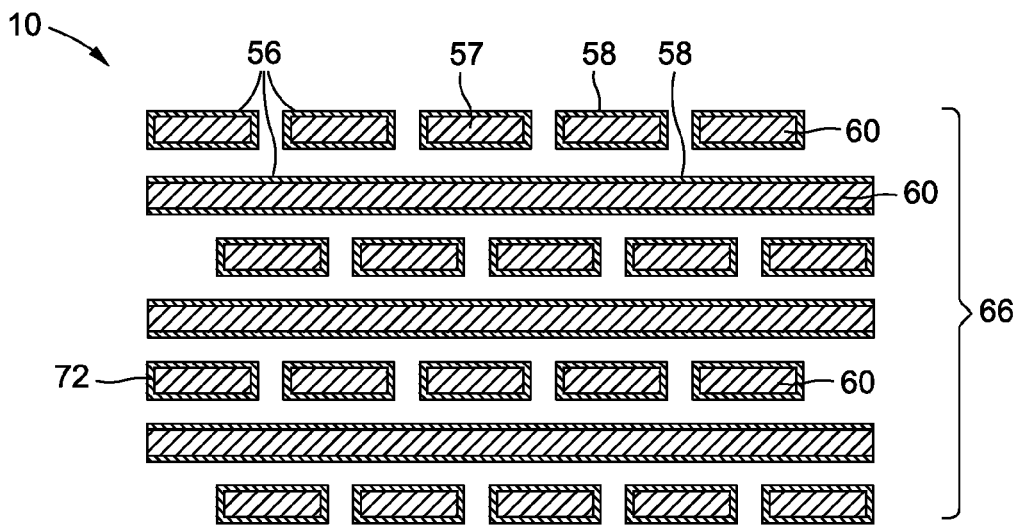
FIG. 37 is an exploded schematic view of a plurality of layers of core-sheath fibers arranged in a cross-ply configuration.

FIG. 37 is an exploded schematic side view of a plurality of layers 60 of core-sheath fibers 56 arranged in a cross-ply configuration 72. In the embodiment shown, each one of the core-sheath fibers 56 may have a generally rectangular cross-sectional shape or other shape. As indicated above, the core 57 may be formed of a relatively high-strength material. The fusible sheath 58 may be formed of a thermoplastic material covering the core 57. The core-sheath fibers 56 in one or more of the layers 60 may have gaps between the core-sheath fibers 56. In the embodiment shown, the core-sheath fibers 56 in alternating layers 60 may be arranged in staggered formation or similar formation such that the core-sheath fibers 56 in one layer 60 are at least partially aligned with the gaps between the core-sheath fibers 56 in another layer 60 when the composite structure 10 is viewed along a direction normal or perpendicular to the upper and/or lower surface of the core-sheath fibers 56. Although FIG. 37 illustrates a cross-ply configuration 72 of a composite structure 10, the core-sheath fibers 56 may be oriented in any desired arrangement or pattern, without limitation.

Figure 38:
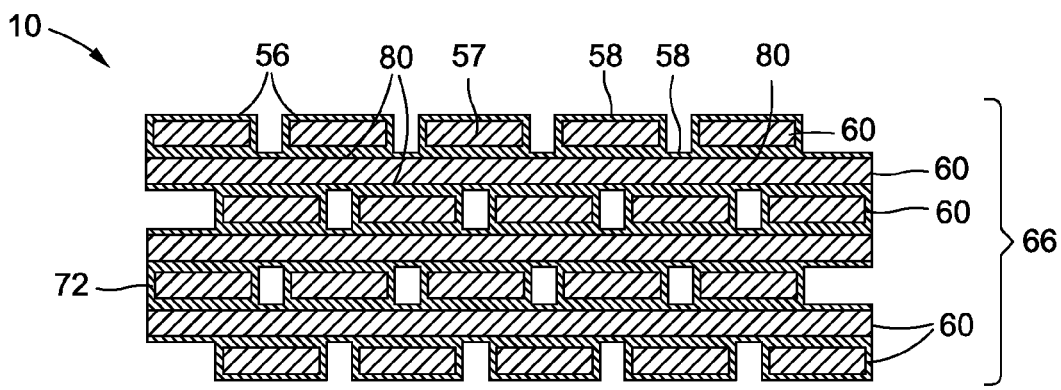
FIG. 38 is a schematic side view of the layers of FIG. 37 pressed together and with the sheaths fused together.

FIG. 38 is a schematic side view of the composite structure 10 of FIG. 37 with the layers 60 pressed together such that the fusible sheaths 58 of the core-sheath fibers 56 are in contact with one another. Heat may be applied to fuse the sheaths 58 together. For example, for an embodiment wherein the sheaths 58 are formed of thermoplastic material, FIG. 38 illustrates thermoplastic fusing of upper and lower surfaces of the core-sheath fibers 56. Heat may be locally applied using a laser or other heating mechanism to locally heat one or more locations where the sheaths 58 of the core-sheath fibers 56 are in contact with one another. Alternatively, the composite structure 10 may be heated such as in an oven or autoclave or using other heating methods. In an embodiment, heat may be applied in a manner causing the sheaths 58 to fuse together. For example, the thermoplastic sheaths 58 may be heated up to the melting temperature of the thermoplastic material to cause the contacting portions of the sheaths 58 to at least partially melt and fuse together.

Figure 39:
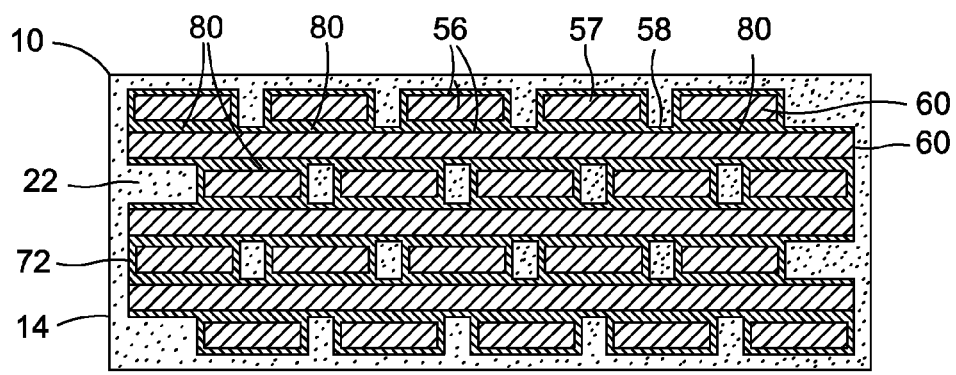
FIG. 39 is a schematic side view of a composite structure after infusing the layers with matrix material.

FIG. 39 is a schematic side view of a composite structure 10 of FIG. 38 following the thermoplastic fusing of the fusible sheaths 58. The composite structure 10 may be infiltrated or infused with matrix 22 material to fill the gaps or open spaces between the core-sheath fibers 56. Heat and/or pressure may be applied to cure and/or solidify the composite structure 10.

FIG. 40 is a perspective schematic illustration of a cross-ply configuration 72 of a first layer 62 and a second layer 64. As indicated above, the first layer 62 and the second layer 64 may be located in any position within a layer stack 66. The first layer 62 may contain first fibers 32 and the second layer 64 may contain second fibers 34. At least a portion of the first fibers 32 may be provided as first-functional fibers 140. At least a portion of the second fibers 34 may be provided as second-functional fibers 142. The first-functional fibers 140 may be chemically reactive with (e.g., chemically bonded to) the second-functional fibers 142 at locations where the first-functional fibers 140 are in contact with the second-functional fibers 142. In this regard, the first-functional fibers 140 may be formed of any material, without limitation, that reacts with and/or chemically bonds to the second-functional fibers 142 but does not react with or chemically bond to itself. Likewise, the second-functional fibers 142 may be formed of any material, without limitation, that reacts with and/or chemically bonds to the first-functional fibers 140 but does not react with or chemically bond to itself. More specifically, the first-functional fibers 140 may be non-reactive with (e.g., non-chemically bonded to) other first-functional fibers 140. Likewise, the second-functional fibers 142 may be non-reactive with (e.g., non-chemically bonded to) other second-functional fibers 142. The first-functional fibers 140 and second-functional fibers 142 are chemically reactive with each other as indicated above. In contrast, as indicated above, core-sheath fibers 56 have a fusible sheath 58 that can be locally fused (e.g., melted together) with the fusible sheath 58 of another core-sheath fiber 56 to form a local connection between two core-sheath fibers 56.

In an embodiment, the first-functional fibers 140 may be provided as epoxy-functional fibers 140*a* (see FIGS. 41-43) formed of any one of the above described fiber materials and coated with an epoxy resin material or the epoxy-functional fibers 140*a* may be formed of solid epoxy resin. In an embodiment, second-functional fibers 142 may comprise amine-functional fibers 142*a* (see FIGS. 41-43). Amine-functional fibers 142*a* may be formed of an amine chemical compound or other compound that is chemically reactive with epoxy resin when placed in contact with the epoxy-functional fibers 140*a*. Contact between an epoxy-functional fiber 140*a* and an amine-functional fiber 142*a* may result in cross-linking and/or at least partial curing and chemical bonding 96 at the locations of contact between the epoxy-functional fiber 140*a* and the amine-functional fiber 142*a*.

In some embodiments of a composite structure 10, the first layer 62 may include epoxy-functional fibers 140*a* and amine-functional fibers 142*a* arranged in parallel relation to one another although the epoxy-functional fibers 140*a* and amine-functional fibers 142*a* may be oriented in non-parallel relation including, but not limited to, in a woven arrangement. The amine-functional fibers 142*a* may be alternated with the epoxy-functional fibers 140*a*. For example, in FIG. 40, every third fiber in the first layer 62 may be an amine-functional fiber 142*a*, and the remaining fibers in the first layer 62 may be epoxy-functional fiber 140*a*. The fibers 30 in the second layer 64 may be oriented perpendicular (or other angle) relative to the fibers 30 in the first layer 62, and may also include every third fiber 30 being an amine-functional fiber 142*a* and the remaining fibers 30 being epoxy-functional fibers 140*a*.

Methods of functionalizing fibers 30 may include plasma treatment, corona treatment, wet chemical methods, polymer blending, and/or other methods. In this regard, fibers 30 may be functionalizing along an entire length of the fibers. Alternatively, fibers 30 may be functionalized according to a pattern along the length of the fibers 30. In one embodiment, each fiber 30 may be provided with a desired functionality in certain increments along the fiber 30 length. For example a fiber 30 may be provided with an epoxy functionality (e.g., an epoxy coating) in one-half inch increments along the fiber 30 length, or any other uniform or non-uniform pattern along the fiber 30 length. Other fibers 30 may be provided with an amine functionality in a desired increment along the fiber 30 length. Fibers may be functionalized in a manner to provide a desired pattern of fiber 30 coupling within the composite structure 10.

In a further embodiment, the composite structure 10 may be provided with self-reactively-coated fibers (not shown). A self-reactively-coated fiber may have a self-reactive coating (not shown) that chemically reacts (e.g., chemically bonds) when in contact with itself, but does not chemically react with or bond with bare fiber (i.e., uncoated fiber). The self-reactive coating may or may not react with the matrix 22. In an embodiment, a composite structure 10 may include fibers 30 arranged in a first layer 62 and in a second layer 64. The first layer 62 and the second layer 64 may respectively contain first fibers 32 and second fibers 34.

At least a portion of the first fibers 32 may include self-reactively-coated fibers and the remaining fibers in the first layer 62 may include non-coated fibers 30 or fibers 30 that are not coated with the self-reactive coating. Likewise, at least a portion of the second fibers 34 may include self-reactively-coated fibers and the remaining fibers 30 in the second layer 64 may include non-coated fibers 30 or fibers 30 that are not coated with the self-reactive coating. In such a composite structure 10, the self-reactively-coated fibers may be connected to other self-reactively-coated fibers at locations where the self-reactively-coated fibers are in contact with one another. In some embodiments, the self-reactive coating may require the application of heat and/or energy from an external reaction-initiating source (not shown) to initiate or cause the self-reactive coating to react with and chemically bond to itself. For example, at locations where the self-reactive coating of one fiber 30 is in contact with the self-reactive coating of another fiber 30, heat, radiation, moisture, or other reaction-initiating mechanism may be applied to the fibers 30 in a global pattern or a local pattern. The external reaction-initiating source may comprise a laser that may apply heat in a localized pattern to couple self-reactively-coated fibers at locations where such fibers 30 are in contact with one another.

In some embodiments, coupling of fibers 30 may be controlled by applying the self-reactive coating in a desired pattern (e.g., every one-half inch) along the length of one or more fibers 30. Furthermore, at least one layer 60 in a composite structure 10 may include self-reactively-coated fibers 30 and uncoated fibers 30 or bare fibers 30 (e.g., non-self-reactively-coated fibers 30). For example, one layer 60 of a composite structure 10 may include alternating self-reactively-coated fibers 30 and uncoated fibers 30. Even further, different layers 60 within a layer stack 66 may include different patterns of self-reactively-coated 30 fibers and uncoated fibers 30 to provide different arrangements for coupling fibers 30 within the composite structure 10. Certain layers 60 within a composite structure 10 may be comprised substantially of self-reactively-coated fibers 30, while other layers 60 in the composite structure 10 may be comprised substantially of uncoated fibers 30.

Selection of the chemical makeup and/or functionality of the first-functional 140, second-functional 142, and other-functional fibers 30 may be based on the chemical compatibility of the first-functional 140 and second-functional fibers 142 such that chemical reactions (e.g., chemical bonding) between the fibers 30 will occur as desired. Selection of the chemical makeup and/or functionality of the first-functional 140 and second-functional fibers 142 may also be based on the desired connection qualities 100 (e.g., strength, elastic modulus, connection yield and/or failure strain, etc.). In addition, selection of the chemical makeup and/or functionality of the first-functional 140 and second-functional fibers 142 may be based on the desired optical properties of the composite structure 10. For example, the chemical makeup or materials of the first-functional 140 and second-functional fibers 142 may be selected based on the refractive indices and/or temperature coefficient of refractive indices of the fiber 30 materials and matrix for a given temperature change and wavelength of light to which the composite structure 10 may be subjected during use. Selection of the chemical makeup and/or material of the self-reactively-coated fibers 30 may also be based on chemical compatibility, desired connection qualities 100, and/or desired optical properties (e.g., refractive index) to appropriately match the fiber 30 material, the coating material, and the matrix material.

The presence, concentration, type, or quality of the functionalization/coating may also be varied along the length of any individual fiber 30, fiber-to-fiber within a layer 60, and/or layer-to-layer. For example, as indicated above, the connection type 88 or connection quality 100 of an epoxy-coating may be varied along the length of a fiber 30. As may be appreciated, the fibers 30 in any layer 60 may be arranged in any orientation, without limitation, and are not limited to the cross-ply configuration 72 shown in FIG. 40. Furthermore, the fibers 30 in any layer 60 may be comprised of any portion of amine-functional fibers 142a relative to the portion of epoxy-functional fibers 140a in the layer 60. In addition, any one of the fibers 30 in a given layer 60 may be non-epoxy-functional fibers 140a or non-amine-functional fibers 142a. For example, the first layer 62 may be comprised of substantially all epoxy-functional fibers 140a and may be substantially devoid of amine-functional fibers 142a. The second layer 64 may include substantially all amine-functional fibers 142a and may be substantially devoid of epoxy-functional fibers 140a. For a layer 60 containing epoxy-functional fibers 140a and amine-functional fibers 142a, the fibers 30 may be alternated in any arrangement within the layer. For example, the fibers 30 may alternate between epoxy-functional fibers 140a and amine-functional fibers 142a. Any number of a variety of arrangements may be implemented for arranging the epoxy-functional fibers 140a and amine-functional fibers 142a.

FIG. 41 is an exploded schematic side view of a plurality of epoxy-functional fibers 140a and amine-functional fibers 142a arranged in layers 60. In the embodiment shown, each one of the epoxy-functional fibers 140a and amine-functional fibers 142a may have a generally rectangular cross-sectional shape although such fibers 140a, 142a may be provided in any cross-sectional shape, without limitation. The fibers 140a, 142a may be initially arranged in a desired orientation such as the cross-ply configuration shown in FIG. 41. In the embodiment shown, the fibers 140a, 142a in alternating layers 60 may be arranged in staggered formation such that the fibers 140a, 142a in one layer 60 are at least partially aligned with the gaps between the fibers 140a, 142a in another layer 60 when the composite structure 10 is viewed along a direction normal to the upper and/or lower surfaces of the fibers 140a, 142a to minimize the scattering of light and thereby improve the optical performance of the composite structure 10.

FIG. 42 is a schematic side view of the layers 60 of FIG. 41 pressed together to place the layers 60 of fibers 140a, 142a in contact with one another. In locations where the epoxy-functional fibers 140a contact the amine-functional fibers 142a, a chemical reaction may occur between the epoxy resin and the amine compound. The chemical reaction may result in a chemical bond 96 at locations where the amine-functional fibers 142*a* and the epoxy-functional fibers 140*a* are in contact with one another. The chemical bond 96 may be characterized as a localized curing and/or hardening of the epoxy resin and resulting in the formation of a connection site between an epoxy-functional fiber 140*a* and an amine-functional fiber 142*a*. Other cure methods such as moisture cure, ultraviolet-radiation cure, visible light cure, and other radiation cure methods may be implemented for curing the chemical bond 96 between an epoxy-functional fiber 140*a* and an amine-functional fiber 142*a*. In some embodiments, the connection quality 100 of the chemical bond 96 between an epoxy-functional fiber 140*a* and an amine-functional fiber 142*a* may be altered by varying the chemistry of the amine compound or epoxy compound. For example, altering the length of chain of the amine compound or epoxy compound, and/or altering the chemistry of chain of the amine compound or epoxy compound may provide a means for controlling the tensile strength, yield strain, failure strain, and/or elastic modulus at the chemical bond 96 between an epoxy-functional fiber 140*a* and an amine-functional fiber 142*a*.

FIG. 43 is a schematic side view of a composite structure 10 after infusing the chemically-bonded layers 60 with matrix 22 material. In an embodiment, matrix 22 material such as an epoxy matrix may be infused into the chemically-bonded layers 60 such that the matrix 22 fills any gaps between epoxy-functional fibers 140*a*, amine-functional fibers 142*a*, and/or other types of fibers 30 such as non-epoxy-functional fibers and non-amine-functional fibers that may be included in the composite structure 10. Heat and/or pressure may be applied to cure and/or harden the matrix 22.

The composite structure 10 may be provided in a complex three-dimensional embodiment that may incorporate multiple aspects of connection type 88 and/or connection quality 100 using any one or more of the arrangements and methods for coupling fibers 30 with other fibers 30 and/or for coupling fibers 30 with planar elements 78 (FIG. 21). In this regard, such a complex three-dimensional embodiment may include specifically selecting a three-dimensional architecture of bond type and/or bond quality for a ballistic panel with the objective of controlling the three-dimensional location of connection quality 100 and connection type 88 within the ballistic panel to achieve improved ballistic performance.

Figure 44:
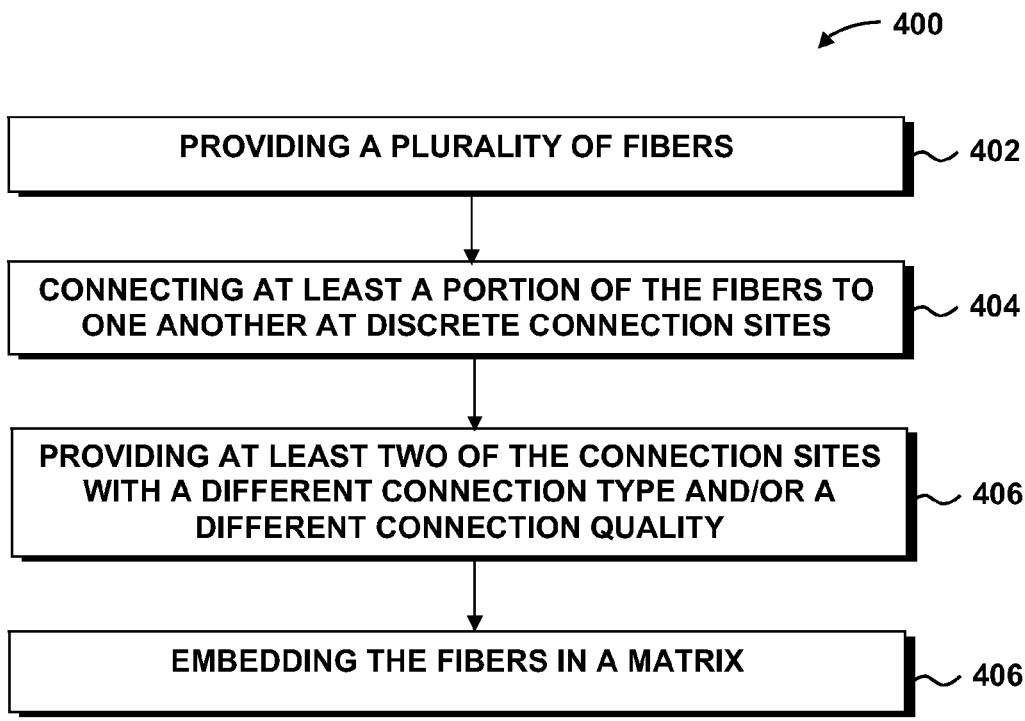
FIG. 44 is a flowchart illustrating one or more operations that may be included in a method of manufacturing a composite structure having fibers connected at a plurality of connection sites of varying connection type and/or varying connection quality.

FIG. 44 is a flowchart illustrating one or more operations that may be included in a method 400 of manufacturing a composite structure 10. Step 402 of the method 400 may include providing a plurality of fibers 30 which may include arranging at least a portion of the fibers 30 in a first layer 62. The fibers 30 in the first layer 62 may be arranged in substantially parallel relation to one another. However, the fibers 30 may be arranged in any angular orientation relative to one another. The fibers 30 may also be arranged in two or more layers 60 of a layer stack 66. For example, the method may include arranging at least a portion of the fibers 30 in a first layer 62 having first fibers 30, and arranging at least a portion of the fibers 30 in a second layer 64 having second fibers 30 as shown in FIG. 17.

Step 404 of the method 400 may include connecting at least a portion of the fibers 30 to one another at connection sites 80. Step 406 may include providing at least two of the connection sites 80 with a different connection type 88 and/or a different connection quality 100. For example, the method may include connecting at least two of the fibers 30 in the first layer 62 at least two connection sites 80 of a different connection type 88 and/or a different connection quality 100. In some embodiments, the connection quality 100 may include a high-strength/low-strain connection 106 at a first connection site 80*a* between the first and second fiber 32, 34, and a low-strength/high-strain connection 108 at a second connection site 80*b* between the first and second fiber 32, 34.

For composite structures 10 having two or more layers 60, the method 400 may include connecting at least one of the first fibers 30 in the first layer 62 to at least one of the second fibers 30 in the second layer 64 at a plurality of connection sites 80 which may have the same or different connection type 88 and/or connection quality 100. In a further embodiment, the method may include connecting at least two of the first fibers 30 in the first layer 62 at a connection site 80 of a first connection type 88*a* and/or connection quality 100*a*, and connecting at least two of the second fibers 30 in the second layer 64 at a connection site 80 of a second connection type 88*b* and/or connection quality 100*b* that may be different than the first connection type 88*a* and/or connection quality 100*a*.

In a further embodiment, the method 400 may include providing a first fiber 32, a second fiber 34, a third fiber 36, and a fourth fiber 38 as shown in FIG. 18. The first fiber 32 and the second fiber 34 may be included in the same layer 60 or in different layers 60. Likewise, the third fiber 36 and the fourth fiber 38 may be included in the same layer 60 or in different layers 60. For example, the third fiber 36 and the fourth fiber 38 may be included in the same layer 60 as the first fiber 32 and the second fiber 34 or in different layers 60 than the first fiber 32 and the second fiber 34. The first fiber 32 may be connected to the second fiber 34 at one or more connection sites 80 of a first connection type 88*a* and/or connection quality 100*a*, and the third fiber 36 may be connected to the fourth fiber 38 at one or more connection sites 80 of a second connection type 88*b* and/or connection quality 100*b* that may be different than the first connection type 88*a* and/or connection quality 100*a*. In any of the embodiments, Step 408 of the method 400 may include embedding the fibers 30 within the matrix 22 and allowing the matrix 22 to cure.

In an embodiment, the method 400 may include providing a first layer 62 as a woven fiber fabric ply 74 containing the plurality of fibers 30 as shown in FIG. 21. At least a portion of the fibers 30 in the woven fiber fabric ply 74 may be interconnected at locations where the fibers 30 intersect which may be described as nodes 76. In an embodiment, the connection sites 80 may be configured such that the connection type 88 and/or connection quality 100 may vary at different connection sites 80 at the intersection (i.e., nodes 76) of the fibers 30 in the woven fiber fabric ply 74.

In a further embodiment, the method 400 may include providing at least a portion of the fibers 30 as core-sheath fibers 56 as shown in FIGS. 34-36 or in FIGS. 37-39. Each one of the core-sheath fibers 56 may be comprised of a core 57 surrounded by a sheath 58 formed of a thermoplastic material. The core 57 may be formed of a high-strength material relative to the strength of the sheath 58. In some embodiments, the sheath 58 may be formed of the same material as the matrix 22 which may be a thermoplastic material. The method may include arranging the core-sheath fibers 56 in side-by-side contacting relation to one another in a layer 60 as shown in FIGS. 34-36. In some embodiments, the method may include arranging layers 60 of core-sheath fibers 56 such that upper and lower surfaces of the core-sheath fibers 56 may contact one another. For example, two or more layers 60 of core-sheath fibers 56 may be arranged in a cross-ply configuration 72 as shown in FIG. 37-39.

The method 400 may include pressing the layers 60 of core-sheath fibers 56 together and applying heat to the sheaths 58. For example, heat may be applied at one or more locations where the sheaths 58 are in contact with one another. The application of heat may result in connecting at least a portion of the core-sheath fibers 56 to one another at one or more connection sites 80 such as by thermoplastically fusing the sheaths 58 together at the connection sites 80. Following the thermoplastic fusing of the sheaths 58, the core-sheath fibers 56 may be infiltrated or infused with a matrix 22 material. The method may further include curing the matrix 22 material to form a composite structure 10. In certain embodiments, the core-sheath fibers 56 may be woven into a woven fiber fabric ply 74 (not shown). The sheaths 58 of the core-sheath fibers 56 may be thermoplastically fused 92 together at locations (e.g. nodes 74) where the fibers 30 intersect.

In a further embodiment illustrated in FIGS. 41-42, the method may include providing a first layer 62 containing first fibers 32 and a second layer 64 containing second fibers 34. At least a portion of the first fibers 32 may be epoxy-functional fibers 140*a* and/or amine-functional fibers 142*a* (FIGS. 41-43). At least a portion of the second fibers 34 may also be epoxy-functional fibers 140*a* and/or amine-functional fibers 142*a*. As indicated above, the amine-functional fibers 142*a* may be formed of an amine compound. The amine-functional fibers 142*a* and the epoxy-functional fibers 140*a* in each of the first layer 62 and the second layer 64 may be arranged in alternating relation to one another. The first and second layer 62, 64 may be arranged in desired configuration such as in the cross-ply configuration shown in FIG. 41 or in any other configuration.

The method may include placing the first layer 62 in contact with the second layer 64 such as by pressing the first and second layer 62, 64 together. As mentioned above, contact between the and second layer 62, 64 may result in chemical bonding 96 at connection sites 80 where the amine-functional fibers 142*a* contact the epoxy-functional fibers 140*a*. The method may additionally include infusing the and second layer 62, 64 with matrix 22 material. Heat and/or pressure may be applied to cure the matrix 22 material to form a composite structure 10.

Figure 45:
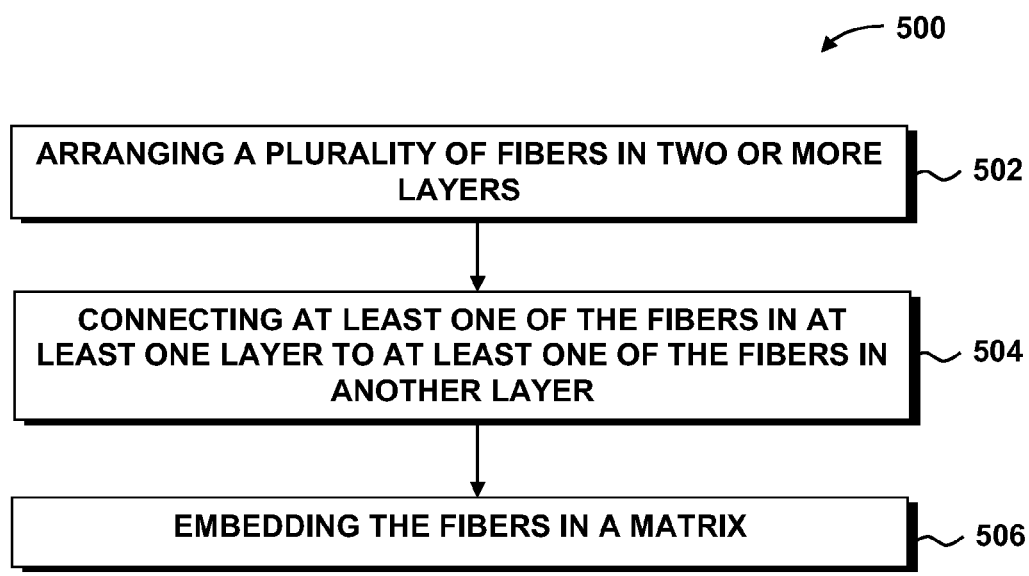
FIG. 45 is a flowchart illustrating one or more operations that may be included in a method of manufacturing a composite structure having a plurality of layers wherein the fibers in at least one layer are connected to the fibers of another layer.

FIG. 45 is a flowchart illustrating one or more operations that may be included in a further method 500 of manufacturing a composite structure 10. Step 502 of the method 500 may include arranging a plurality of fibers 30 in two or more layers 60 as shown in FIGS. 13A-17. Step 504 of the method 500 may include connecting at least one of the fibers 30 in at least one layer 60 to at least one of the fibers 30 in another layer 30. In an embodiment, the method 500 may include connecting at least one fiber 30 in one layer 60 to at least one fiber 30 in an immediately adjacent layer 60. For example, FIGS. 13A-13C illustrate the coupling of the fibers 30 in a unidirectional configuration 70 in a first and second layer 62, 64 along first connection regions 114, and the coupling the fibers 30 in the second and third layer 64, 65 along second connection regions 116.

In a further embodiment, FIG. 14 illustrates the coupling of the fibers 30 in layers 1-2 while FIG. 15 illustrates the coupling of the fibers 30 in alternate layers 1, 3, 5, 7, and 9. In certain embodiments, the fibers 30 in at least one layer 60 may be unconnected to the fibers 30 in another layer 60. For example, in FIG. 14, layers 3-10 may be unconnected to each other or to any other layers 60. In FIG. 15, layers 2, 4, 6, 8, and 10 may be unconnected to each other or to any other layers 60. As may be appreciated, the fibers 30 in any number of the layers 60 of a layer stack 66 may be coupled in any arrangement to achieve desired optical performance and/or ballistic performance characteristics of a composite structure 10.

Referring to FIGS. 24-33, the method 500 may include arranging the connection sites 80 in one or more geometric patterns. For example, the method may include the connecting the fibers 30 in at least one layer 60 at a plurality of connection sites 80 arranged in a global connection site pattern 110 of a layer 30, and/or connecting one or more layers 60 in a global connection site pattern 110. Each one of the global connection site patterns 110 may include one or more localized connection regions 112. Each one of the localized connection regions 112 may contain connections sites 80 where the fibers 30 in a layer 60 are connected to one another, and/or where layers 60 are connected to one another. FIGS. 24-33 illustrate several examples of geometric shapes of the localized connection regions 112, as described above. However, as may be appreciated, the localized connection regions 112 may be provided in any number of different geometric sizes, shapes and configurations, without limitation.

In certain embodiments, the method 500 may include providing one or more of the layers 60 as a planar element 78 as shown in FIGS. 21-22. For example, the planar element 78 may be provided as a film, a sheet, or a plate. The planar element 78 may comprise a non-fibrous planar element 78. However, the planar element 78 may be a fibrous material. For example, the planar element 78 may include chopped fibers, felt, or any other type of fibrous material. In certain embodiments, the planar element 78 may comprise a metal foil or a polymeric film such as a stretched film or an unstretched film as indicated above. The planar element 78 may also comprise composite material and/or ceramic material. The method 500 may include connecting at least one of the fibers 30 in at least one of the layers 60 to the planar element 78 at a plurality of connection sites 80 as shown in FIGS. 21-22. The connection sites 80 connecting the planar element 78 to one or more fibers 30 may have the same and/or different connection type 88 and/or connection quality 100.

The method 500 may include arranging the fibers 30 in a first layer 62 and a second layer 64 respectively containing first fibers 32 and second fibers 34 as shown in the schematic diagram of FIGS. 40-43. At least a portion of the first fibers 32 may be provided as first-functional fibers 140. At least a portion of the second fibers 34 may be provided as second-functional fibers 142. The method 500 may further include placing the first layer 62 in contact with the second layer 64, and chemically reacting (e.g., chemically bonding) the first-functional fibers 140 with the second-functional fibers 142 at locations where the first-functional fibers 140 contact the second-functional fibers 142. As indicated above, the method 500 may include producing the first-functional fibers 140 and/or second-functional fibers 142 by subjecting the first fibers 32 and/or second fibers 34 to plasma treatment, corona treatment, wet chemical methods, polymer blending, and any one of a variety of other functionalizing or coating methods.

In other embodiments, the method 500 may include arranging the fibers 30 in a first layer 62 containing first fibers 32 and in a second layer 64 containing second fibers 34, and providing at least a portion of the first fibers 32 and at least a portion of the as self-reactively-coated fibers. The method may further include providing at least a portion of the second fibers 34 as self-reactively-coated fibers. The first layer 62 may be placed in contact with the second layer 64. As indicated above, the method may include chemically reacting (e.g., chemically bonding) the self-reactively-coated fibers with one another at locations where the self-reactively-coated fibers contact one another. In some embodiments, the method may include exposing the self-reactively-coated fibers to an external reaction-initiating source such as heat, radiation, and/or moisture to initiate the chemical reaction at locations where the self-reactively-coated fibers are in contact with one another.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite structure, comprising:
    a plurality of fibers at least partially embedded within a matrix; and
    at least some of the fibers being directly connected to one another at at least one discrete connection site; and
    the connection site having a connection type consisting of at least one of fusing, mechanical pinning, and chemical bonding of fibers, the chemical bonding occurring between fibers due to chemical reaction of outer surfaces of fiber materials.

2. The composite structure of claim 1, wherein:
    each connection site has a connection type and a connection quality.

3. The composite structure of claim 1, further comprising:
    a first layer containing the plurality of the fibers connected to one another at a plurality of connection sites.

4. The composite structure of claim 1, further comprising:
    a first layer having first fibers connected to one another at a plurality of connection sites of a first connection type and/or connection quality; and
    a second layer having second fibers connected to one another at a plurality of connection sites of a second connection type and/or connection quality being different than the first connection type and/or connection quality.

5. The composite structure of claim 4, wherein:
    the first and second fibers are connected to one another at the plurality of connection sites.

6. The composite structure of claim 1, wherein:
    the first layer comprises a woven fiber fabric ply containing the plurality of the fibers; and
    at least a portion of the connection sites in the woven fiber fabric ply being located where the fibers intersect in the woven fiber fabric ply.

7. The composite structure of claim 1, wherein:
    the connection site has a connection quality comprising a connection strength, a connection yield and/or failure strain, and/or an elastic modulus of the connection site connecting the fibers.

8. The composite structure of claim 7, wherein:
    the fibers include a first fiber and a second fiber; and
    the connection quality includes a high-strength/low-strain connection at a first connection site between the first and second fiber and a low-strength/high-strain connection at a second connection site between the first and second fiber such that the strength at the first connection site is higher than the strength at the second connection site and the strain at the first connection site is lower than the strain at the second connection site.

9. The composite structure of claim 1, wherein:
    at least a portion of the fibers are configured as core-sheath fibers;
    each one of the core-sheath fibers being comprised of a core surrounded by a sheath formed of a fusible material; and
    the sheaths of at least two of the core-sheath fibers being fused together at one or more connection sites.

10. The composite structure of claim 1, wherein at least one of a matrix and the fibers are formed from at least one of the following materials:
    a thermoplastic material comprising at least one of the following: fluorocarbons, polyamides, polyethylenes, polyesters, polypropylenes, polycarbonates, polyurethanes, polyetheretherketone, polyetherketoneketone, polyetherimide, polyethylene terephthalate, and polyoxymethylene;
    a thermoset material comprising at least one of the following: polyurethanes, phenolics, polyimides, bismaleimides, polyesters, epoxies; and
    glasses comprising E-glass (alumino-borosilicate glass), S-glass (alumino silicate glass), pure silica, borosilicate glass, optical glass;
    metallic materials including steel, titanium, copper, aluminum, and metal alloys; and
    ceramic materials.

11. A composite structure, comprising:
    a plurality of fibers at least partially embedded within a matrix; and
    at least some of the fibers being connected to one another at at least one connection site;
    the fibers are formed of a substantially optically transparent and/or infrared transparent material; and
    the matrix is formed of a substantially optically transparent and/or infrared transparent polymeric matrix.

12. A composite structure, comprising:
    a plurality of fibers at least partially embedded within a matrix;
    the fibers being arranged in two or more layers;
    at least one of the fibers in at least one layer being connected to at least one of the fibers in another layer at at least one discrete connection site in addition to any matrix between the fibers; and
    the connection site having a connection type consisting of at least one of fusing, mechanical pinning, and chemical bonding of fibers, the chemical bonding occurring between fibers due to chemical reaction of outer surfaces of fiber materials.

13. The composite structure of claim 12, wherein:
    the fibers in at least one layer are unconnected to the fibers in another layer.

14. The composite structure of claim 12, wherein:
    at least a portion of the fibers in at least one layer are connected to one another at connection sites arranged in a global connection site pattern of the layer.

15. The composite structure of claim 12, wherein:
    at least one of the layers is configured as a planar element configured as a film, a sheet, or a plate; and
    at least one of the fibers in at least one of the layers being connected to the planar element at a plurality of connection sites.

16. The composite structure of claim 15, wherein the planar element is formed of at least one of the following materials:
    stretched polymeric material or unstretched polymeric material;
    glasses;
    metallic material;
    composite material;
    ceramic material; and
    woven material or non-woven material.

17. A composite structure, comprising:
    a plurality of fibers at least partially embedded within a matrix;

the fibers are arranged in a first layer and a second layer respectively containing first fibers and second fibers;

at least a portion of the first fibers comprise first-functional fibers;

at least a portion of the second fibers comprise second-functional fibers; and the first-functional fibers being chemically reactive with and connected to the second-functional fibers at locations where the first-functional fibers are in contact with the second-functional fibers;

the first-functional fibers being non-reactive with other first-functional fibers; and the second-functional fibers being non-reactive with other second-functional fibers.

18. A composite structure, comprising:

a plurality of fibers at least partially embedded within a matrix;

the fibers are arranged in a first layer and a second layer respectively containing first fibers and second fibers;

at least a portion of the first fibers comprise self-reactively-coated fibers;

at least a portion of the second fibers comprise self-reactively-coated fibers; and the self-reactively-coated fibers having a self-reactive coating that chemically reacts when in contact with itself; and the self-reactively-coated fibers being connected to other self-reactively-coated fibers at locations where the self-reactively-coated fibers are in contact with one another.

19. A method of manufacturing a composite article, comprising the steps of:

providing a plurality of fibers;

directly connecting at least some of the fibers to one another at discrete connection sites having a connection type consisting of at least one of fusing, mechanical pinning, and chemical bonding of fibers, the chemical bonding occurring between fibers due to chemical reaction of outer surfaces of fiber materials; and embedding the fibers in a matrix.

20. The method of claim 19, further comprising the steps of:

providing at least two of the connection sites with a different connection type and/or a different connection quality.

21. The method of claim 19, further comprising the steps of:

arranging at least a portion of the fibers in a first layer; and connecting at least two of the fibers in the first layer at at least two connection sites of a different connection type and/or a different connection quality.

22. The method of claim 19, further comprising the steps of:

arranging at least a portion of the fibers in a first layer having first fibers;

arranging at least a portion of the fibers in a second layer having second fibers;

connecting at least two of the first fibers at a connection site of a first connection type and/or connection quality; and connecting at least two of the second fibers at a connection site of a second connection type and/or connection quality that is different than the first connection type and/or connection quality.

23. The method of claim 19, further comprising the steps of:

arranging at least a portion of the fibers in a first layer having first fibers;

arranging at least a portion of the fibers in a second layer having second fibers; and connecting at least one of the first fibers to at least one of the second fibers at a plurality of connection sites.

24. The method of claim 23, further comprising the steps of:

providing the first layer as a woven fiber fabric ply containing the plurality of fibers; and connecting at least a portion of the fibers in the woven fiber fabric ply at one or more connection sites where the fibers intersect.

25. A method of manufacturing a composite article, comprising the steps of:

arranging a plurality of fibers in two or more layers;

directly connecting at least one of the fibers in at least one layer to at least one of the fibers in another layer at a discrete connection site having a connection type consisting of at least one of fusing, mechanical pinning, and chemical bonding of fibers, the chemical bonding occurring between fibers due to chemical reaction of outer surfaces of fiber materials; and embedding the fibers in a matrix.

26. The method of claim 25, wherein:

the fibers in at least one layer are unconnected to the fibers in another layer.

27. The method of claim 25, further comprising the steps of:

connecting the fibers in at least one layer at a plurality of connection sites arranged in one or more localized connection regions and/or in a global connection site pattern.

28. The method of claim 25, further comprising the steps of:

providing a planar element configured as film, a sheet, or a plate; and connecting at least one of the fibers in at least one of the layers to the planar element at a plurality of connection sites.

29. The method of claim 25, further comprising:

providing at least a portion of the fibers as core-sheath fibers, each one of the core-sheath fibers being comprised of a core surrounded by a sheath formed of a fusible material;

placing the sheaths of at least two of the core-sheath fibers in contact with one another;

applying heat to the sheaths at one or more locations where the sheaths are in contact with one another; and fusing the sheaths together to form one or more connection sites between the core-sheath fibers.

* * * * *